United States Patent
Stolte et al.

(10) Patent No.: US 10,387,452 B1
(45) Date of Patent: Aug. 20, 2019

(54) SYSTEM FOR MANAGING DATA STORAGES

(71) Applicant: Bay Dynamics, Inc., San Francisco, CA (US)

(72) Inventors: Ryan G. Stolte, New York, NY (US); Firas S. Rifai, San Francisco, CA (US)

(73) Assignee: BAY DYNAMICS, INC., New York, NY (US)

( * ) Notice: Subject to any disclaimer, the term of this patent is extended or adjusted under 35 U.S.C. 154(b) by 0 days.

(21) Appl. No.: 15/089,260

(22) Filed: Apr. 1, 2016

Related U.S. Application Data

(63) Continuation of application No. 13/269,568, filed on Oct. 8, 2011, now Pat. No. 9,330,091.

(51) Int. Cl.
| | |
|---|---|
| *G06F 16/00* | (2019.01) |
| *G06F 16/28* | (2019.01) |
| *G06F 8/61* | (2018.01) |
| *G06F 16/242* | (2019.01) |

(52) U.S. Cl.
CPC .............. *G06F 16/283* (2019.01); *G06F 8/61* (2013.01); *G06F 16/2428* (2019.01)

(58) Field of Classification Search
CPC ............. G06F 17/30592; G06F 19/322; G06F 21/606; G06F 17/10; G06F 11/00; G06F 11/008; G06F 17/3048; G06F 17/30554; G06F 17/30557; G06F 17/30563; G06F 17/30994; G06F 17/30997; G06F 2203/04805; G06F 3/011; G06F 3/04842

See application file for complete search history.

(56) References Cited

U.S. PATENT DOCUMENTS

| | | |
|---|---|---|
| 5,596,502 A | 1/1997 | Koski et al. |
| 6,134,541 A | 10/2000 | Castelli et al. |
| 6,477,536 B1 | 11/2002 | Pasumansky et al. |
| 6,581,068 B1 | 6/2003 | Bensoussan et al. |
| 6,707,454 B1 | 3/2004 | Barg et al. |
| 6,763,357 B1 | 7/2004 | Deshpande et al. |
| 6,775,675 B1 | 8/2004 | Nwabueze et al. |
| 6,877,006 B1 | 4/2005 | Vasudevan |
| 7,139,778 B2 | 11/2006 | Chaudhuri et al. |
| 7,181,440 B2 | 2/2007 | Cras et al. |
| 7,284,011 B1 | 10/2007 | Narayanaswamy et al. |
| 7,571,192 B2 | 8/2009 | Gupta et al. |

(Continued)

OTHER PUBLICATIONS

Non-Published commonly Owned U.S. Appl. No. 13/269,559, filed Oct. 8, 2011, 113 pages, Bay Dynamics, Inc.

(Continued)

*Primary Examiner* — Yicun Wu
(74) *Attorney, Agent, or Firm* — Adeli LLP

(57) ABSTRACT

Some embodiments provide a system that provisions multidimensional data storage (MDDS) cubes. The system includes a data management module for (1) accessing data from a plurality of data storages and (2) providing the data from the plurality of data storages through a unified data source for a set of MDDS cubes. The system also includes a cube provisioning module to (1) access the data from the plurality of data storages through the unified data source and (2) based on the unified data source, provision the set of MDDS cubes to a set of MDDS clients for viewing the set of MDDS cubes' data.

20 Claims, 59 Drawing Sheets

(56) References Cited

U.S. PATENT DOCUMENTS

| | | | |
|---|---|---|---|
| 7,593,969 B2 | 9/2009 | Berger et al. | |
| 7,664,777 B2 | 2/2010 | Cras et al. | |
| 7,693,860 B2 | 4/2010 | Babanov et al. | |
| 7,756,822 B2 * | 7/2010 | Danner | G06F 17/30592 707/600 |
| 7,774,303 B2 | 8/2010 | Shoup et al. | |
| 8,170,981 B1 * | 5/2012 | Tewksbary | G06F 17/30575 707/600 |
| 8,364,724 B2 | 1/2013 | Stolte et al. | |
| 8,661,432 B2 * | 2/2014 | Kriebel | G06Q 10/00 715/744 |
| 8,799,207 B1 | 8/2014 | Stolte et al. | |
| 8,799,209 B2 | 8/2014 | Bakalash et al. | |
| 8,909,680 B1 | 12/2014 | Stolte et al. | |
| 8,965,836 B1 | 2/2015 | Stolte et al. | |
| 9,081,830 B1 | 7/2015 | Stolte et al. | |
| 9,171,055 B1 | 10/2015 | Stolte et al. | |
| 9,183,269 B1 | 11/2015 | Stolte et al. | |
| 9,330,091 B1 | 5/2016 | Stolte et al. | |
| 9,390,082 B1 | 7/2016 | Stolte et al. | |
| 2001/0047353 A1 | 11/2001 | Talib et al. | |
| 2002/0029207 A1 | 3/2002 | Bakalash et al. | |
| 2002/0126545 A1 | 9/2002 | Warren et al. | |
| 2002/0129003 A1 | 9/2002 | Bakalash et al. | |
| 2002/0149604 A1 | 10/2002 | Wilkinson | |
| 2002/0169799 A1 | 11/2002 | Voshell | |
| 2003/0074631 A1 | 4/2003 | Minemoto | |
| 2003/0088540 A1 | 5/2003 | Edmunds et al. | |
| 2004/0006574 A1 | 1/2004 | Witkowski et al. | |
| 2004/0034616 A1 | 2/2004 | Witkowski et al. | |
| 2004/0205045 A1 | 10/2004 | Chen et al. | |
| 2004/0215626 A1 | 10/2004 | Colossi et al. | |
| 2005/0131924 A1 | 6/2005 | Jones | |
| 2005/0149550 A1 | 7/2005 | Berger et al. | |
| 2005/0228803 A1 | 10/2005 | Farmer et al. | |
| 2005/0262087 A1 | 11/2005 | Wu et al. | |
| 2005/0267868 A1 | 12/2005 | Liebl et al. | |
| 2006/0010058 A1 | 1/2006 | D'hers et al. | |
| 2006/0010139 A1 | 1/2006 | Netz et al. | |
| 2006/0020619 A1 | 1/2006 | Netz et al. | |
| 2006/0020921 A1 | 1/2006 | Pasumansky et al. | |
| 2006/0033738 A1 | 2/2006 | Wilkinson | |
| 2006/0085742 A1 | 4/2006 | Harold et al. | |
| 2006/0116859 A1 | 6/2006 | Legault et al. | |
| 2006/0184518 A1 | 8/2006 | Petculescu et al. | |
| 2006/0200448 A1 | 9/2006 | Edmunds et al. | |
| 2006/0259509 A1 | 11/2006 | Stolte et al. | |
| 2006/0271841 A1 | 11/2006 | Thanu et al. | |
| 2007/0022120 A1 | 1/2007 | Huang et al. | |
| 2007/0130116 A1 | 6/2007 | Cras et al. | |
| 2008/0196108 A1 | 8/2008 | Dent et al. | |
| 2008/0288448 A1 | 11/2008 | Agredano et al. | |
| 2008/0301086 A1 | 12/2008 | Gupta | |
| 2009/0043788 A1 | 2/2009 | Averbuch et al. | |
| 2009/0144313 A1 | 6/2009 | Hodge et al. | |
| 2010/0082524 A1 | 4/2010 | Barber | |
| 2010/0145984 A1 | 6/2010 | Palaniappan | |
| 2010/0185581 A1 | 7/2010 | Bakalash et al. | |
| 2010/0250412 A1 | 9/2010 | Wagner | |
| 2011/0066457 A1 | 3/2011 | Chang et al. | |
| 2011/0153548 A1 | 6/2011 | Varghese et al. | |
| 2011/0173224 A1 | 7/2011 | Toledo et al. | |
| 2012/0066174 A1 | 3/2012 | Vasudevan | |
| 2013/0041915 A1 | 2/2013 | Meiniel et al. | |
| 2013/0054510 A1 | 2/2013 | Beaumont | |
| 2014/0304823 A1 | 10/2014 | Landwehr | |

OTHER PUBLICATIONS

Non-Published commonly Owned U.S. Appl. No. 13/269,560, filed Oct. 8, 2011, 113 pages, Bay Dynamics, Inc.

Non-Published commonly Owned U.S. Appl. No. 13/269,561, filed Oct. 8, 2011, 114 pages, Bay Dynamics, Inc.

Non-Published commonly Owned U.S. Appl. No. 13/269,567, filed Oct. 8, 2011, 170 pages, Bay Dynamics, Inc.

Rainardi, Vincent, et al., "Chapter 12: Multidimensional Database," Building a Data Warehouse: With Examples in SQL Server, Month Unknown 2008, 36 pages, APRESS, New York, NY, USA.

Non-Published commonly Owned U.S. Appl. No. 15/178,239, filed Jun. 9, 2016, 116 pages, Bay Dynamics, Inc.

* cited by examiner

| *Figure 37* | *Figure 37A* |
| | *Figure 37B* |

| Figure 38 | *Figure 38A* |
| | *Figure 38B* |

…

SYSTEM FOR MANAGING DATA STORAGES

CLAIM OF BENEFIT TO PRIOR APPLICATIONS

This application is a continuation application of U.S. patent application Ser. No. 13/269,568, filed Oct. 8, 2011, now issued as U.S. Pat. No. 9,330,091. U.S. patent application Ser. No. 13/269,568, now issued as U.S. Pat. No. 9,330,091, is incorporated herein by reference.

BACKGROUND

In the field of Business Intelligence and Information Technology (IT) management consulting, online analytical processing (OLAP) solutions are one type of solution that may be provided to customers. Today, many challenges exist in implementing OLAP based solutions at customer sites. For instance, highly skilled and experienced individuals are needed to install, configure, maintain, and customize the underlying OLAP technology to achieve the desired business benefit. The cost and availability of the human resources are limiting factors in the success of OLAP implementations in the enterprise. Even when organizations are initially successful in finding the right individuals to perform the initial installation of the OLAP technology, the market demand for such individuals often leaves the organizations unable to recover in the event that such individuals leave the organization.

FIG. 1 illustrates an example of such an OLAP implementation. This figure illustrates an online analytical processing (OLAP) system 100 that includes OLAP cubes 105, an interface layer 115, an OLAP viewer 120, and a data storage 125. The OLAP cubes 105 are multidimensional data structures that facilitate quick viewing of data from the data storage 125 through the OLAP cube viewer 120. Each OLAP cube 105 may require a different set of data from the data storage 125. Even when several OLAP cubes 105 require the same pieces of data, each of the OLAP cubes 105 may require the same pieces of data to be organized in different ways (e.g., different fields, different tables, different formats, etc.).

The interface layer 115 serves as a layer to (1) define a set of data in the data storage 125 for an OLAP cube 105 and (2) define the manner in which the set of data is organized for the OLAP cube 105. In other words, the interface layer 115 serves as a layer that links sets of data in the data storage 125 to the corresponding OLAP cubes 105. As shown in FIG. 1, the interface layer 115 of the OLAP system 100 includes custom defined interfaces 110. Specifically, a custom defined interface 110 exists in the interface layer 115 for each of the OLAP cubes 105. Each time an OLAP cube is installed in the OLAP system 100, highly skilled installer(s) (e.g., database system develop, database administrator, etc.) must manually create, configure, and define a custom defined interface 110 in order to install and deploy the OLAP cube in the OLAP system 100.

Typically, a custom defined interface 110 specifies one or more data sources for an OLAP cube 105, specifies the data from the data sources for the OLAP cube 105, and specifies the manner in which the data is organized. Highly skilled installer(s) configure the custom defined interface 110 to link the data source and the data in the data source to the OLAP cube. For instance, OLAP cube 1 is defined by data in the data storage 125. The definition of the OLAP cube 1 may require certain data (e.g., tables) be present in the data storage 125. Additionally, the definition of the OLAP cube 1 may require the data to be organized according to a particular schema (e.g., tables) in the data storage 125. As such, the highly skilled installer(s) must manually connect to the data storage 125 and specify data from the data source for the OLAP cube 1 according to the schema that the data is organized in the data storage 125. In this manner, the installer creates the custom defined interface 1 for the OLAP cube 1 to interface with the data in the data storage 125. To install the OLAP cubes 2-N, the installer performs similar techniques to create the custom defined interfaces 2-N for the OLAP cubes 2-N to interface with the data in the data storage 125.

Another challenge with OLAP systems is the deep technical knowledge that is required to create valuable OLAP cubes, and to design cubes that are compelling and easy to understand by their end users. Since OLAP cubes are very difficult to understand by end users, OLAP cubes are typically designed by database programmers who transpose database schemas into OLAP cubes. Today, there is a rather small community of people with the capability to build well-architected, business context specific OLAP cubes.

BRIEF SUMMARY

Some embodiments of the invention provide a system for managing different multidimensional data storage (MDDS) cubes and provisioning the MDDS cubes for MDDS clients to consume the cubes' data. In some embodiments, an MDDS cube is a multidimensional data structure that facilitates quick viewing of data from a set of data sources. The system of some embodiments receives definitions of different MDDS cubes, and based on the definitions, performs an automated process that (1) analyzes the system's available resources (such as the data storages and data in the data storages), and (2) based on the identified system resources, identifies MDDS cubes that can be installed from several MDDS cubes that are candidates for installation. The MDDS cubes of some embodiments are online analytical processing (OLAP) cubes.

The MDDS system of some embodiments manages MDDS cubes by employing predefined packages called content packs. In some embodiments, a content pack is a package of files and/or folders having a predefined format. The content pack of some embodiments includes entity definitions (e.g., MDDS cube definitions, dimension definitions, DSV definitions, and/or presentation object definitions) and other types of data (e.g., data source metadata, predefined data source commands). For instance, each content pack in some embodiments includes (1) a set of cube definitions for a set of cubes and (2) cube metadata associated with the set of cubes. A cube definition of some embodiments specifies data (e.g., measures) for a cube, data attributes (e.g., dimensions) for categorizing the data along a set of dimensions, and a set of data sources that contains the data and the data attributes.

The content pack of some embodiments may also specify relationships between the entities defined by the entity definitions. For example, for a particular cube definition, the cube metadata of some embodiments specifies a list of relationships (e.g., data dependencies) between the data, the data attributes, and the data sources of the particular MDDS cube definition. In some embodiments, the cube metadata may specify relationships that are expressed in terms of single dependencies. A single dependency of some embodiments is a relationship that specifies (1) two definition components and (2) a dependency between the two definition components. As an example, a relationship that specifies that definition component A is dependent on definition component B is single dependency.

In some embodiments, the MDDS system generates a dependency map that links all the single dependencies specified for the cube definitions in a particular content pack in order to form a single list of dependencies for the particular content pack. The MDDS system of some embodiments may also generate a combined dependency map (also referred to as a unified content map) that combines the dependencies from the dependency maps of several content packs. As such, the combined dependency map provides a single dependency map that includes the dependencies specified for each of the MDDS cube definitions across all the content packs. This allows the MDDS system to manage MDDS cubes that are defined by data that spans different data storage instances (e.g., different instances of the same databases) of the same storage product of the same vendor, or different data storages of different products (e.g., different types of databases) from the same or different vendors.

Based on the combined dependency map, the MDDS system can identify the cubes that are available for installation and the cubes that are not available for installation from the set of cubes that are candidates for installation. For example, to determine whether a particular cube is available, the MDDS system examines the combined dependency map and an MDDS cube definition of the particular cube to identify the dependencies for the particular cube defined by the MDDS cube definition. The MDDS system then determines whether the identified dependencies (e.g., data and/or data sources) exist and, based on this determination, determines whether the MDDS cube is available for installation.

In some embodiments, the MDDS system manages multiple data sources for multiple MDDS cubes. One technique for managing multiple data sources for multiple MDDS cubes involves providing a layer of abstraction between the multiple data sources and the MDDS system so that, from the perspective of the rest of the MDDS system, the MDDS system appears to have one single data source when in fact the single data source has multiple data sources underlying the single data source. Under this technique, the MDDS cubes in the MDDS system derive their data from the multiple data sources through the unified data source.

This single data source is referred to below as a unified data source. In some embodiments, the unified data source is a collection of data source objects that presents a single source of data to the MDDS system. A data source object, in some embodiments, is a representation of data in a data source. To provision a unified data source, the MDDS system of some embodiments identifies each data source in the MDDS system and creates data source objects that represent the data in the data source. The MDDS system then provisions the unified data source to include the created data source objects.

When changes occur to any of the unified data source's underlying data sources, the MDDS system propagates those changes to the unified data source. For instance, when a data source is added to the MDDS system, the MDDS system creates data source objects that represent data in the data source that was added and reprovisions the unified data source to include the created data source objects. On the other hand, when one of the data sources is removed from the unified data source, the MDDS system identifies the data source objects that represent data in the data source that was removed and reprovisions the unified data source to not include the identified data source objects.

As noted above, an MDDS cube, in some embodiments, derives its data from a unified data source. In this manner, a MDDS client may consume data from the unified data source through the MDDS cube. Thus, the MDDS cube is a data source client that uses the unified data source of such embodiments as a data source. Alternatively or conjunctively, the unified data source of some embodiments may be used to provide data to other types of data source clients. Examples of such other data source clients include an MDDB cube, a web-browser client, a data processing application, any type of entity that performs SQL statements against a data source (e.g., SQL reporting application and/or services) to retrieve data, or any type of data interchange system.

To implement a unified data source that provides data to any number of different types of data source clients, the MDDS system of some embodiments provides a layer of abstraction between multiple data sources and the MDDS system by utilizing source linkers to link data sources to data source objects in the unified data source. In some cases, the source linkers link remote data sources to the data source objects in the unified data source. To manage the source linkers, the MDDS system of some embodiments creates a source linker for each data source in the MDDS system. Thus, the MDDS system creates a source linker for a new data source when the new data source is added to the MDDS system and it removes the source linker of the data source when the data source is removed from the MDDS system.

In addition to managing and provisioning a cube that is defined from data derived from one data source, the MDDS system of some embodiments manages and provisions MDDS cubes that are defined by data derived from different data sources. Such MDDS cubes are referred to as federated MDDS cubes. Different data sources may be different data storage instances (e.g., different instances of relational databases) of the same or different products from the same or different product vendors. A storage product may be any type of product that has data to which MDDS tools may be applied (e.g., for business intelligence purposes).

In addition to content packs that include federated MDDS cubes, some MDDS systems manage content packs that include federated presentation objects. A presentation object is a predefined representation of a perspective of one or more MDDS cubes. The presentation object of some such embodiments includes a set of charts, graphs, reports, and/or tables, which are generated based on the perspective of the set of MDDS cubes that define the presentation object. In some embodiments, a federated presentation object is a predefined representation of a perspective of MDDS cubes that are defined in different content packs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed.

Some embodiments of the invention provide an MDDS system for managing different MDDS cubes and provisioning these cubes for MDDS clients to access the data in these cubes. In some embodiments, an MDDS cube is a multidimensional data structure that facilitates quick viewing of data from a set of data sources. The system of some embodiments receives definitions of different MDDS cubes, and based on the definitions, performs an automated process that (1) analyzes the system's available resources (such as the data storages and data in the data storages), and (2) based on the identified system resources, identifies MDDS cubes that can be installed from several MDDS cubes that are candidates for installation. In some embodiments, the system installs MDDS cubes that the system has determined can be installed, and then processes the MDDS cube in order to populate and provision the cube to MDDS clients for consumption. The system in some embodiments installs an installable MDDS cube automatically upon determining that an MDDS cube can be installed or upon receiving input from a user to install the MDDS cube.

Figure 1:
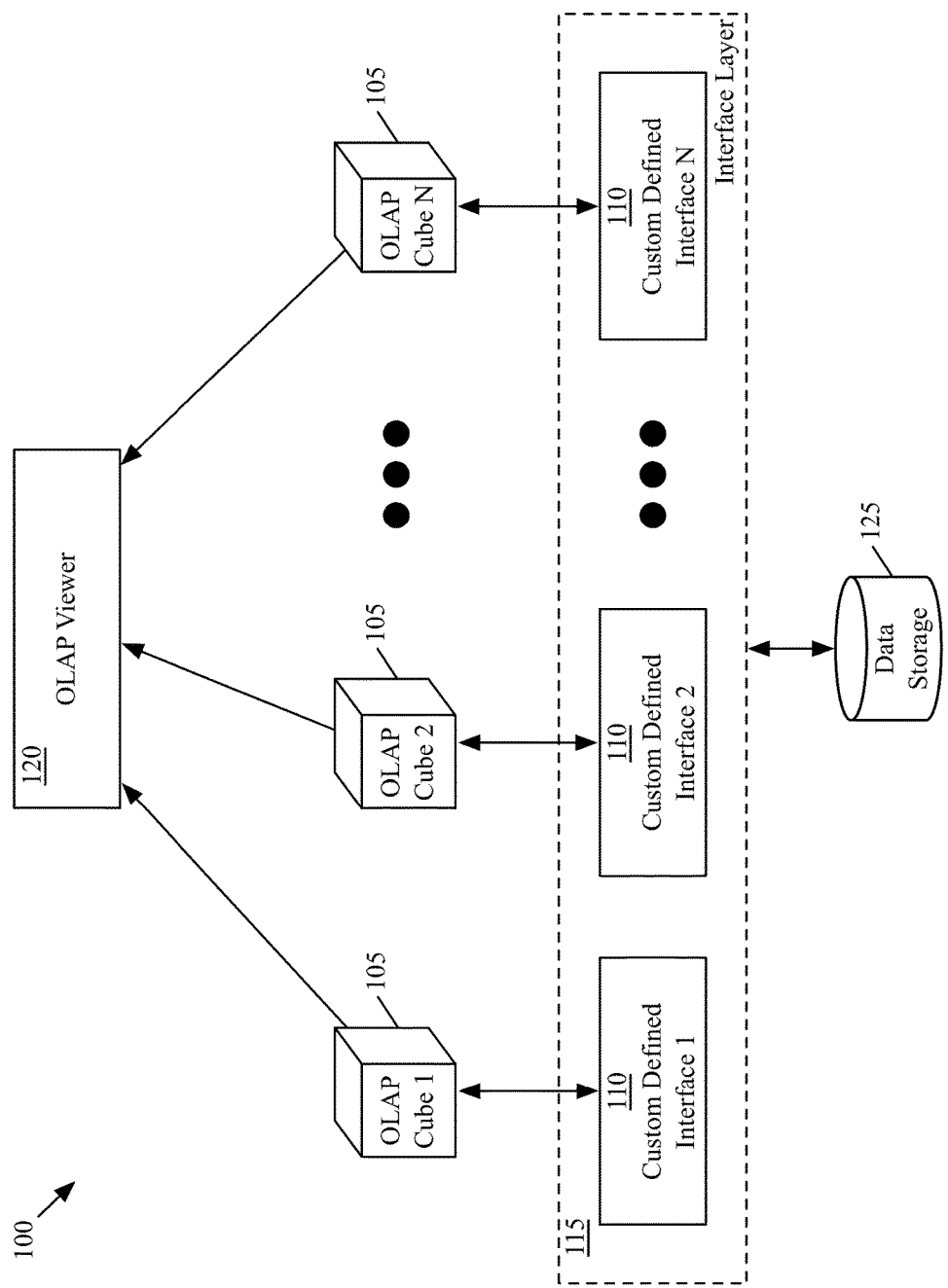
FIG. 1 conceptually illustrates an existing online analytical processing (OLAP) system.
Figure 2:
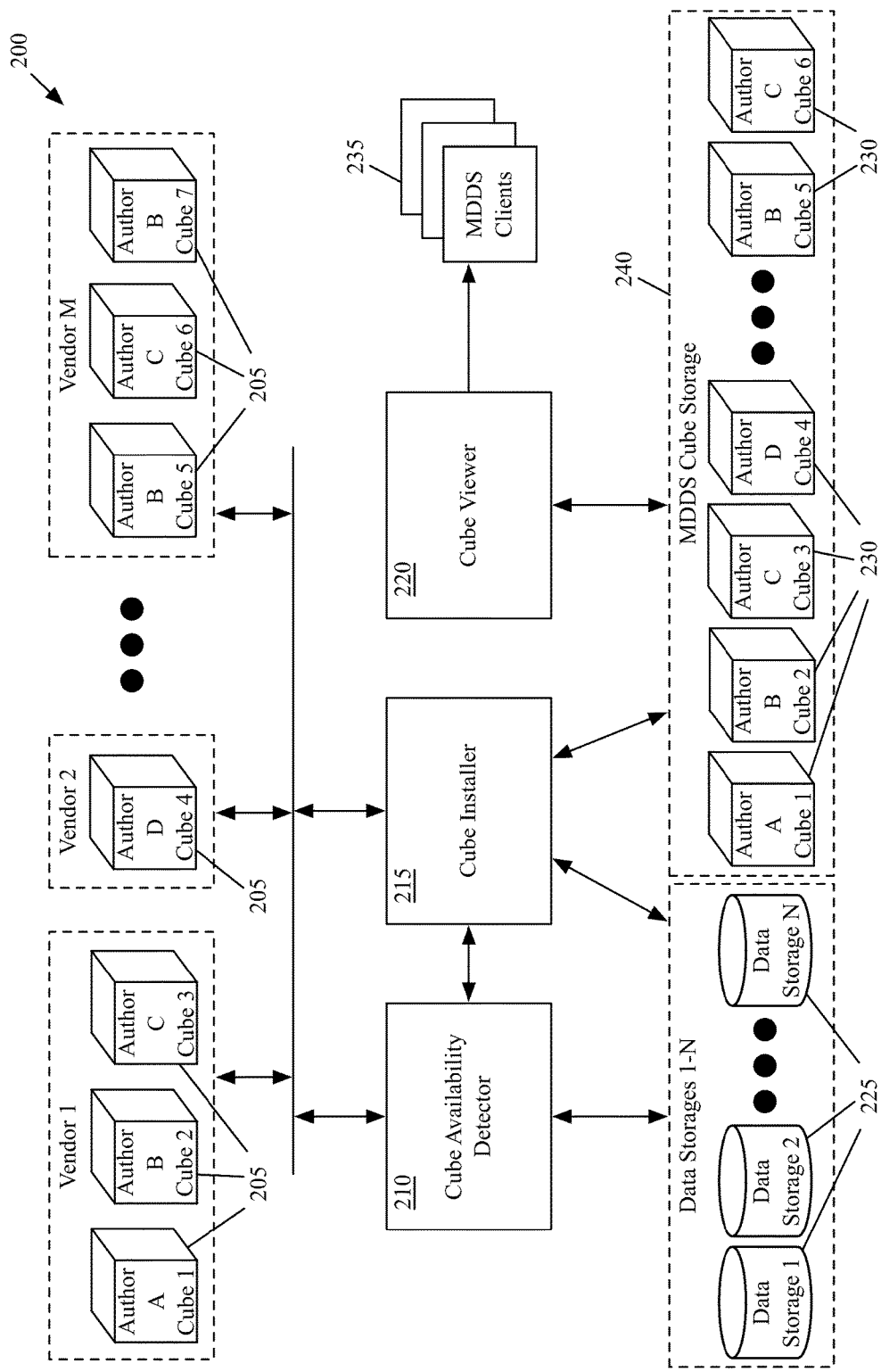
FIG. 2 conceptually illustrates a multidimensional data storage (MDDS) system of some embodiments.

FIG. 2 conceptually illustrates one such MDDS system 200 of some embodiments. This system can manage and install different MDDS cubes defined by the same or different authors for different products offered by the same or different vendors. As shown, the MDDS system 200 includes MDDS cube definitions 205, a cube availability detector 210, a cube installer 215, a cube viewer 220, N data storages 225, MDDS cube storage 240, installed MDDS cubes 230, and MDDS clients 235.

The N data storages 225 store data that can be retrieved and viewed by a user through one or more MDDS cubes that are installed in the system. These N data storages 225 are provided by M different storage vendors in some embodiments, where N and M are integer values that can differ. In some embodiments, a data storage 225 is any type of data storage that stores data to which MDDS tools may be applied (e.g., for business intelligence purposes).

Each of the data storages 225 may be implemented differently in different embodiments. In the example illustrated in FIG. 2, the data storages 225 include different instances of one data storage of one product from one vendor, and include different instances of different data storages of different products from one vendor or different vendors. Examples of different storage products include Microsoft System Center Configuration Manager®, Microsoft System Center Operations Manager®, Microsoft Forefront Endpoint Protection®, Symantec Management Platform®, Symantec Endpoint Protection®, or any type of product that has data to which MDDS tools may be applied (e.g., for business intelligence purposes). In other embodiments, the system 200 of FIG. 2 is just used with the same storage product and/or different storage products of just one vendor.

In the example illustrated in this figure, each of the products for each of the vendors 1-M generates and/or collects data, and then stores the products' data in one of the data storages 1-N. For instance, a product for vendor 1 generates and/or collects data and stores such data in data storage 1, another product for vendor 1 generates and/or collects data and stores such data in data storage 2, a product for vendor 2 generates and/or collects data and stores such data in data storage 3, a product for vendor 3 generates and/or collects data and stores such data in data storage 4, etc.

Each data storage 225 may be implemented in any number of different ways. For instance, a data storage 225 of some embodiments may be implemented as a database (e.g., a relational database, a hierarchical database, a flat file database, or any other type of database for storing data). Alternatively, a data storage 225 may be implemented as a file (e.g., an XML file, an spreadsheet file, a comma-separated values (CSV) file, a text file, etc.), or as any other type of object that serves as a source of data. Each data storage 225 in some embodiments is implemented by a single storage unit (e.g., a hard drive) or by several storage units (e.g., hard drives).

As mentioned above, each data storage stores data that can be viewed through one or more installed MDDS cubes. The system 200 installs the MDDS cubes by using the MDDS cube definitions. Each MDDS cube definition 205 describes a multidimensional data structure for a corresponding MDDS cube (not shown). For example, in some embodiments, an MDDS cube definition 205 specifies data (e.g., measures) for an MDDS cube, data attributes (e.g., dimensions) for categorizing the data along a set of dimensions, and a set of data sources that contains the data and the data attributes.

In FIG. 2, an MDDS cube definition may specify data for an MDDS cube (not shown), and such data is contained in one of the data storages 1-N. For example, the MDDS cube 1 definition specifies an MDDS cube that contains data from data storage 1, the MDDS cube 2 definition specifies an MDDS cube that contains data from data storage 2, the MDDS cube 3 definition specifies an MDDS cube that contains data from data storage 3, etc. In addition, an MDDS definition of some embodiments further specifies the manner in which the data in the set of data sources is organized (e.g., database schema).

As mentioned above, the system 200 can manage and install different MDDS cubes defined by the same or different authors for different products offered by the same or different vendors. In some embodiments, an author may be a company specializing in MDDS cube design, an MDDS cube designer, a database administrator, or any entity that develops MDDS cubes. For instance, an author may define different MDDS cubes for different vendors. As shown in FIG. 2, author C has defined an MDDS cube definition for the MDDS cube 3 for vendor 1 and an MDDS cube definition for the MDDS cube 6 for vendor 3 As another example, an author may define different MDDS cubes for different products from the same vendor. In FIG. 2, author B has defined MDDS cube definitions for the MDDS cube 5 and MDDS cube 7 for different products (not shown in FIG. 2) for the same vendor M. As illustrated, the system 200 manages MDDS cubes that are defined by any author for any product from any vendor.

Before installing a cube, the cube availability detector 210 of some embodiments analyzes MDDS cube definitions 205 to determine which MDDS cubes are available and which MDDS cubes are not available. For a particular MDDS cube, the cube availability detector 210 in some embodiments determines that the particular MDDS cube is available when this detector determines that it can access the data and data attributes that define the MDDS cube from the set data storages 225 to install and deploy the MDDS cube for consumption by MDDS clients. The detector in some embodiments determines that it can access such data and data attributes when it determines that the following three conditions are met: (1) a set of data storages 225 (i.e., a set of data sources) specified in an MDDS cube definition 205 for the MDDS cube exists, (2) data specified in the MDDS cube definition 205 for the MDDS cube is stored in the set of data storages 225, and (3) the data attributes for the data are stored in the set of data storages 225. In some embodiments, the detector determines that the set of data storages 225 specified in an MDDS cube definition 205 for the MDDS cube exists when this detector can establish connections to, or can access data from, the set of data storages 225.

Alternatively, the cube availability detector 210 of some embodiments determines that a particular MDDS cube is not available when any of the three conditions mentioned above are not met. Also, in some embodiments, the cube availability detector 210 determines that a particular MDDS cube is not available when this detector 210 determines that the data for the MDDS cube is not organized in the set of data sources according to a schema specified for the MDDS cube. In addition, the cube availability detector 210 of some embodiments determines that an MDDS cube is not available when the cube availability detector 210 cannot access the data or the data attributes that define the MDDS cube.

The cube installer 215 installs MDDS cubes that are determined to be available (e.g., by the cube availability detector 210) and not yet installed. For a particular MDDS cube that is available, the cube installer 215 of some embodiments installs an instance of the particular MDDS cube based on the corresponding MDDS cube definition for the particular MDDS cube. To install the particular MDDS cube, the cube installer 215 creates a data structure according to the MDDS cube definition of the particular MDDS cube. The installing of the particular MDDS cube may also be referred to as creating an instance of the particular MDDS cube.

In some embodiments, the cube installer 215 stores the instance of the particular MDDS cube in the MDDS cube storage 240. In some such embodiments, the MDDS cube is stored in the MDDS cube storage 240 in a multidimensional database while, in other such embodiments, the MDDS cube is stored in the MDDS cube storage 240 in a relational database. In some embodiments, the MDDS cube is stored in the MDDS cube storage 240 in a hybrid database that includes a multidimensional database and a relational database (e.g., some data may be stored in the multidimensional database and some data may be stored in the relational database).

After a particular MDDS cube is installed, the particular MDDS cube may be processed. The cube installer 215 of some embodiments processes the particular MDDS cube by aggregating the data and data attributes specified by the MDDS cube definition from the set of data sources (e.g., by querying the data and the data attributes from the set of data sources) specified by the MDDS cube definition and populating the data structure of the particular MDDS cube with the aggregated data and data attributes. After the particular MDDS cube has been processed, the particular MDDS cube is ready for consumption by an MDDS client. For this example, the installed MDDS cubes 230 illustrated in FIG. 2 are MDDS cubes that the cube installer 215 has installed and processed. Thus, installed MDDS cubes 230 may be consumed by MDDS clients.

In some embodiments, the cube installer 215 installs an MDDS cube based on input from a user. In some instances, the MDDS system 200 receives input (e.g., through a graphical user interface ("GUI"), a command line interface, or any other type of interface for receiving input) from a user to install and deploy an MDDS cube that the cube availability detector 210 has determined as available.

The cube viewer 220 of some embodiments is an MDDS viewing tool that allows MDDS clients to consume the installed MDDS cubes 230. For instance, in some embodiments, the cube viewer 220 is an interface of the MDDS system 200 through which MDDS clients consume MDDS cubes. The cube viewer 220 provides a list of installed and consumable MDDS cubes to an MDDS client upon connection to the cube viewer 220 in some embodiments. The cube viewer 220 may receive requests to consume a particular installed MDDS cube 230. In response to the requests, the cube viewer 220 may access the particular installed MDDS cube 230 and transmit a portion of or all of the data and/or data attributes of the MDDS cube to the MDDS client.

Different embodiments of the cube viewer 220 provide different techniques for the MDDS clients 235 to consume MDDS cubes. For instance, the cube viewer 220 in some embodiments allows the MDDS clients 235 to consume MDDS cubes through a multidimensional expressions (MDX) query language while other embodiments of the cube viewer 220 allow the MDDS clients 235 to consume MDDS cubes through an object linking and embedding, database (OLE DB) for OLAP application programming interface (API). Still, in other embodiments, the cube viewer 220 allows the MDDS clients 235 to consume MDDS cubes through an extended markup language for analysis (XMLA). In some embodiments, the cube viewer 220 provides a combination of the previously mentioned techniques and/or any other technique for consuming MDDS cubes.

In some embodiments, an MDDS client 235 is any application that is configured to consume MDDS cubes. An MDDS client 235 of some embodiments consumes an MDDS cube by accessing the MDDS cube's data or retrieving data from the MDDS cube (e.g., by using an MDX query language, an OLE DB API, XMLA, etc.). Different embodiments of the MDDS clients 235 may consume an MDDS cube differently. For example, an MDDS client 235 of some embodiments consumes an MDDS cube by displaying a portion of or all of the MDDS cube's data and data attributes. In some embodiments, an MDDS client 235 consumes an MDDS cube by processing the MDDS cube's data. Other embodiments of an MDDS client 235 consume an MDDS cube by storing a portion of or all of the MDDS cube's data and data attributes. An MDDS client 235 of other embodiments may consume an MDDS cube in other ways as well.

Different embodiments of the MDDS clients 235 are implemented differently. In some instances, an MDDS client 235 is implemented as a standalone application while, in other instances, an MDDS client 235 is implemented as an application that is part of another application. In addition, an MDDS client 235 of some embodiments is implemented as a thick client (e.g., a component that is included in the MDDS system 200) while an MDDS client 235 of other embodiments is implemented as a thin client (e.g., a third party web browser).

One example operation of the MDDS system 200 that is based on an MDDS cube definition 205 of an MDDS cube will now be described for some embodiments of the invention. The cube availability detector 210 initially analyzes the MDDS cube definition 205 to identify data for the MDDS cube, data attributes that categorizing the data along a set of dimensions, and a set of data sources that contains the data and the data attributes.

The cube availability detector 210 determines that the MDDS cube is available when the set of data sources exists and the data and data attributes are stored in the set of data sources. In some embodiments, the cube availability detector 210 determines that the set of data sources exists when the cube availability detector 210 establishes a connection to each data source in the set of data sources and accesses data in the data sources. On the other hand, the cube availability detector 210 determines that the MDDS cube is not available when the cube availability detector 210 cannot establish a connection to one of the data sources in the set of data sources exists, or cannot access the data or the data attributes (e.g., some or all of the data and/or data attributes is not stored in the set of data sources).

When the cube availability detector 210 determines that the MDDS cube is available, the cube installer 215 installs the MDDS cube. To install the MDDS cube, the cube installer 215 utilizes the MDDS cube definition to generate an instance of the MDDS cube. The cube installer 215 of some embodiments stores the instance of the MDDS cube in the MDDS cube storage 240. In some embodiments, the cube installer 215 automatically installs the MDDS cube upon the cube availability detector 210 determining that the MDDS cube is available while, in other embodiments, the cube installer 215 installs the MDDS cube upon the MDDS system 200 receiving input (e.g., through a graphical user interface ("GUI"), a command line interface, or any other type of interface for receiving input) from a user.

Once the MDDS cube is installed, the cube installer 215 may process the instance of the MDDS cube to aggregate the data and data attributes that define the MDDS cube and populate the data structure of the MDDS cube with the aggregated data and the data attributes so that the cube may be consumed by one of the MDDS clients 235. The cube viewer 220 provides the MDDS clients 235 one or more ways to consume the instance of the MDDS cube (e.g., through an MDX query language, an OLE DB API, and/or XMLA). When the cube viewer 220 receives a request to consume the MDDS cube, the cube viewer 220 accesses the instance of the cube (which may be stored in the MDDS cube storage 240 in some embodiments) and, based on the MDDS client 235's request, sends a portion of or all of the data and/or data attributes of the MDDS cube. In some embodiments, the cube viewer 220 provides the MDDS client 235 with a list of the installed MDDS cubes 230 for consumption.

Figure 3:
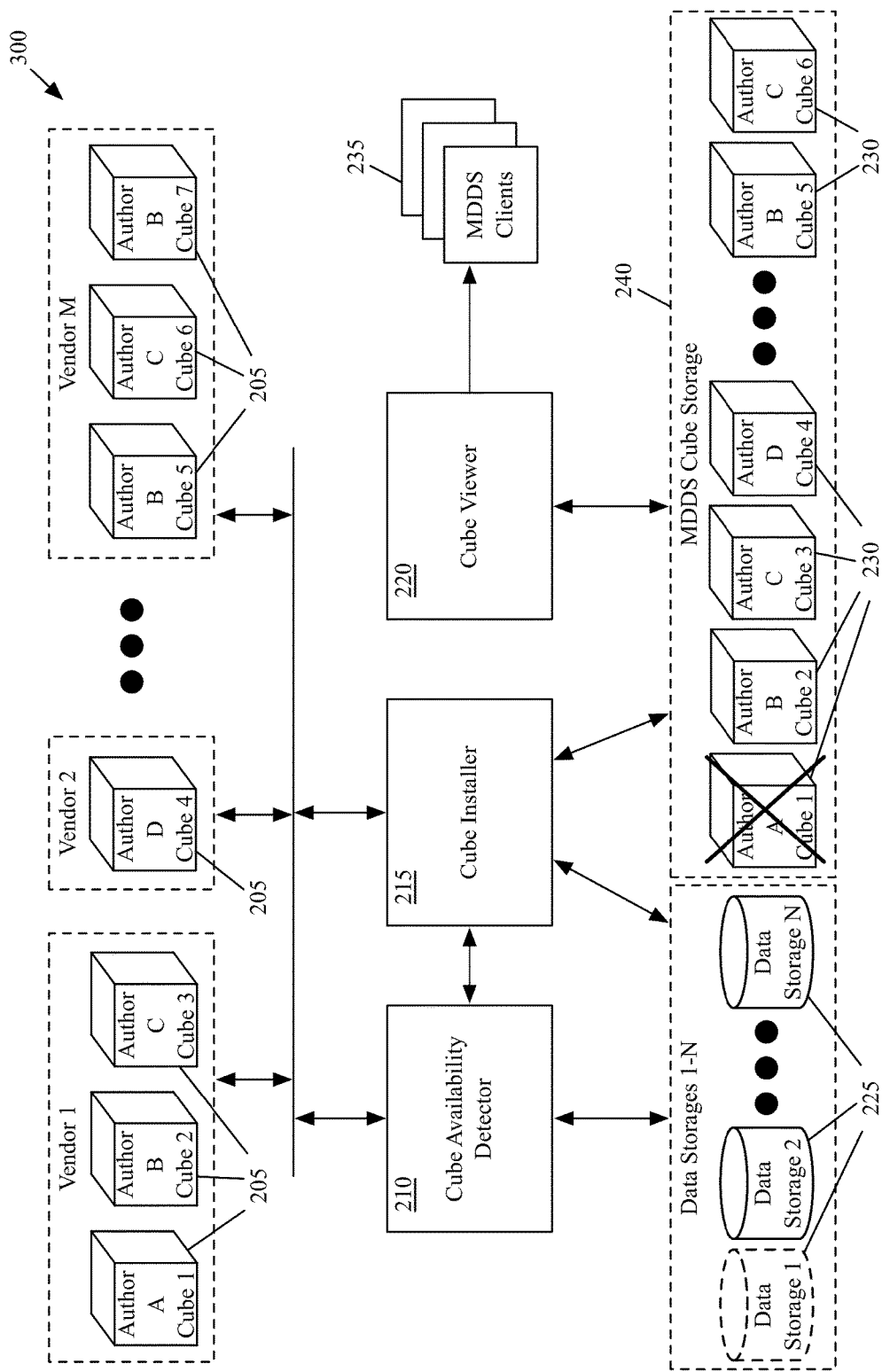
FIG. 3 conceptually illustrates an example of MDDS cubes that are available, MDDS cubes that are not available, and MDDS cubes that are available and installed according to some embodiments of the invention.

FIG. 3 illustrates a case where MDDS cubes are not installed after the cube availability detector 210 determines that resources needed for MDDS cubes are not available in a particular system 300 (e.g., in a particular computing system of a particular enterprise or entity). In this example, the system 300 does not employ data storage 1 that is employed in the MDDS system 2 of FIG. 2. In FIG. 3, the absence of the data storage 1 is indicated by the use of dashed lines for the data storage 1, which indicates that this data storage is not available in the system 300.

Since the data storage 1 is not available in this example, the MDDS system 300 has determined that the MDDS cubes defined by the MDDS cube definitions 205 that specify data from the data storage 1 cannot be installed. For this example, the MDDS cube definition for the MDDS cube 1 defined by author A specifies data from the data storage 1. As shown in FIG. 3, the MDDS cube 1 is indicated as not available with an "X" through the corresponding installed MDDS cube 1.

On the other hand, the data storages 2-N are still available. As such, the MDDS system 300 has determined, in this example, that the MDDS cubes 2-6 are available. Furthermore, the MDDS cubes 2-6 that the MDDS system 200 has determined as available in this example are installed and available for MDDS clients 235 to consume.

Figure 4:
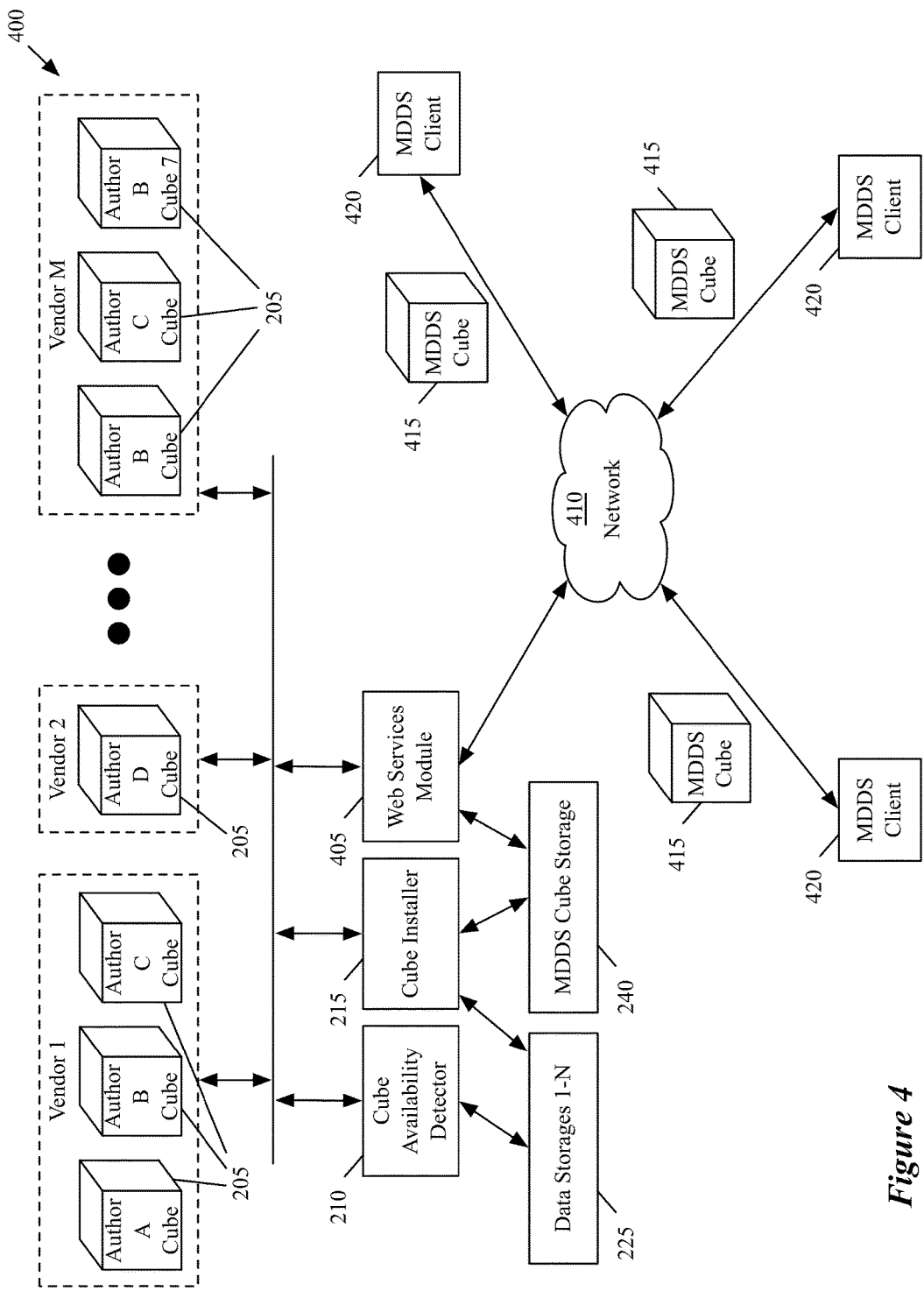
FIG. 4 conceptually illustrates an MDDS system of some embodiments.

In some embodiments, the MDDS system provides different ways for MDDS clients to consume MDDS cubes managed by the MDDS system. FIG. 4 conceptually illustrates the MDDS system 400 of some embodiments. The MDDS system 400 is similar the MDDS system 200 except that in place of the cube viewer 220, the MDDS system 400 has a web services module 405 that provides MDDS cube data to several MDDS clients 420 through a network 410. In some embodiments, the network 410 may be a local area network (LAN), a wireless local area network (WLAN), a wide area network (WAN), the Internet, a network of networks, or any other type of network.

The web services module 405 serves the same function as the cube viewer 220 described above by reference to FIG. 2. However, the web services module 405 implements such functions through a set of web services that are provided to the MDDS clients 420 over the network 410 (i.e., the set of web services are interfaces through which the MDDS clients 420 consume MDDS cubes managed by the MDDS system 400). For instance, the set of web services provided by the web services module 405 may include (1) a service for receiving requests from the MDDS client 235 to consume installed MDDS cubes 230 (which are not shown in FIG. 4), (2) a service for providing a list of installed and consumable MDDS cubes to the MDDS clients 235, (3) a service for transmitting MDDS cube definitions to the MDDS clients 235, (4) a service for transmitting a portion of or all of the data and/or data attributes of MDDS cubes to the MDDS clients 235 (as shown by MDDS cubes 415), etc. Similar to the cube viewer 220, the web services module 405 provides an MDX query language, an OLE DB API, XMLA, or a combination of these techniques and/or any other technique for the MDDS clients 235 to consume MDDS cubes.

Different embodiments implement the MDDS client differently. In some embodiments, the MDDS client is a stand-alone application, is integrated into another application, or is implemented through a plug-in component (e.g., for a web browser). The MDDS client of some embodiments might be implemented as part of an operating system. Furthermore, in some embodiments, the MDDS client is distributed according to a server-based model. In a thin client solution, some or all of the logic and/or processing is performed on a server while a user interacts with a client application via a separate client machine connected to the server. An example of the thin client would be a low-end computer terminal whose sole function is to provide a graphical user interface to the end-user. On the other hand, for a thick client solution, some or all of the logic and/or processing (e.g., for viewing MDDS cubes) is performed by on the client machine.

Figure 5:
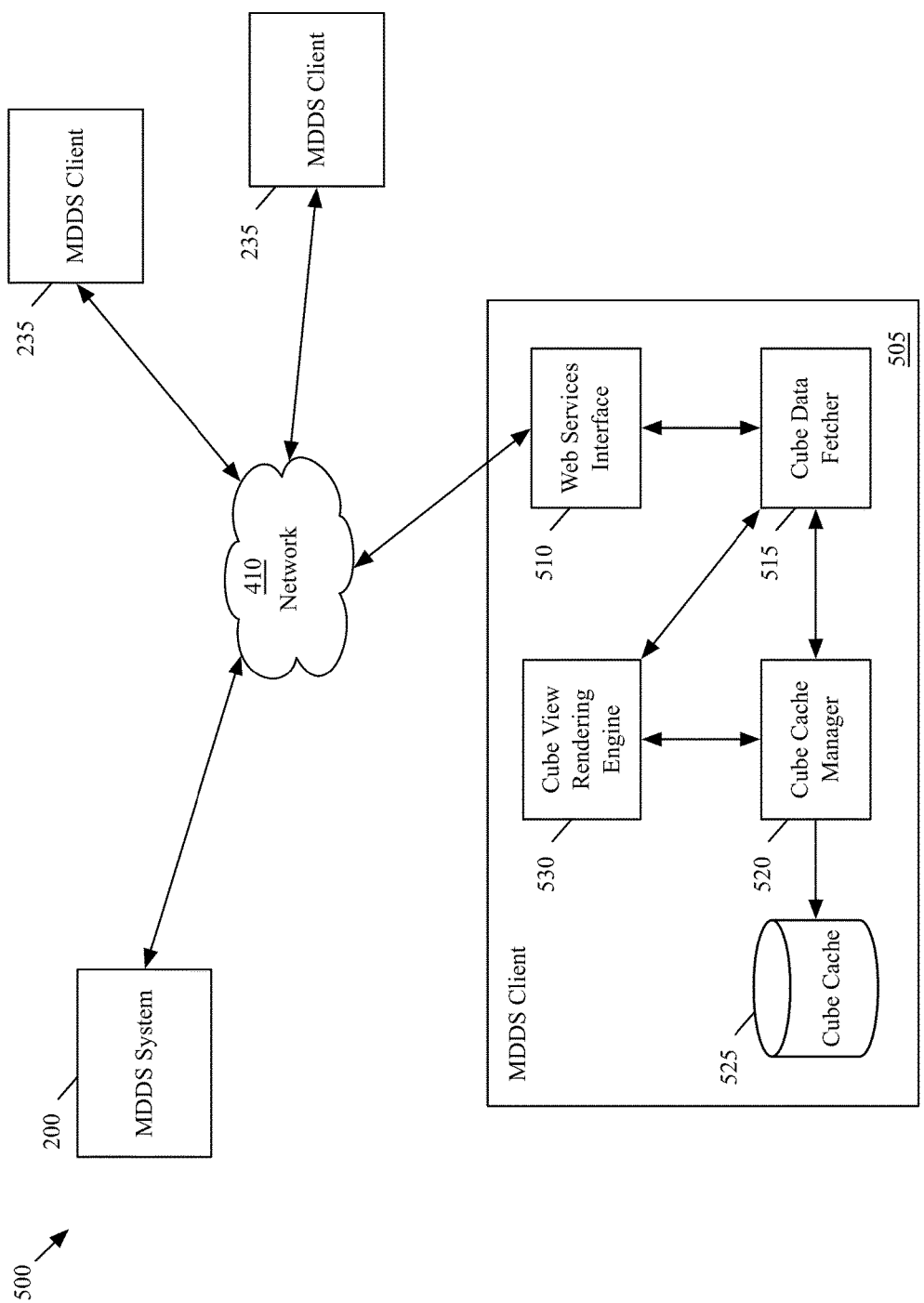
FIG. 5 conceptually illustrates an MDDS system and a block diagram of an MDDS client according to some embodiments of the invention.

Different embodiments use different MDDS clients. FIG. 5 illustrates an example of one MDDS client 505 that is used in some embodiments. As shown, the MDDS client 505 includes a web services interface 510, a cube data fetcher 515, a cube cache manager 520, a cube cache 525, and a cube view rendering engine (CVRE) 530.

The cube data fetcher 515 receives a cube definition through the web services interface 510. The cube definition includes a metadata (e.g., dimensions, measures) that specifies a configuration of a multidimensional cube. In some embodiments, the cube data fetcher 515 receives the cube definition based on a request from the CVRE 530. For example, based on user input, the CVRE 530 of some embodiments directs the cube data fetcher 515 to retrieve the cube definition from a data source (not shown) in the MDDS system 200. In some embodiments, the cube definition is retrieved from a data storage that stores the definition's corresponding multidimensional cube.

Once the cube definition is received, the cube data fetcher 515 sends the cube definition to the CVRE 530 or stores the cube definition so that it will be available for the CVRE 530. The cube data fetcher 515 also creates a cube axes configuration based on the received cube definition. In some embodiments, the cube data fetcher 515 creates the cube axes configuration based on a user interfacing with a display that is generated by the CVRE 530. For example, the CVRE 530 of some embodiments displays a set of selectable user interface items for entities (e.g., dimension attributes, measures) associated with the multidimensional cube. The user can then select one or more of these items to create the cube axes configuration.

The cube data fetcher 515 formulates one or more multidimensional database queries using the cube axes configuration. In addition, the cube data fetcher 515 sends the cube axes configuration to the CVRE 530 or stores the cube definition so that it will be available for the CVRE 530. In some embodiments, the CVRE 530 uses the cube axes configuration to display a representation of the cube axes configuration. This allows an end-user to see which entities (e.g., dimensions, measures) are included in the cube axes configuration. In some embodiments, the cube axes configuration is presented on a display such that the user can also see the relationship between entities in the cube axes configuration. Several examples of creating and displaying such a cube axes configuration are described in further detail in U.S. patent application Ser. No. 13/269,559, filed Oct. 8, 2011, entitled "Searching and Browsing a Multidimensional Data Storage", with the Ser. No. 13/269,559. This application is hereby incorporated by reference.

Based on the cube axes configuration, the client 505 generates a query to retrieve cube data from the MDDS that stores a particular cube. For instance, in some embodiments, the cube data fetcher 515 might determine that a subset of cube data is required to display a particular cube view (e.g., a view requested by a user). The cube data fetcher 515 might determine that a data result set for a set of entities (e.g., dimensions, measures) defined in the cube axes configuration is required to display the cube view. To make this determination, the cube data fetcher 515 of some embodiments interfaces with the cube cache manager 520. For example, the cube data fetcher 515 may send, based on the cube axes configuration, one or more requests to the cube cache manager 520 in order to determine what cube data needs to be downloaded.

Based on a request from the cube data fetcher 515, the cube cache manager 520 determines whether a particular set of cube data (e.g., for a set of entities in the cube axes configuration) is available in the cube cache 525. The cube cache manager 520 of some embodiments makes this determination by accessing or the cube cache 525. In some embodiments, the cube cache 525 is a storage area (e.g., memory space, disk storage space) that stores cube data. In some embodiments, the cube cache 525 has a particular storage structure or format (e.g., an XML file). Several examples of the cube cache of some embodiments are described in further detail in U.S. patent application Ser. No. 13/269,559, entitled "Searching and Browsing a Multidimensional Data Storage".

After accessing the cube cache 525, the cube cache manager 520 provides input to the cube data fetcher 515. This input allows the cube data fetcher 515 to determine whether to execute a query against the multidimensional database for a particular set of data. Once a determination is made on what cube data is not present in the cache and needs to be downloaded, the cube data fetcher 515 generates a query. Specifically, the query is constructed for data that is not currently stored in the cube cache 525. For example, the cube data fetcher 515 may formulate a query that requests a data result set for several of the entities included in the cube axes configuration but not all of the entities. The cube data fetcher 515 retrieves cube data based on the queries. In some embodiments, the cube data fetcher 515 may generate and send several queries to retrieve the desired cube data from the multidimensional database.

The cube data fetcher 515 queries the multidimensional database through a network connection over the network 410 and receives cube data that satisfies the queries in return. The cube data fetcher 515 then parses the query result to extract cube data from the query result set. It then forwards the received cube data to the cube cache manager 520, which in turn stores the cube data into the cube cache 525. The storing of the extracted cube data in the cube cache 525 allows the cube cache manager 520 to access and retrieve the cube data from the cube cache 525 at a later time.

The cube data fetcher 515 of some embodiments also extracts metadata from the query result set and updates the cube axes configuration. This allows the axes configuration to be up to date to process subsequent interactions with the presented cube view(s). Several examples of a cube axes configuration being dynamically populated with metadata based on a result set are described in U.S. patent application Ser. No. 13/269,559, entitled "Searching and Browsing a Multidimensional Data Storage".

The CVRE 530 receives cube data from the cube cache manager 520 or from the cube cache 525. In some cases, the cube data includes other data stored in the cube cache 525 in addition to the cube data just received from the cube data fetcher 515. From the received or retrieved cube data, the CVRE 530 then generates a display of one or more cube views. In some embodiments, the CVRE generates a cube view by not only using the cube data, but also by using the axes configuration data and the cube definition data.

CVRE 530 of some embodiments displays the cube view as an interactive matrix. A user of the MDDS client 505 can interact with this matrix to quickly extrapolate a particular view of the underlying cube. In conjunction with, or instead of the interactive matrix, the CVRE 530 of some embodiments generates other items such as charts (e.g., pie charts, bar charts), graphs, tables, lists, etc. Additional details and explanation of MDDS clients and their generation of cube views are described in U.S. patent application Ser. No. 13/269,559, entitled "Searching and Browsing a Multidimensional Data Storage".

Figure 6:
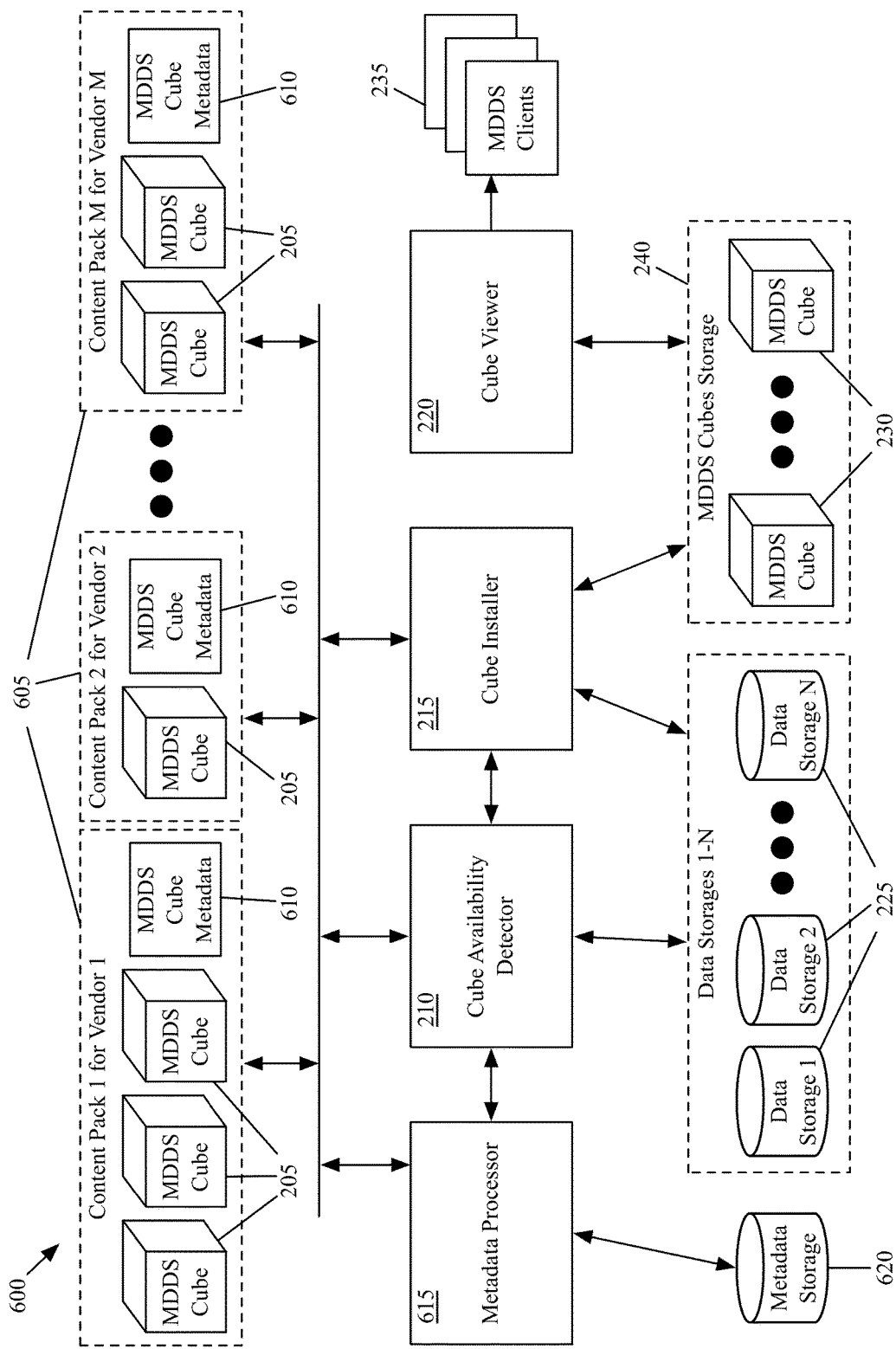
FIG. 6 conceptually illustrates an MDDS system of some embodiments.

The figures described above illustrate MDDS systems that can manage MDDS cubes defined by different authors for different products offered by different vendors. In some embodiments, the MDDS system utilizes different mechanisms to manage the cubes. For instance, the MDDS system of some such embodiments manages MDDS cubes by employing predefined packages called content packs that each includes MDDS cube definitions and metadata associated with the MDDS cube definitions. FIG. 6 conceptually illustrates an example of such an MDDS system 600. The MDDS system 600 is similar to the MDDS system 200 except the MDDS cube definitions 205 are grouped in terms of content packs 605. In addition, the MDDS system 600 further includes a metadata processor 615 and a metadata storage 620.

The content packs 605 facilitate the MDDS system 600 in managing the MDDS cubes. In the example illustrated in FIG. 6, each content pack 605 includes several MDDS cube definitions 205 that are defined for products (e.g., same products or different products) of one vendor. However, the system 600 of some embodiments also manages content packs that include MDDS cubes defined for the different products of different vendors. As shown, each content pack 605 includes a set of MDDS cube definitions 205 and MDDS cube metadata 610. In some embodiments, the content packs 605 are each implemented as a set of files (e.g., a Microsoft .NET® assembly, a ZIP file, etc.).

The MDDS cube metadata 610 in each content pack 605 describes the MDDS cube definitions 205 included in the content pack 605. As noted above, an MDDS cube definition 205 of some embodiments specifies data (e.g., measures) for an MDDS cube, data attributes (e.g., dimensions) for categorizing the data along a set of dimensions, and a set of data sources that contains the data and the data attributes. Some embodiments implement each of the MDDS cube metadata 610 of each content pack 605 as file (e.g., an extended markup language (XML) file).

In addition to the metadata mentioned above, the MDDS cube metadata 610 of some embodiments further specifies (e.g., in a content map) a list of relationships (e.g., data dependencies) among the data, data attributes, and data sources of a particular MDDS cube definition 205. For example, the MDDS cube metadata 610 may specify relationships that are expressed in terms of single dependencies. A single dependency of some embodiments is a relationship that specifies (1) two definition components and (2) a dependency between the two definition components. As an example, a relationship that specifies that definition component A and dependent on definition component B is single dependency. Additional examples of single dependencies include (1) a relationship that specifies a portion of the specified data for an MDDS cube is dependent on a data source in the set of data sources and (2) a relationship that specifies a data attribute is dependent on and a data source in the set of data sources.

Alternatively, or in conjunction with single dependencies, the MDDS cube metadata 610 of some embodiments may specify relationships that are expressed in terms of multiple dependencies. A multiple dependency of some such embodiments is a relationship that specifies (1) multiple definition components (e.g., more than 2) and (2) multiple dependencies between the multiple definition components. A relationship, for example, that specifies definition component X is dependent on definition component Y, which is in turn dependent on definition component Z, is a multiple dependency. The list of relationships described above is referred to below as a content map.

The metadata processor 615 manages and processes the MDDS cube metadata 610 included in the content packs 605. For example, the metadata processor 615 stores the MDDS cube metadata 610 included in the content packs 605 in the metadata storage 620. In some embodiments, the metadata processor 615 stores the MDDS cube metadata 610 included in a particular content pack 605 in the metadata storage 620 when the MDDS system 600 receives the particular content pack 605.

The metadata processor 615 of some embodiments accesses the MDDS metadata stored in the metadata storage 620 to generate a dependency map that links all the single dependencies specified for the MDDS cube definitions included in a particular content pack 605 to form a single list of dependencies for the particular content pack 605. In other words, the dependency map does not include more than one representation of a particular MDDS definition component. For example, if an MDDS cube definition 205 specifies that (1) a dimension A is dependent on a data storage X and (2) a dimension B is dependent on the data storage X, the dependency map includes one representation of the data storage X, dimension A, and dimension B, and links between the representation of the data storage X and the representations of dimension A and dimension B.

Alternatively, or in conjunction with generating dependency maps for MDDS cube definitions included in a particular content pack 605, the metadata processor 615 of some embodiments generates a combined dependency map (also referred to as a unified content map) that combines the dependencies from the dependency maps of each of the content packs 605. As such, the combined dependency map provides a single dependency map that includes the dependencies specified for each of the MDDS cube definitions across all the content packs 605. This allows the MDDS system 600 to manage MDDS cubes that are defined with data that spans different data storages of different products from the same or different vendors. In some embodiments, the metadata processor 615 stores generated dependency maps in the metadata storage 620.

In some embodiments, the cube availability detector 210 determines which MDDS cubes are available and which MDDS cubes are not available based on a combined dependency map. For example, to determine whether a particular MDDS cube is available, the cube availability detector 210 examines the combined dependency map and an MDDS cube definition of the MDDS cube to identify the dependencies for the MDDS cube defined. The cube availability detector 210 then determines whether the identified dependencies exist and, based on such determination, determines whether the MDDS cube is available or not.

The metadata storage 620 stores the MDDS cube metadata 610 that the metadata storage 620 receives from the metadata processor 615. In addition, the metadata storage 620 of some embodiments may store dependency maps that the metadata storage 620 receives from the metadata processor 615. The metadata storage 620 of some embodiments is implemented as a relational database. In some such embodiments, the metadata storage 620 is only used by the metadata processor 615 while, in other such embodiments, the metadata storage 620 is part of another storage that is used by the MDDS system 600 and/or other components in the MDDS system 600.

In the example illustrated in FIG. 6, the content packs include MDDS cube definitions of MDDS cubes for a single data storage. The content packs in some embodiments, however, may be defined to include MDDS cube definitions of MDDS cubes for more than one data storage. Moreover, while FIG. 6 shows content packs that include MDDS cube definitions and MDDS cube metadata, the content packs of some embodiments may include additional and/or different things, as described below.

In conjunction with provisioning MDDS cubes for MDDS clients to dynamically interact with the MDDS cubes (e.g., by performing slicing, dicing, drilling up, drill down, or pivoting operations on the MDDS cubes), the MDDS system of some embodiments provisions static presentations of MDDS cubes. Presentation objects are one type of static presentations of MDDS cubes. As noted above, a presentation object of some embodiments is a predefined representation of a perspective of one or more MDDS cubes. The presentation object of some such embodiments includes a set of charts, graphs, reports, and/or tables, which are generated based on the perspective of the set of MDDS cubes that define the presentation object. As such, in some such embodiments, a presentation object definition specifies a set of MDDS cubes and a representation of a perspective of the MDDS cubes. In addition, the presentation object definition may further specify a set of charts, graphs, reports, and/or tables that are generated based on the perspective of the MDDS cubes.

Figure 7:
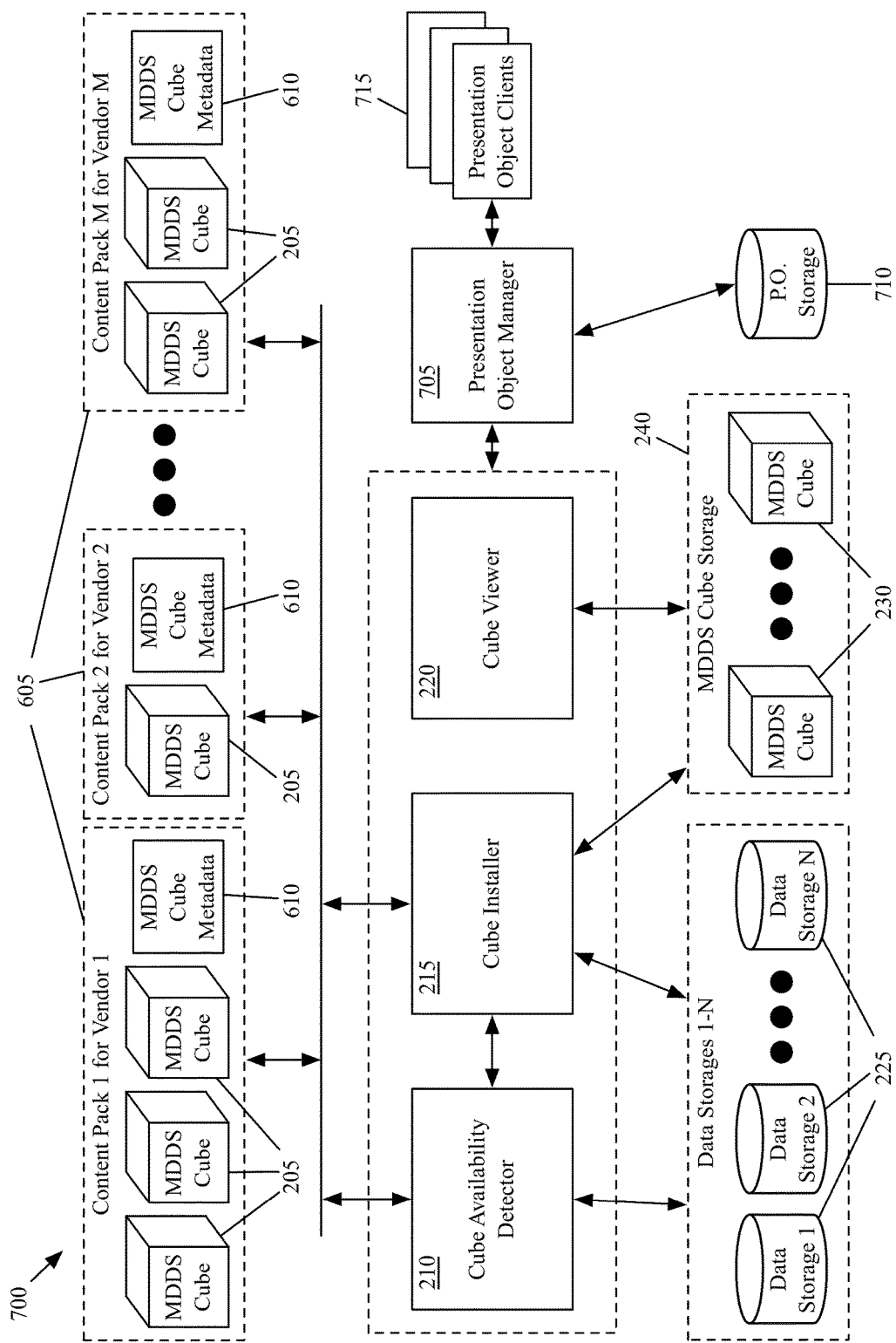
FIG. 7 conceptually illustrates an MDDS system of some embodiments.

FIG. 7 conceptually illustrates an example of an MDDS system 700 that manages presentation objects associated with MDDS cubes. The MDDS system 700 is similar to the MDDS system 600 except the MDDS system 700 shown in FIG. 7 includes a presentation object manager 705, a presentation object storage 710, and presentation object clients 715. Also, FIG. 7 does not show the metadata processor 615, the metadata storage 620, and the MDDS clients 235 for purposes of explanation and simplicity.

The presentation object manager 705 manages presentation objects in the MDDS system 700. For instance, the presentation object manager 705, in some embodiments, determines the statuses (e.g., not available, available, and available and installed) of presentation objects in the MDDS system 700. In some embodiments, the presentation object manager 705 also installs, uninstalls, and generates presentation objects as well as provisions presentation objects to the presentation object clients 715 for consumption of the presentation objects. For some or all of the tasks, the presentation object manager 705 uses a presentation object server that generates, manages, stores, and provisions the presentation objects.

In some embodiments, the presentation object manager 705 also stores the presentation objects and information associated with the presentation objects (e.g., presentation object definitions, presentation object server information, etc.) in the presentation object storage 710. The presentation object storage 710 of some embodiments is implemented as a relational database. In some such embodiments, the presentation object storage 710 is only used by the presentation object manager 705 while, in other such embodiments, the presentation object storage 710 is part of another storage (e.g., the metadata storage 620) that is used by the MDDS system 700 and/or other components in the MDDS system 700.

In some embodiments, the presentation object clients 715 may be any type of entity that is configured to consume presentation objects (e.g., charts, graphs, reports, and tables). Examples of presentation object clients include business intelligence applications that render reports, dashboards, and scorecards, word processing applications, spreadsheet applications, presentation preparation application, applications that interpret report definition language (RDL), etc.

The above section describes examples and embodiments of MDDS cubes and MDDS systems. In several embodiments described below, the MDDS cubes and MDDS systems are multidimensional database (MDDB) cubes and MDDB systems. However, one or ordinary skill in the art will recognize that the system of other embodiments handles non-database storages and cubes and hence are and MDDS systems.

Furthermore, in the discussion below, the MDDB cubes are implemented as OLAP cubes in some embodiments. However, in different embodiments, the MDDB cubes are implemented as different types of MDDS cubes other than OLAP cubes. Also, many of the systems described above and below are MDDS/MDDB systems for MDDS/MDDB cubes, one of ordinary skill in the art will realize that these systems can be implemented for OLAP cubes. Moreover, many instances above and below of this application refer to an MDDS/MDDB cube as just a cube. Similarly, an MDDS/MDDB system may be referred to as simply a system. In addition, when an entity (e.g., MDDS/MDDB cubes and presentation objects) is described in this application as available, the entity is available for installation. In some cases, this includes available entities that are already installed.

Several more detailed embodiments are described below. Section I describes details of the content pack of some embodiments. Section II then describes details of the MDDB system of some embodiments. Section III describes details of the MDDB system of some embodiments that manages MDDB cubes through the use of content packs according to some embodiments of the invention followed by Section IV, which describes details of federated MDDB cubes according to some embodiments of the invention. Finally, Section V describes an electronic system with which some embodiments of the invention are implemented.

I. Example MDDB System

The following section describes various aspects of the MDDB system of some embodiments. However, many sections and figures in this application involve MDDB cubes so this section will first describe MDDB cubes. Similar to an MDDS cube of some embodiments discussed above, an MDDS cube of some embodiments is a multidimensional data structure that facilitates quick viewing of data from a set of data sources.

Figure 8:
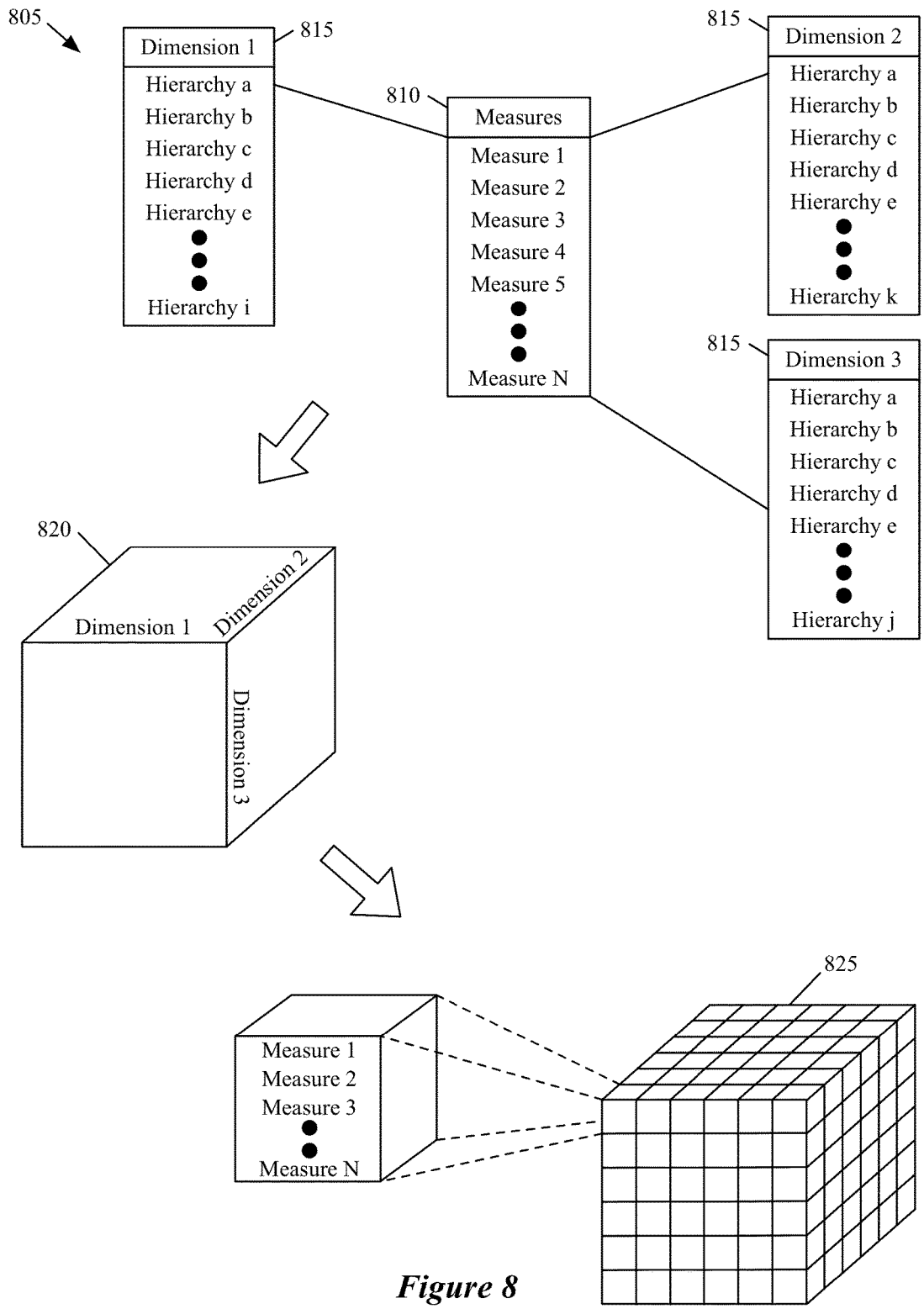
FIG. 8 conceptually illustrates an example MDDB cube according to some embodiments of the invention.

FIG. 8 conceptually illustrates an example MDDB cube according to some embodiments of the invention. Specifically, FIG. 8 illustrates three conceptual representations of the example MDDB cube. The first conceptual representation of the example MDDB cube is in the form of a schema 805, the second conceptual representation of the example MDDB cube is in the form of a three-dimensional cube 820, and the third conceptual representation of the example MDDB cube is in the form of another three-dimensional cube 825.

As mentioned above, an MDDB cube of some embodiments may be defined by an MDDB cube definition that specifies data for the MDDB cube, data attributes for categorizing the data along a set of dimensions, and a set of data sources that contains the data and the data attributes. For some of these embodiments, an MDDB cube may be defined by a set of measures and a set of dimensions. In some embodiments, a measure is a numeric value and a dimension is metadata for categorizing a set of measures along the dimension. For example, a set of measures for an MDDB cube may represent sales data (e.g., quantity sold and profits) and a set of dimensions for the MDDB cube may represent products, locations, and time. Different embodiments may define MDDB cubes to have any number of different measures and any number of different dimensions.

In the first representation of the example MDDB cube, the schema 805 illustrates the relationship between the measures 810 and the dimensions 815 of the example MDDB cube. In some embodiments, the schema 805 is referred to as a star schema. As shown, dimension 1 is associated with the measures 810 and includes hierarchies a-i. Dimension 2 is associated with the measures 810 and includes hierarchies a-k. Dimension 3 is associated with the measures 810 and includes hierarchies a-j. In some embodiments, the measures 810 and the dimensions 815 are derived from tables in a relational database (e.g., a fact table for the measures 810 and a set of dimension tables for the dimensions 815).

A hierarchy of a dimension specifies a set of hierarchical parent-child relationships for filtering a set of measures through varying levels of granularity along the dimension. For example, a time dimension may include a hierarchy that specifies a month, quarter, and year relationship. Another example of a time dimension hierarchy specifies a week, day, and hour relationship. By filtering the measures with varying levels of granularity with the hierarchies, the dimension can be viewed with varying levels of granularity along the dimension. Further, different embodiments may define dimensions with any number of different hierarchies to categorize the measures.

While the first representation conceptually illustrates a schema of the example MDDB cube, the second representation of the example MDDB cube shows the cube 820, which represents the example MDDB cube defined by the schema 805, and a conceptual illustration of the dimensions 815 of the example MDDB cube. As illustrated in FIG. 8, each dimension of the cube 820 corresponds to a dimension 815 defined in the schema 805. The example MDDB cube may be viewed along any number of the dimensions 815 of the cube 820. Also, for a particular dimension 815, the example MDDB cube may be viewed according to the hierarchies specified for the particular dimension 815. As such, the dimensions 815 allow the measures 810 of the example MDDB cube to be filtered and viewed in a variety of different ways.

Another cube 825 is shown in the third representation of the example MDDB cube. The cube 825, which represents the example MDDB cube defined by the schema 805, conceptual depicts the measures 810 of the example MDDB cube. In particular, the cube 825 shows the relationships between the measures 810 and dimensions 815 of the example MDDB cube. As illustrated, the cube 825 is divided into sections along each dimension 815 (not shown) of the cube 825. Each of the resulting unit cubes includes all of the measures 810, as indicated by a detailed enlargement of a portion the cube 825 (which represents a portion of the example MDDB cube).

While the example MDDB cube illustrated in FIG. 8 is defined as having three dimensions, one of ordinary skill in the art will recognize that MDDB cubes may be defined by any number of dimensions. The example MDDB cube discussed in FIG. 8 is depicted as having three dimensions for purposes of explanation and clarity.

Figure 9:
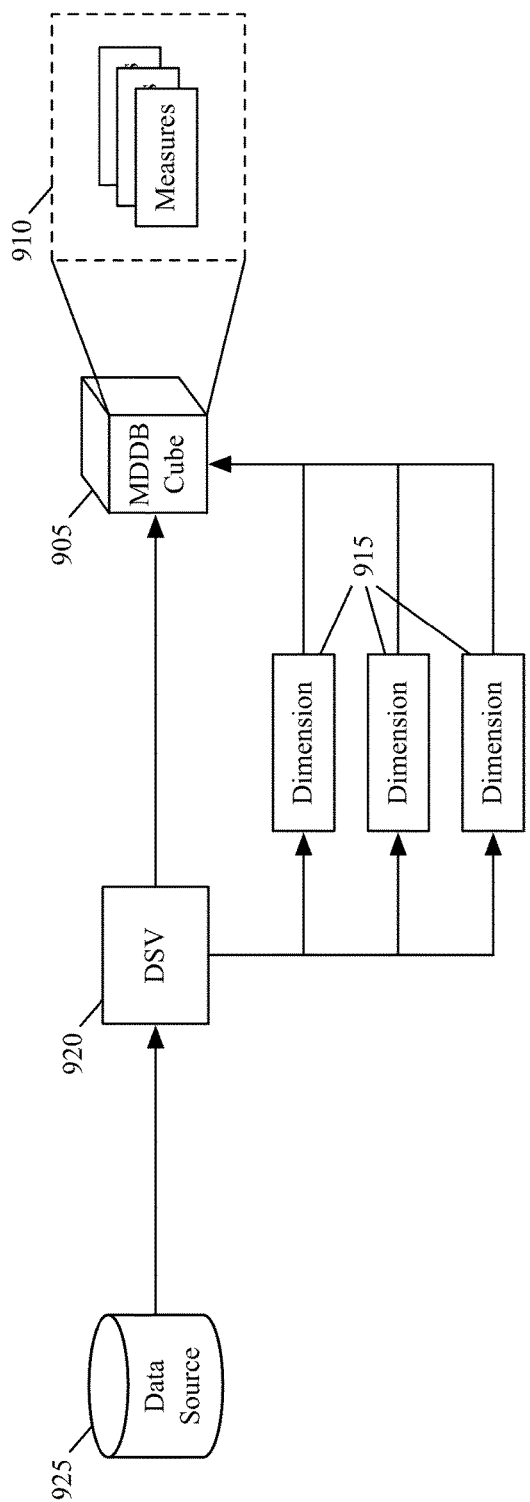
FIG. 9 conceptually illustrates data relationships of an MDDB cube according to some embodiments of the invention.

FIG. 9 conceptually illustrates data relationships of an MDDB cube 905 according to some embodiments of the invention. This figure shows the MDDB cube 905, a set of measures 910, a set of dimensions 915, a data source view (DSV) 920, and a data source 925. As discussed above, an MDDB cube may be defined by a set of measures and a set of dimensions. In this example, the MDDB cube 905 is defined by the set of measures 910 and the set of dimensions 915.

The DSV 920 of some embodiments is an object that provides a logical view of data in the data source 925. The logical view of the DSV 920 includes a set of data source objects (e.g., tables, views, stored procedures, and queries) that provide data from the data source 925. Thus, from the perspective of the MDDB cube 905 and the set of dimensions 915, the DSV 920 provides a single view of data even though the DSV 920 might include any number of tables, views, stored procedures, and/or queries that derives data from the data source 925. As shown in FIG. 9, the set of dimensions 915 are derived from the DSV 920. Specifically, the data that defines the set of dimensions 915 is provided by the DSV 920. In some embodiments, the data that defines the set of measures 910 is also provided by the DSV 920. In other words, the set of dimensions 915 and the set of measures 910 are dependent on the DSV 920 for data.

Data source 925 stores data from which the DSV 920 derives its data. That is, the DSV 920 depends on the data source 925 for the data. The data source 925 may be implemented differently in different embodiments. For example, the data source 925 may be implemented as a database (e.g., a relational database, a hierarchical database, a flat file database, or any other type of database for storing data). The data source 925 may also be implemented as a file (e.g., an XML file, an spreadsheet file, a comma-separated values (CSV) file, a text file, etc.). The data source 925 may also be implemented as any other type of object that is a source of data.

A. Multiple Data Sources

Many of the figures described above illustrate an MDDB system that manages multiple data sources for multiple MDDB cubes. The following section describes one technique employed by the MDDB system of some embodiments to manage multiple data sources for multiple MDDB cubes. This technique involves providing a layer of abstraction between the multiple data sources and the MDDB system. In this way, from the perspective of the MDDB system, it appears that a single data source exists when, in fact, there are multiple data sources underlying the single data source.

Figure 10:
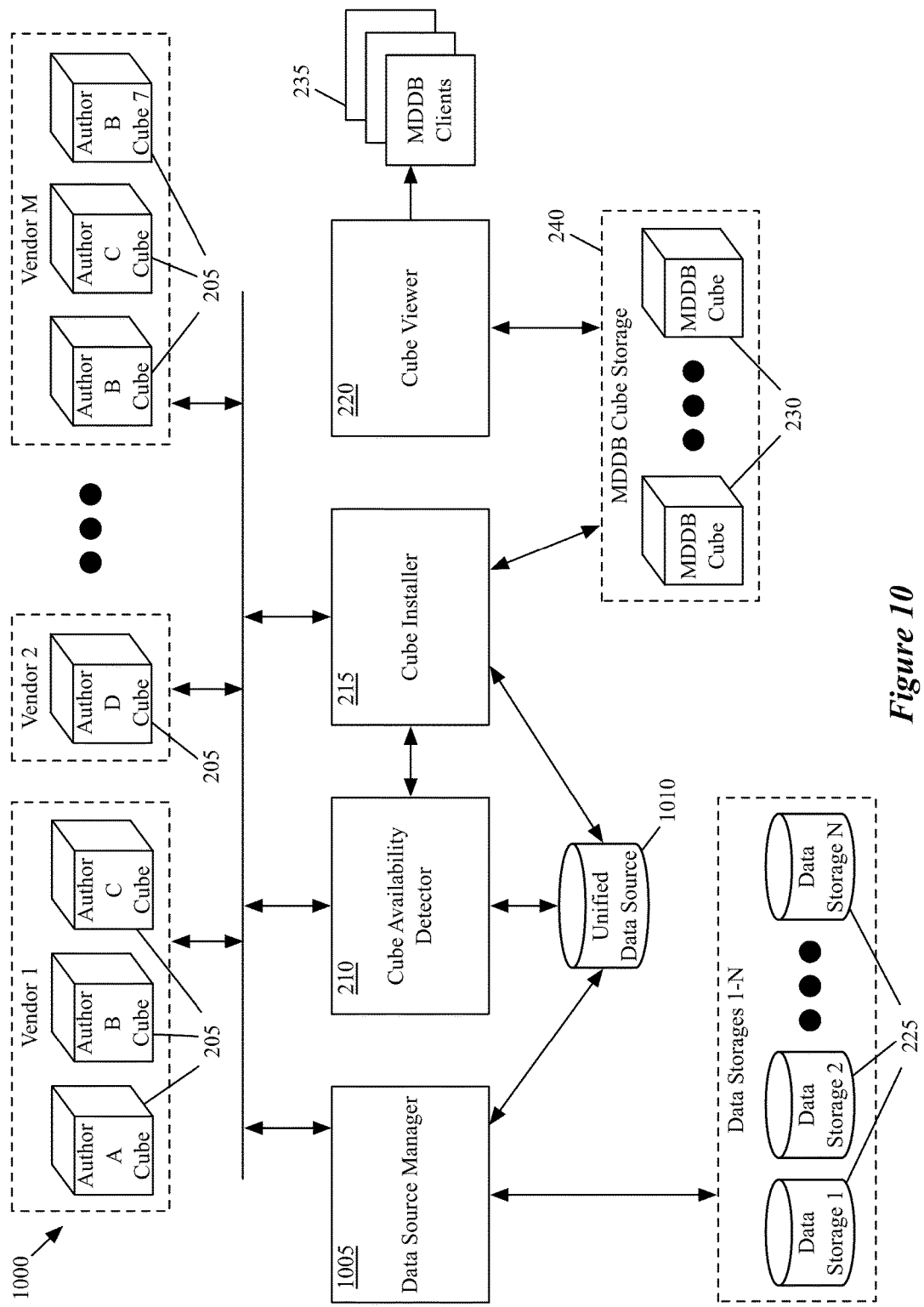
FIG. 10 conceptually illustrates an MDDB system that provides a unified data source according to some embodiments of the invention.

FIG. 10 conceptually illustrates an MDDB system 1000 that provides a unified data source 1010 according to some embodiments of the invention. As shown, the MDDB system 1000 is similar to the MDDB system 200 shown in FIG. 2 except the MDDB system 1000 illustrated in FIG. 10 further includes a data source manager 1005 and the unified data source 1010.

In some embodiments, the unified data source 1010 is a collection of data source objects that presents a single source of data to the MDDB system 1000. A data source object, in some embodiments, is a representation of data in a data source (e.g., a data storage 225). Examples of data source objects include tables, views, database functions, stored procedures, and queries. A view of some embodiments includes a stored query that is accessible as a virtual table composed of the result of the query. Thus, the view of some such embodiments may represent a subset of data stored in a table of a data source. A database function, in some embodiments, is a built-in function provided by a data source that may be performed on the data source. On the other hand, a database function in some embodiments is a user-defined function for performing functions (e.g., querying, updating, or deleting data) on a set of data sources. A database function is executed when data represented by the database function is requested, in some embodiments. The unified data source 1010 of some embodiments may also include other data source objects.

The unified data source 1010 of some embodiments may be implemented as a database. For instance, the unified data source 1010 may be implemented as a relational database (e.g., Microsoft SQL Server®, MySQL®, IBM DB2®, Oracle Database®, etc.) or another type of database. The unified data source 1010 may be implemented as a combination of different types of databases, or as any other type of object that serves as a source of data.

The data source manager 1005 manages the data sources (i.e., the data storages 225) of the MDDB system 1000. To manage the data sources of the MDDB system 1000, the data source manager 1005 may establish connections to each of the data sources in order to verify that the data source is valid (e.g., the data source did not fail, is not offline, etc.). In some embodiments, the data source manager 1005 maintains connections to each of the data sources.

Furthermore, the data source manager 1005 handles the provisioning of the unified data source 1010, which provides the layer of abstraction between the data sources and the MDDB system. For instance, the data source manager 1005 identifies each of the data sources in the MDDB system 1000 and creates data source objects that represent the data in the data source. The data source manager 1005 then provisions the unified data source 1010 to include the created data source objects.

In some embodiments, the data source manager 1005 may handle requests for data in the unified data source 1010. For example, when a request for data in the unified data source 1010 is represented by a database function, the data source manager 1005 performs the database function on the set of data sources that corresponds to the database function. For data in the unified data source 1010 that is represented by stored procedures and queries, the data source manager 1005 may handle them in a similar fashion.

When changes occur to any underlying data source of the unified data source 1010, the data source manager 1005 propagates those changes to the unified data source 1010. For instance, when a data source is added to the MDDB system 1000, the data source manager 1005 creates data source objects that represent data in the data source that was added and reprovisions the unified data source 1010 to include the created data source objects. On the other hand, when one of the data sources is removed from the unified data source 1010, the data source manager 1005 identifies the data source objects that represent data in the removed data source and reprovisions the unified data source 1010 to not include the identified data source objects.

The operation of the MDDB system 1000 will now be described. In particular, the following describes the operation of the data source manager 1005 when the unified data source 1010 is accessed (e.g., by the cube availability detector 210 or the cube installer 215).

The cube availability detector 210 may access the unified data source 1010 to determine whether or not a particular MDDB cube is available. The cube installer 215 may also access the unified data source 1010 to install MDDB cubes. In either case, the unified data source 1010 may receive a request for data in the unified data source 1010. The data source manager 1005 then processes the request.

The requested data may include data that is stored in the unified data source 1010 and data that is represented by data source objects (e.g., views, database functions, stored procedures, and queries) in the unified data source 1010. For requested data that is stored (e.g. in a table) in the unified data source 1010, the data source manager 1005 provides the requested data to the requestor. For requested data that is represented by data source objects in the unified data source 1010, the data source manager 1005 performs the appropriate action (e.g., performs a view query, executes a database function, performs a stored procedure, etc.) on the data sources that correspond to the data source objects.

Figure 11:
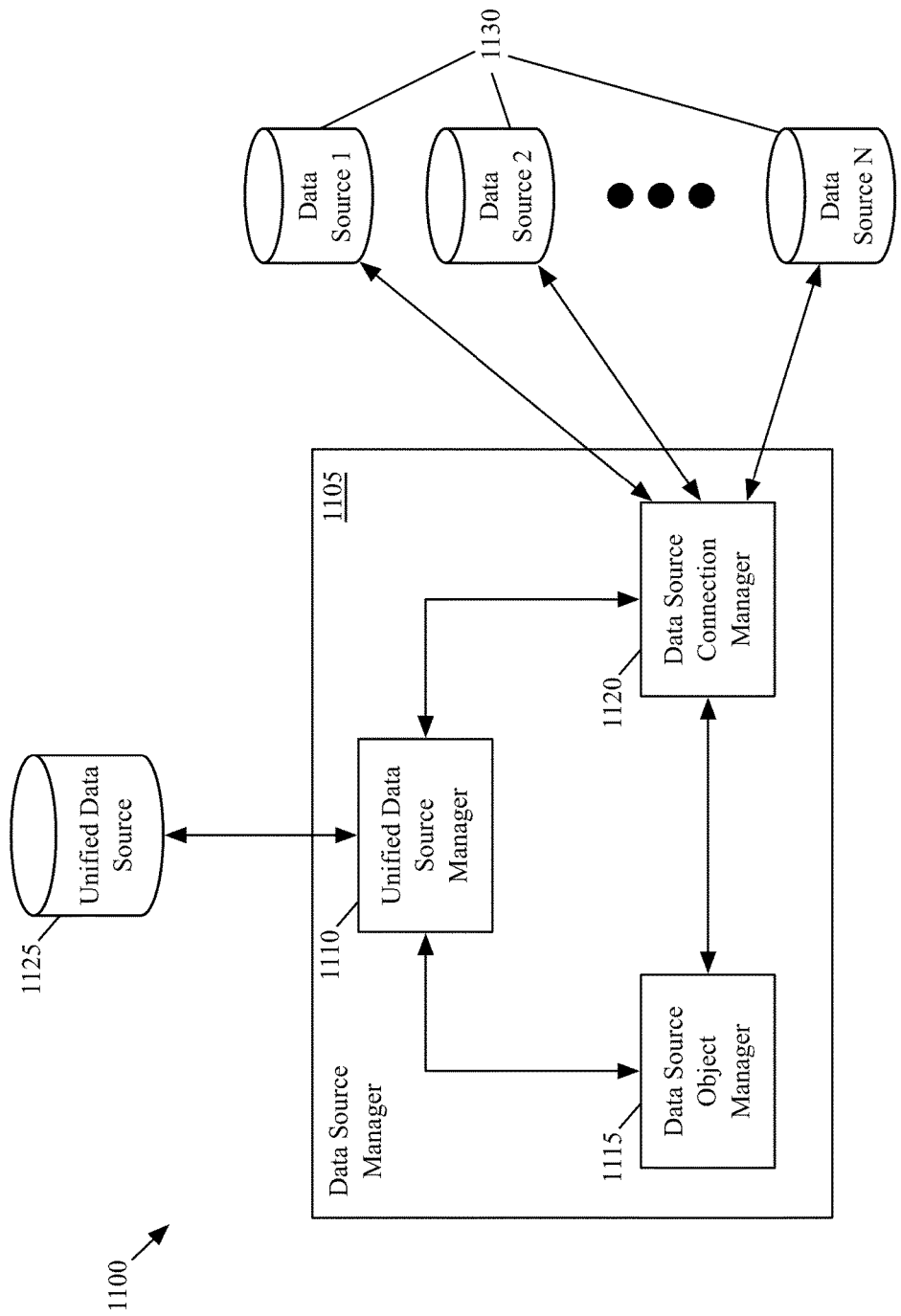
FIG. 11 conceptually illustrates a software architecture of a data source manager of some embodiments.

FIG. 11 conceptually illustrates a software architecture 1100 of a data source manager 1105 of some embodiments. In some embodiments, the data source manager 1005, which is described above by reference to FIG. 10, is implemented as the data source manager 1105. As illustrated in FIG. 11, the software architecture 1100 includes the data source manager 1105, data sources 1130, and a unified data source 1125. The data source manager 1105 manages the data sources 1130 and provisions a unified data source 1125 that serves as a layer of abstraction between the data sources 1130 and clients of the unified data source 1125.

The unified data source 1125 is similar to the unified data source 1010 previously described above by reference to FIG. 10. That is, the unified data source 1125 of some embodiments is a collection of data source objects that presents a single source of data (e.g., a unified data source). In some embodiments, the unified data source 1125 also includes other data source objects like tables, stored procedures, and queries, for example. In addition, the unified data source 1125 may be implemented as a database. For instance, the unified data source 1125 may be implemented as a relational database (e.g., Microsoft SQL Server®, MySQL®, IBM DB2®, Oracle Database®, etc.). The unified data source 1125 may also be implemented as another type of database or as any other type of object that serves as a source of data.

Each of the data sources 1130 stores data that is represented by data source objects and/or data that is stored in the unified data source 1125. Each of the data sources 1130 may be implemented in any number of different ways. For instance, a data source 1130 may be implemented as a database (e.g., a relational database, a hierarchical database, a flat file database, or any other type of database for storing data). The data source 1130 may also be implemented as a file (e.g., an XML file, an spreadsheet file, a comma-separated values (CSV) file, a text file, etc.). In addition, the data source 1130 may be implemented as a combination of databases and files, or as any other type of object that serves as a source of data. Additionally, the data sources 1130 may be different data storages, in some embodiments. For example, the data sources 1130 may include different instances of one data storage of one product from one vendor and/or include different instances of different data storages of different products from one vendor or different vendors.

As shown in FIG. 11, the data source manager 1105 includes a unified data source manager 1110, a data source object manager 1115, and a data source connection manager 1120. The data source connection manager 1120 handles the management of the data sources 1130. In some embodiments, the data source connection manager 1120 establishes connections to each of the data sources 1130 in order to verify that the data source is valid. In some embodiments, the data source connection manager 1120 maintains connections to the data sources 1130. In addition, the data source connection manager 1120 detects changes to the data sources 1130. For instance, the data source connection manager 1120 detects when a data source 1130 is removed (e.g., the data source 1130 fails). Also, the data source connection manager 1120 detects when a new data source 1130 is added.

The data source object manager 1115 is responsible for managing data source objects (also referred to as data access objects or database objects) for the unified data source 1125. In some embodiments, a data source object is a representation of data in a data source 1130. Examples of data source objects include tables, views, database functions, stored procedures, and queries. For a particular data source 1130, the data source object manager 1115 of some embodiments identifies a set of data source objects associated with the particular data source 1130. The data source object manager 1115 then notifies the unified data source manager 1110 about the identified data source objects so the unified data source manager 1110 can provision the unified data source 1125 to include the identified data source objects. In some of these embodiments, the data source object manager 1115 identifies the set of data source objects associated with the particular data source 1130 based on data source objects specified in a predefined list (e.g., a structured query language (SQL) script) that is associated with the particular data source 1130.

When changes occur to the data sources 1130, the data source object manager 1115 makes corresponding changes to the data source objects for the unified data source 1125. For instance, when the data source object manager 1115 receives notification from the data source connection manager 1120 that a new data source 1130 is added, the data source object manager 1115 identifies data source objects associated with the new data source 1130. The data source object manager 1115 then notifies the unified data source manager 1110 about these data source objects. In this way, the unified data source manager 1110 can, in turn, reprovision the unified data source 1125 to include the identified data source objects. In contrast, when the data source object manager 1115 receives notification from the data source connection manager 1120 that a data source 1130 is removed, the data source object manager 1115 identifies data source objects associated with the removed data source 1130 and notifies the unified data source manager 1110 about these data source objects. In response to the notification, the unified data source manager 1110 reprovisions the unified data source 1125 to not include the identified data source objects.

The unified data source manager 1110 manages the unified data source 1125. For instance, the unified data source manager 1110 provisions and maintains the unified data source 1125. In some embodiments, the unified data source manager 1110 receives notifications regarding data source objects from the data source object manager 1115. Based on a notification, the unified data source manager 1110 makes corresponding adjustments to the unified data source 1125. For example, when the unified data source manager 1110 receives a notification from the data source object manager 1115 to remove a set of data source objects, the unified data source manager 1110 (1) identifies the set of data source objects in the unified data source 1125 and (2) reprovisions the unified data source 1125 to not include the identified set of data source objects. On the other hand, when the unified data source manager 1110 receives a notification from the data source object manager 1115 to add a set of data source objects, the unified data source manager 1110 (1) generates the set of data source objects and (2) reprovisions the unified data source 1125 to include the set of data source objects.

In some embodiments, the unified data source manager 1110 is responsible for handling requests from clients for data in the unified data source 1125. For instance, when the data source manager 1110 receives a request for data in the unified data source 1125, the data source manager 1110 processes the data source object (e.g., performs a view query, executes a database function, performs a stored procedure, etc.) in order to provide the requested data.

Figure 12:
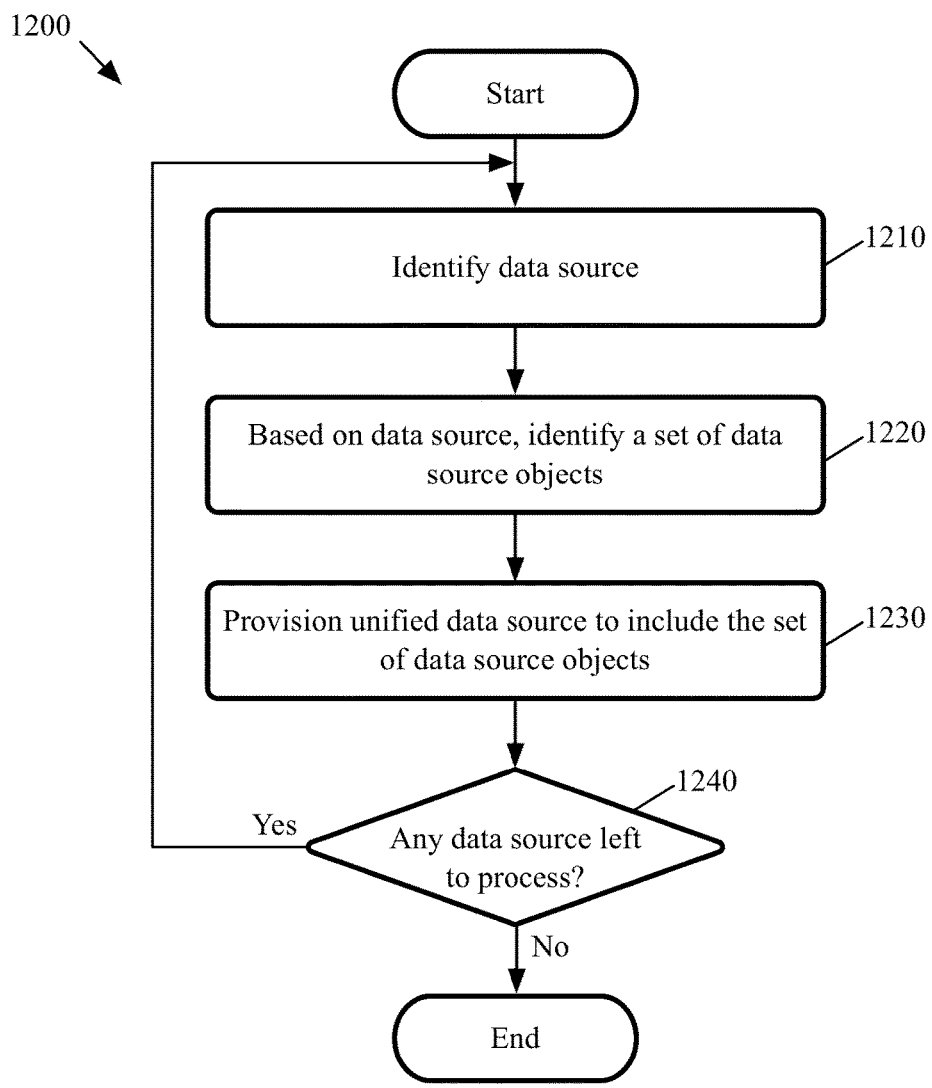
FIG. 12 conceptually illustrates a process of some embodiments for provisioning a unified data source.

The following describes the operation of the data source manager 1105 by reference to FIG. 12. In particular, FIG. 12 conceptually illustrates a process 1200 of some embodiments for provisioning the unified data source 1125. The process 1200 starts by identifying (at 1210) a data source 1130. In some embodiments, the data source connection manager 1120 identifies the data source 1130. In some embodiments, the process 1200 identifies the data source 1130 by establishing a connection to the data source 1130 in order to verify that the data source 1130 is valid.

Next, the process 1200 identifies (at 1220) a set of data source objects based on the identified data source 1130. In some embodiments, the data source object manager 1115 identifies the set of data source objects. The process 1200 of some embodiments identifies the set of data source objects based on data source objects specified in a predefined list (e.g., an SQL script) that is associated with the data source 1130.

The process 1200 then provisions (at 1230) the unified data source 1125 to include the set of data source objects. The unified data source manager 1110 performs the provisioning of the unified data source 1125 in some embodiments. To provision the unified data source 1125, the process 1200 in some embodiments generates the set of data source objects and then provisions the unified data source 1125 to include the generated set of data source objects.

Next, the process 1200 determines (at 1240) whether any data source 1130 is left to process. When the process 1200 determines that a data source 1130 is left to process, the process 1200 returns to 1210 to continue processing any remaining data sources 1130. When the process 1200 determines that no data source 1130 is left to process, the process 1200 ends.

While the process illustrated in FIG. 12 shows a particular order of operations for provisioning a unified data source, one of ordinary skill in the art will recognize that the operations do not necessarily have to be performed in the illustrated order. For instance, the process of some embodiments may perform the provisioning of the unified data source after all the data sources have been processed.

Figure 13:
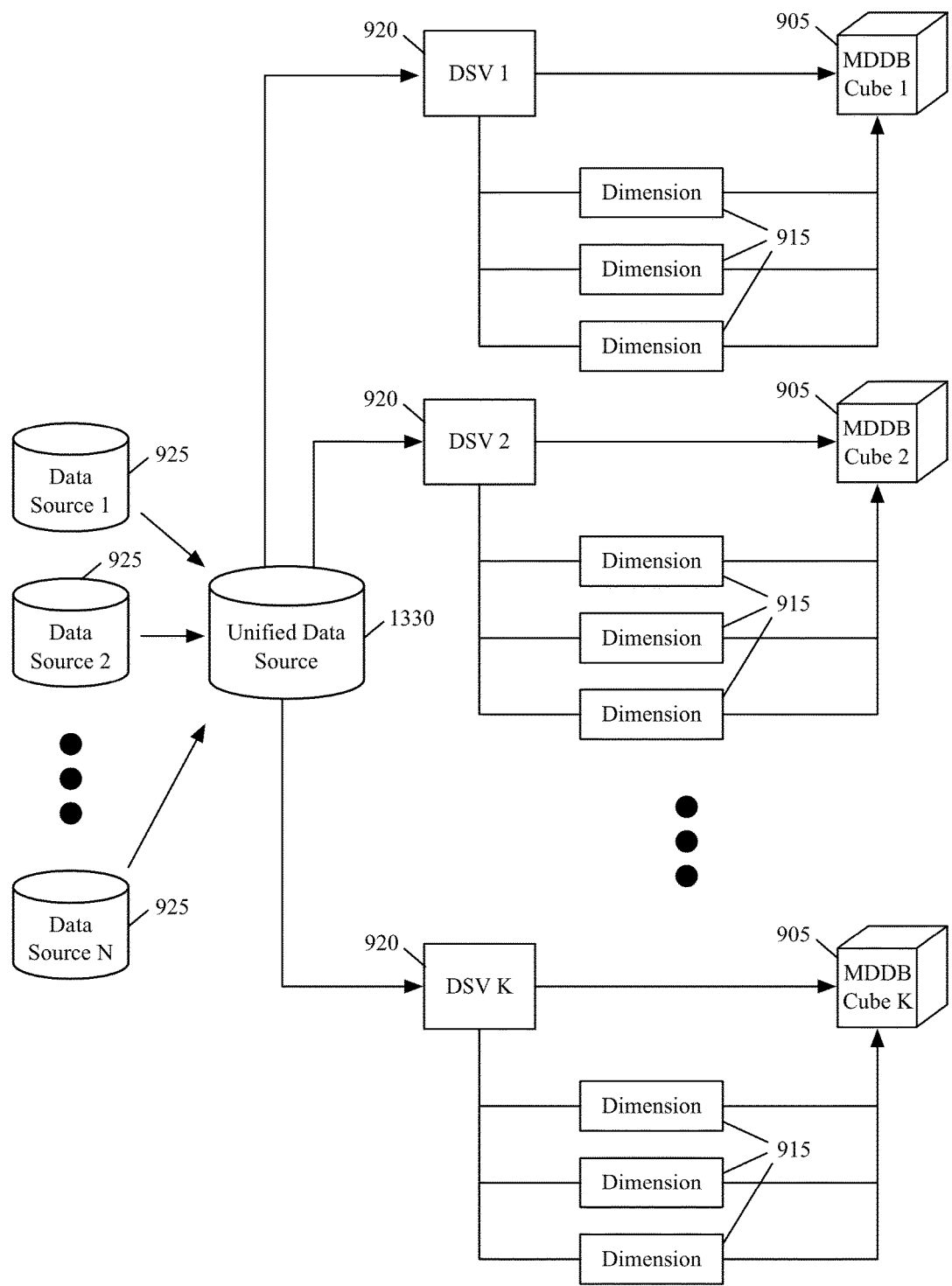
FIG. 13 conceptually illustrates data relationships of several MDDB cubes according to some embodiments of the invention.

As described above by reference to FIG. 9, some embodiments define a DSV of an MDDB cube to derive data from a single data source. The following figure illustrates a DSV of an MDDB cube that is defined to also derive data from a single unified data source that abstracts multiple underlying data sources from (DSVs of) the MDDB cubes. FIG. 13 conceptually illustrates data relationships of several MDDB cubes according to some embodiments of the invention. Specifically, this figure conceptually illustrates MDDB cubes defined by data in a unified data source.

As shown, FIG. 13 includes MDDB cubes 905, dimensions 915, DSVs 920, a unified data source 1330, and data sources 925. As noted above, an MDDB cube may be defined by a set of measures and a set of dimensions. For this example, each of the MDDB cubes 905 is defined by a set of measures (not shown) and a set of dimensions 915. Additionally, the data sources 925 may be different data storages, in some embodiments. For instance, the data sources 925 may include different instances of one data storage of one product from one vendor and/or include different instances of different data storages of different products from one vendor or different vendors.

Each of the DSVs 920 in this example is an object that provides a logical view of data in the unified data source 1330. The logical view of the DSV 920 includes a set of data source objects (e.g., tables, views, database functions, stored procedures, and queries) that provide data from the unified data source 1330. As shown in FIG. 13, each set of dimensions 915 are derived from a corresponding DSV 920. Specifically, the data that defines each set of dimensions 915 is provided by a corresponding DSV 920. In some embodiments, the data that defines the set of measures (not shown) is also provided by a corresponding DSV 920 (not shown). In other words, each set of dimensions 915 and each set of measures (not shown) are dependent on a corresponding DSV 920 for data.

In some embodiments, the unified data source 1330 is similar to the unified data source 1010 described above by reference to FIG. 10. For this example, the unified data source 1330 of some embodiments is a collection of data source objects that presents a single source of data to MDDB cubes 905. In addition, the unified data source 1330 provides a layer of abstraction between the data sources 925 and the MDDB cubes 905. This layer of abstraction hides the multiple data sources 925 that underlie the unified data source 1330. Therefore, from the perspective of the MDDB cubes 905, the MDDB cubes 905 derive data from a single data source. In this example, each DSV 920 derives its data from the unified data source 1330. In other words, the DSVs 920 each depends on the unified data source 1330 for their data.

B. Data Object Management

A number of figures discussed above describe a unified data source that can provide data from multiple data sources to MDDB cubes through a layer of abstraction between the multiple data sources and the MDDB cubes. However, in some embodiments, the unified data source may be used to provide data to more than just MDDB cubes. The unified data source of some embodiments may provide data to any number of different data consuming clients.

Figure 14:
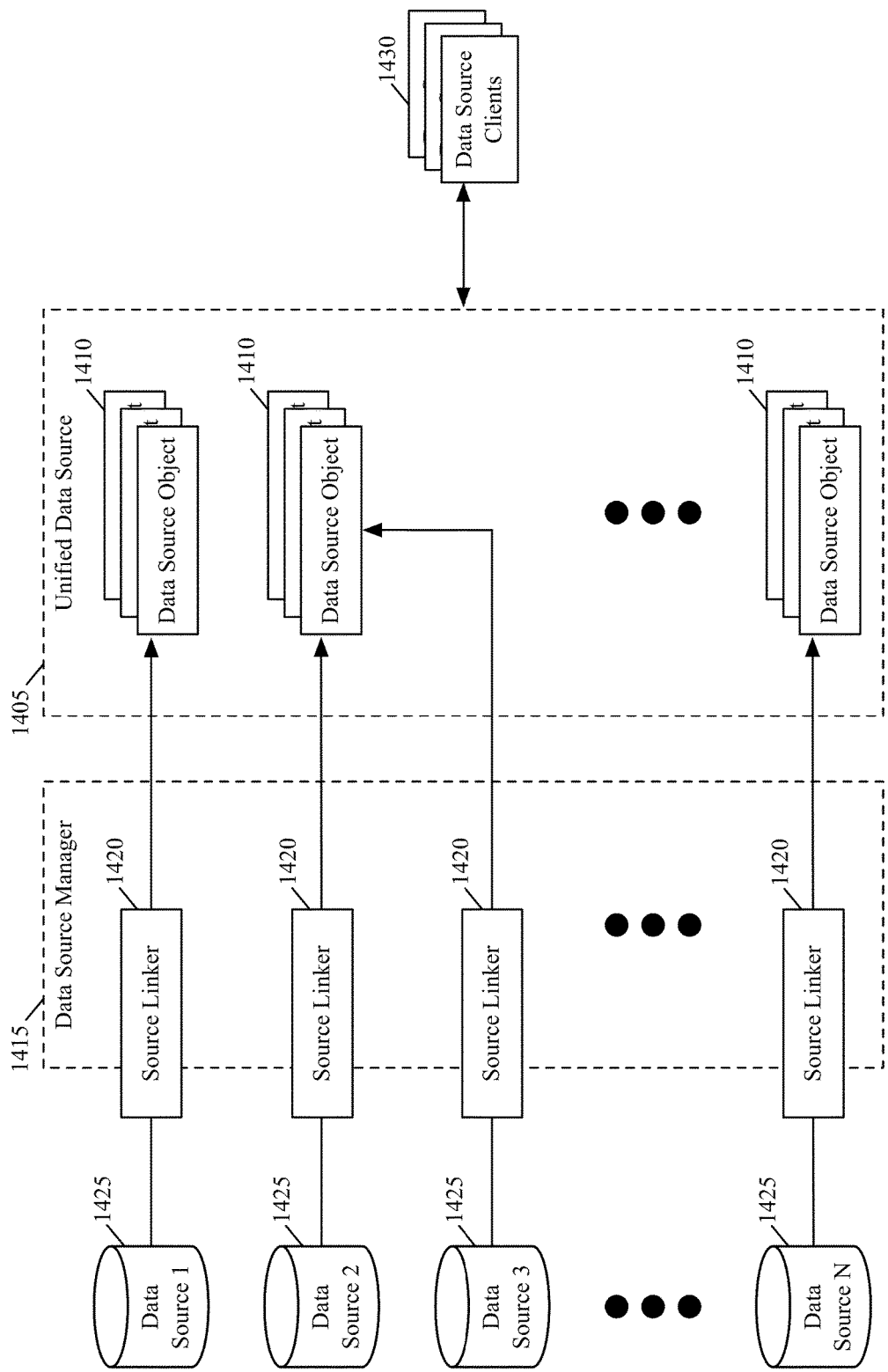
FIG. 14 conceptually illustrates a unified data source according to some embodiments of the invention.

FIG. 14 conceptually illustrates a unified data source 1405 according to some embodiments of the invention. In some embodiments, the unified data source 1405 may be implemented in many of the previously described figures (e.g., FIGS. 10, 11, and 13). As shown, FIG. 14 includes the unified data source 1405, sets of data source objects 1410, a data source manager 1415, source linkers 1420, data sources 1425, and data source clients 1430.

In some embodiments, each of the data sources 1425 may be implemented in any number of different ways. For instance, a data source 1425 may be implemented as a database (e.g., a relational database, a hierarchical database, a flat file database, or any other type of database for storing data). Also, the data source 1425 may be implemented as a file (e.g., an XML file, an spreadsheet file, a comma-separated values (CSV) file, a text file, etc.). The data source 1425 may also be implemented as a combination of databases and/or files, or as any other type of object that serves as a source of data. Additionally, the data sources 1425 may be different data storages, in some embodiments. For instance, the data sources 1425 may include different instances of one data storage of one product from one vendor and/or include different instances of different data storages of different products from one vendor or different vendors.

In some embodiments, each data source object in the sets of data source objects 1410 is a representation of data in a data source 1425. Examples of data source objects include tables, views, database functions, stored procedures, and queries. In some embodiments, a table is a set of data elements (e.g., values) organized in terms of vertical columns and horizontal rows. A view of some embodiments includes a stored query that is accessible as a virtual table composed of the result of the query. Thus, the view may represent a subset of data stored in a table of a data source. A database function of some embodiments is a built-in function provided by a data source for execution on the data source. In some embodiments, a database function is a user-defined function for performing functions (e.g., querying, updating, deleting data) on a set of data sources. A database function is executed when data represented by the database function is requested, in some embodiments. The unified data source 1405 of some embodiments may include other data source objects as well. Examples of such data source objects include tables, stored procedures, and queries.

The unified data source 1405 of some embodiments is similar to the unified data source 1010. In these embodiments, the unified data source 1405 is a collection of data source objects that presents a single source of data to the data source clients 1430. As shown, the unified data source 1405 includes a collection of data source objects (i.e., the sets of the data source objects 1410). The unified data source 1405 of some embodiments is a collection of views and/or functions that presents a single source of data to the data source clients 1430.

The data source manager 1415 is, in some embodiments, similar to the data source manager 1005. However, the data source manager 1415 also manages the source linkers 1420. For each data source 1425, the data source manager 1415 creates a corresponding source linker 1420. When a new data source 1425 is added, the data source manager 1415 creates a corresponding source linker 1420 for the new data source 1425. When one of the data sources 1425 is removed, the data source manager 1415 removes the corresponding source linker 1420.

The source linkers 1420 of some embodiments link data sources to the data source objects 1410 in the unified data source 1405. In some such embodiments, the source linkers 1420 link remote data sources to the data source objects 1410 in the unified data source 1405. The source linkers 1420 are implemented as Microsoft® SQL Server Linked Server objects, in some embodiments.

In some embodiments, the source linkers 1420 facilitate the distribution of multiple queries, updates, and commands across multiple data sources 1425 so that multiple queries can be performed simultaneously. For example, one of the data source objects 1410 in the unified data source 1405 may be defined as a database function that includes a query for data from data source 2 and a query for data from data source 3. When this data source object 1410 is accessed, the source linkers 1420 allow for the concurrent querying of data from data source 2 and data source 3.

Furthermore, the source linkers 1420 of some embodiments allows for a single query, update, and/or command to be performed across several data sources. For instance, one of the data source objects 1410 in the unified data source 1405 may be defined as a view that includes a single query that queries data from data source 2 and data source 3.

In some embodiments, the data source clients 1430 access data from the data sources 1425 through the unified data source 1405. Each of the data source clients 1430 may be implemented differently. For example, a data source client 1430 may be implemented as an MDDB cube, a web-browser client, a data processing application, or any other type of data consuming entity. As another example, the data source clients 1430 may be implemented as any type of entity that performs SQL statements against a data source (e.g., SQL reporting application and/or services) to retrieve data. In some embodiments, the data source clients 1430 are implemented as any type of data interchange system.

While the data source manager 1415 and the unified data source 1405 are shown as separate components in FIG. 14, in some embodiments, the data source manager 1415 and the unified data source 1405 are part of a single application (e.g., a relational database management system). In other embodiments, the data source manager 1415 and the unified data source 1405 are implemented as separate applications. Moreover, in some embodiments, the data source manager 1415 and the unified data source 1405 are implemented on a single computing device while, in other embodiments, the data source manager 1415 and the unified data source 1405 are implemented on separate computing devices.

Figure 15:
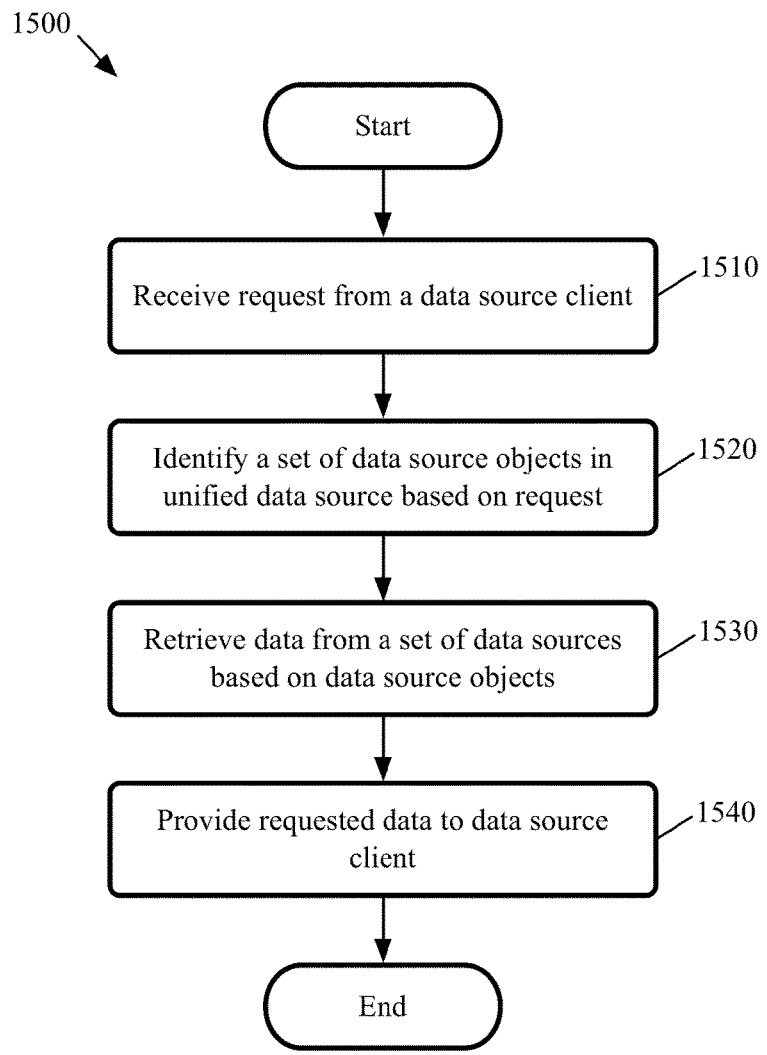
FIG. 15 conceptually illustrates a process of some embodiments for processing a request from a unified data source.
Figure 16:
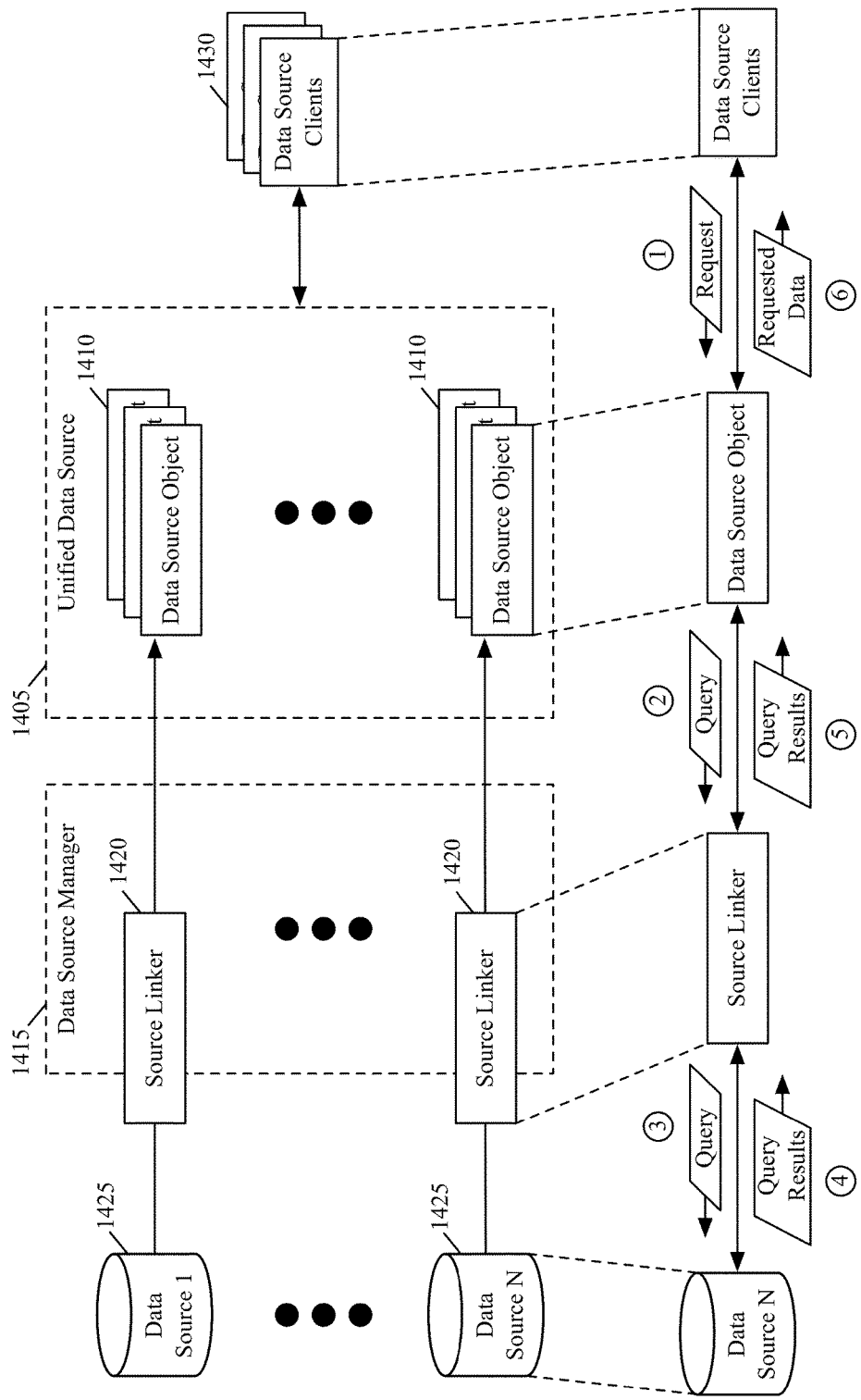
FIG. 16 conceptually illustrates a data flow diagram of a unified data source according to some embodiments of the invention.

FIG. 15 conceptually illustrates a process 1500 of some embodiments for processing a request for data in a unified data source. In embodiments where the data source manager 1415 and the unified data source 1405 are implemented on a single computer device or as a single module, the process 1500 is performed by the data source manager 1415 and the unified data source 1405. FIG. 15 will be described by reference to FIG. 16, which conceptually illustrates a data flow diagram of the unified data source 1405 and the data source manager 1415 according to some embodiments of the invention. As shown, FIG. 16 includes the same components that are illustrated in FIG. 14. In addition, the bottom portion of FIG. 16 illustrates the data flow between a data source client 1430, a data source object 1410, a source linker 1420, and the data source N. Specifically, this portion of FIG. 16 shows the flow of data when the data source client 1430 requests data from the unified data source 1405.

The process begins by receiving (at 1510) a request from a data source client. As shown in FIG. 16, the unified data source 1405 receives (at 1) a request from the data source client 1430. In some embodiments, the data source client 1430 sends the request in terms of a set of SQL queries. The data source client 1430 of some embodiments may also send the request in terms of any type of format that the unified data source 1430 interprets.

Next, the process 1500 identifies (at 1520) a set of data source objects in the unified data source based on the request. In some embodiments, the request specifies the set of data source objects. In such cases, the process 1500 identifies the set of data source objects specified by the request. For the example illustrated in FIG. 16, the request specifies the data source object 1410. Thus, the data source manager 1415 identifies the data source object 1410 when the unified data source 1405 receives the request from the data source client 1430.

The process 1500 then retrieves (at 1530) data from a set of data sources based on the data source objects. As noted above, a data source object, in some embodiments, is a representation of data in a set of data sources. Examples of a data source object include a view, a database function, a stored procedure, and a query. A view of some embodiments, as previously described above, includes a stored query that is accessible as a virtual table composed of the result of the query. As such, the view of some such embodiments represents a subset of data stored in a table of a data source. Also, a database function of some embodiments is a built-in function provided by a data source for execution on the data source. In some embodiments, a database function is a user-defined function for performing functions (e.g., querying, updating, deleting data) on a set of data sources. A database function is executed when data represented by the database function is requested, in some embodiments. The unified data source 1405 of some embodiments may also include other data source objects as well.

Referring to FIG. 16, the data source object 1410 in this example represents data in the data source N. Additionally for this example, the data source object 1410 is a view. As such, the data source object 1410 includes a stored query that is accessed as a virtual table composed of the result of the query. Thus, the data source manager 1415 identifies the stored query of the data source object 1410 and sends (at 2) the query to the data source N in order to retrieve data from the data source N. As shown in FIG. 16, the data source manager 1415 sends the query to the data source N through the source linker 1420 (at 3), which links the data source N to the data source object 1410. When the data source N receives the query, the data source N (or a data source manager that manages the data source N) executes the query and returns (at 4) the query results to the data source object 1410 through the source linker 1420 (at 5).

Returning to FIG. 15, the process 1500 finally provides (at 1540) the requested data to the data source client. In some cases, the data requested by the data source client does not include all the data that the set of data source objects represents in the set of data sources, but rather, includes a subset of that data. In other words, the data requested by the data source client includes a portion of the data that the set of data source objects represents in the set of data sources.

Referring to FIG. 16, the data source manager 1415 returns the requested data to the data source client 1430 when the data source manager 1415 receives the query results of the data source object 1410's query from the data source N. In some embodiments, the data source manager 1415 identifies the requested data in the query results. For example, in cases where the request is in terms of an SQL query, the data source manager 1415 performs the SQL query on the query results that the data source manager 1415 receives from the data source N.

II. Content Packs

As discussed above, the MDDB system of some embodiments manages MDDB cubes by employing predefined packages (also referred to as content packs). A content pack includes MDDB cube definitions and metadata associated with the MDDB cube definitions. In some embodiments, the metadata associated with the MDDB cube definitions specify data relationships (e.g., data dependencies) between the components (e.g., measures, dimensions, DSVs, etc.) used to define the MDDB cubes.

In some embodiments, a content pack further includes definitions of other entities. For instance, the content pack of some such embodiments includes a set of dimension definitions, a set of DSV definitions, and/or a set of presentation object definitions.

A dimension definition of some embodiments specifies metadata for categorizing a set of measures along the dimension. In some embodiments, a dimension specifies a set of hierarchies, which each specifies a set of hierarchical parent-child relationships for filtering a set of measures through varying levels of granularity along the dimension.

The DSV definition of some embodiments specifies an object that provides a logical view of data in a set of data sources (e.g., a unified data source). The logical view may include data source objects (e.g., tables, views, stored procedures, and/or queries) that provide data from the data sources.

In some embodiments, a presentation object definition specifies a set of MDDB cubes and a representation of a perspective of the MDDB cubes. In addition, the presentation object definition further specify a set of charts, graphs, reports, and/or tables that are generated based on the perspective of the MDDB cubes, in some embodiments.

In addition to the entity definitions discussed above, the content pack of some embodiments includes other types of data. For instance, the content pack may include data source metadata and a set of predefined data source commands. The content pack may also include a content map. In some embodiments, the entity definitions may be referred to as the content of the content pack. As such, the content map specifies relationships between the content, in some embodiments. That is, the content map specifies relationships (e.g., data dependencies) between the entities defined by the entity definitions. Furthermore, the content map may be implemented as a file (e.g., an XML file).

Figure 17:
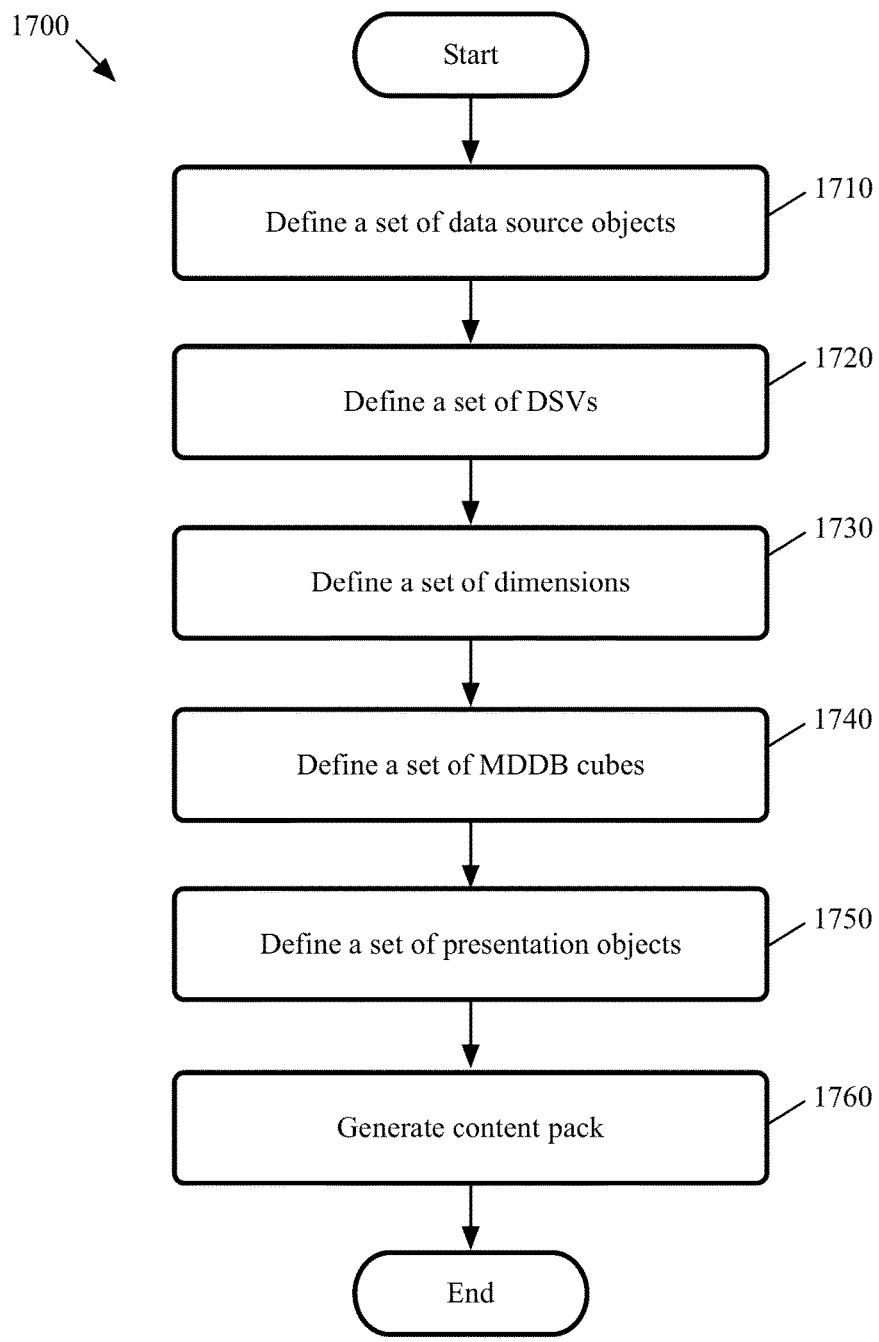
FIG. 17 conceptually illustrates a process of some embodiments for creating a content pack.

FIG. 17 conceptually illustrates a process 1700 of some embodiments for creating a content pack. In some embodiments, an MDDB tool for developing MDDB cubes (e.g., Microsoft Visual Studio®) performs the process 1700. Also, a user of such an MDDB tool may perform some or all of the process 1700 and/or may initiate some or all of the operations in the process 1700. In addition, the MDDB tool may be configured to create a package of files and/or folders having a predefined format. Some embodiments of the invention provide a template of files and/or folders that are already structured according to the predefined format. In some such embodiments, a text editor that is configured to edit the files (e.g., Microsoft Word®, Windows Notepad®, Mac OS X TextEdit®) performs the process 1700.

The process 1700 begins by defining (at 1710) a set of data source objects. As noted above, in some embodiments, a data source object is a representation of data in a data source (e.g., a table, view, database function, stored procedure, query, etc.). In some embodiments, defining the set of data source objects includes defining a data source for each data source object in the set of data source objects. In some instances, the same data source may be defined for more than one data source object while, in other instances, different data sources may be defined for each of the data source objects.

Next, the process 1700 defines (at 1720) a set of DSVs. As previously described above, a DSV of some embodiments is an object that provides a logical view of data in a data source (e.g., a unified data source). The logical view of the DSV of some such embodiments may include tables, views, stored procedures, and/or queries that provide data from the data source. In some embodiments, a single DSV is used to define data (e.g., a set of measures and a set of dimensions) for an MDDB cube. In other words, some of these embodiments prevent more than one DSV from being used to define an MDDB cube. In some embodiments, the process 1700 defines each DSV in the set of DSVs by specifying (e.g., in a content map) a set of data source objects in the defined set of data source objects (from which the DSV derives data for the DSV's logical view of data). That is, the DSV is specified as dependent on the specified data source objects for the DSV's data.

The process 1700 then defines (at 1730) a set of dimensions. As mentioned above, in some embodiments, a dimension is metadata for categorizing a set of measures along a dimension. The process 1700 of some embodiments defines each dimension in the set of dimensions by specifying (e.g., in a content map) a DSV from the defined set of DSVs for the dimension (from which the dimension derives data for the dimension). In other words, the dimension is specified as dependent on the specified DSV for the dimension's data.

Next, the process 1700 defines (at 1740) a set of MDDB cubes. As noted above, an MDDB cube of some embodiments is defined by a set of measures and a set of dimensions. In some embodiments, the process 1700 defines each MDDB cube by specifying a set of measures for the MDDB cube. In some such embodiments, the process 1700 specifies a set of measures by specifying (e.g., in a content map) a DSV from the defined set of DSVs for the set of measures. In other words, the set of measures is specified as dependent on the DSV for the set of measures' data.

In some embodiments, the process 1700 further defines each MDDB cube by specifying (e.g., in a content map) a subset of the defined set of dimensions for the MDDB cube. That is, the MDDB cube is specified as dependent on the specified dimensions for the MDDB cube's data.

After defining a set of MDDB cubes, the process 1700 defines (at 1750) a set of presentation objects. In some embodiments, the process 1700 defines each presentation object by specifying (e.g., in a content map) a defined MDDB cube for the presentation object. Thus, the presentation object is specified as dependent on the specified MDDB cube for the presentation object's data.

Finally, the process 1700 generates (at 1760) a content pack based on the defined set of presentation objects, the defined set of MDDB cubes, the defined set of dimensions, the defined set of DSVs, and the defined set of data source objects. The process 1700 generates the content pack by packaging the entity definitions and other data mentioned above (e.g., a content map) into a single file (e.g., a ZIP file, a Microsoft .NET® assembly, etc.).

Although the process in FIG. 17 illustrates creating a content pack with several entity definitions, the process of some embodiments may define additional and/or other items for the content pack. For example, some of these embodiments of the process may define data source metadata, data source commands, etc.

As described above, the content pack of some embodiments may include various entity definitions, data source metadata, a set of predefined data source commands, and a content map. Some embodiments may create a data structure to represent the items in a content pack.

Figure 18:
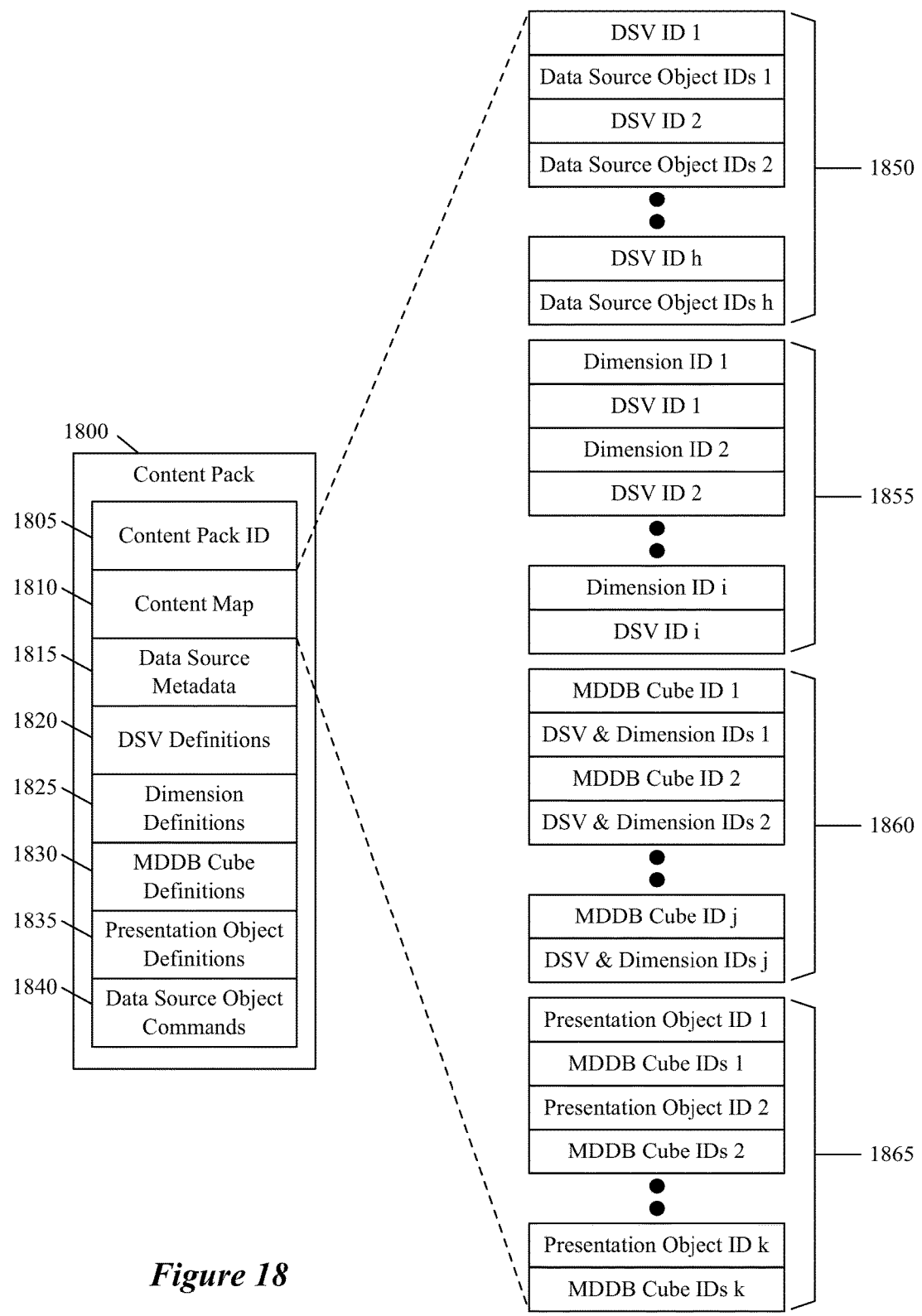
FIG. 18 conceptually illustrates a content pack data structure of some embodiments.

FIG. 18 conceptually illustrates a content pack data structure 1800 of some embodiments. As shown, the content pack data structure 1800 includes a content pack identifier (ID) 1805, a content map 1810, data source metadata 1815, a set of DSV definitions 1820, a set of dimension definitions 1825, a set of MDDB cube definitions 1830, a set of presentation object definitions 1835, and a set of data source commands 1840. In some embodiments, when the content pack is created (e.g., by the process described above by reference to FIG. 17), the data structure 1800 (or a similar data structure) is generated to represent the content pack.

The content pack ID 1805 is a unique identifier (e.g., a filename, a number value, etc.) for identifying the content pack. Thus, the content pack ID 1805 allows one content pack to be differentiated from other content packs. In addition, the content pack ID 1805 may be used to reference other data in the content pack.

The content map 1810 of some embodiments includes a list of relationships between content in the content pack. For instance, the content map may specify dependencies between the entities defined by the entity definitions in the content pack. As shown, the content map 1810 includes sets of dependencies 1850-1865. In some embodiments, the content map 1810 is implemented as a file (e.g., an XML file).

The set of dependencies 1850 includes 1-h pairs of data fields that each includes a DSV ID that is specified as dependent on a set of data source object IDs. The DSV ID is an identifier for identifying a DSV. In some embodiments, the DSV ID identifies a DSV that is defined by a DSV definition 1820. Each of the data source objects in the set of data source object IDs is an identifier for identifying a data source object. The data source object ID of some embodiments identifies a data source object defined by a data source object created based on the set of data source commands 1840.

The set of dependencies 1855 includes 1-i pairs of data fields that each includes a dimension ID that is specified as dependent on a DSV ID. The dimension ID is an identifier for identifying a dimension. In some embodiments, the dimension ID identifies a dimension defined by a dimension definition 1825. As mentioned above, the DSV ID is an identifier for identifying a DSV that is, in some embodiments, defined by a DSV definition 1820.

The set of dependencies 1860 includes 1-j pairs of data fields that each includes an MDDB cube ID that is specified as dependent on a set of DSV and dimension IDs. In some embodiments, the MDDB cube ID is specified as dependent on a single DSV ID and a set of dimension IDs. The MDDB cube ID is an identifier for identifying an MDDB cube. The MDDB cube ID of some embodiments identifies an MDDB cube defined by an MDDB cube definition 1830. The DSV ID, as noted above, is an identifier for identifying a DSV that is defined by a DSV definition 1820, in some embodiments. Additionally, as mentioned above, the dimension ID of some embodiments is an identifier for identifying a dimension that is defined by a dimension definition 1825.

The set of dependencies 1865 includes 1-k pairs of data fields that each includes a presentation object ID that is specified as dependent on a set of MDDB cube IDs. The presentation object ID is an identifier for identifying a presentation object. In some embodiments, the presentation object ID identifies a presentation object defined by a presentation object definition 1835. As mentioned above, the MDDB cube ID of some embodiments is an identifier for identifying an MDDB cube defined by an MDDB cube definition 1830.

The data source metadata 1815 includes data source configuration information, in some embodiments. For instance, the data source metadata 1815 may include information that specifies options for data sources (e.g., an option for specifying that a single data source may be added or that multiple data sources may be added). Other types of data source configuration information may be included in the data source metadata 1815 of some embodiments.

In some embodiments, the data source metadata 1815 includes information related to the configuration of a UI for managing data sources. For example, the data source metadata 1815 may include strings for display in the UI (e.g., a title, instructions for using the UI, etc.). In addition, the data source metadata 1815 may include options that specify that a field be displayed or hidden from display in the UI. Additional and different information is included in different embodiments of the data source metadata 1815. In some embodiments, the data source metadata 1815 is implemented as a file (e.g., an XML file).

Each DSV definition in the set of DSV definitions 1820 is a definition of a DSV. As mentioned above, in some embodiments, a DSV is an object that provides a logical view of data in a data source. The set of DSV definitions 1820 of some such embodiments are objects that, collectively, provide a logical view of data in a unified data source. The logical view of data may include tables, views, stored procedures, and/or queries that provide data from the data source. In some embodiments, each DSV definition in the set of DSV definitions 1820 may specify a set of data source objects that are created based on the set of data source commands 1840. Furthermore, the set of DSV definitions 1820 in some embodiments is implemented as a set of files (e.g., a set of XMLA files).

Each dimension definition in the set of dimension definitions 1825 is a definition of a dimension. As described above, in some embodiments, a dimension is metadata for categorizing a set of measures along a dimension. Some embodiments use a particular dimension to define one or more MDDB cubes. In addition, each dimension definition in the set of dimension definitions 1825 may specify a DSV defined by a DSV definition in the DSV definitions 1820. In some embodiments, the set of dimension definitions 1825 is implemented as a set of files (e.g., a set of XMLA files).

Each MDDB cube definition in the set of MDDB cube definitions 1830 is a definition of an MDDB cube. As discussed above, an MDDB cube of some embodiments is defined by a set of measures and a set of dimensions. In some embodiments, each MDDB cube definition in the set of MDDB cube definitions 1830 may specify a set of dimensions defined by dimension definitions in the set of dimension definitions 1825. The set of MDDB cube definitions 1830 is, in some embodiments, implemented as a set of files (e.g., a set of XMLA files).

Each presentation object definition in the set of presentation object definitions 1835 is a definition of a presentation object. As noted above, in some embodiments, a presentation object is a predefined representation of a perspective of a set of MDDB cubes. In some such embodiments, the presentation object includes a set of charts, graphs, reports, and/or tables, which are generated based on the perspective of the set of MDDB cubes that define the presentation object. In some embodiments, each presentation object in the set of presentation objects 1835 specifies a set of MDDB cubes defined by MDDB cube definitions in the set of MDDB cube definitions 1830. The set of presentation object definitions 1835 of some embodiments are implemented as a set of files (e.g., a set of report definition language (RDL) files).

The set of data source commands 1840 includes commands that may be performed on a set of data sources. In some embodiments, the set of data source commands 1840 includes a set of data source commands for creating data source objects in a data source (e.g., a unified data source). In some such embodiments, the set of data source commands 1840 also includes commands for deleting data source objects from a data source (e.g., a unified data source). In some embodiments, the set of data source commands for creating data source objects in a data source are included in a first SQL script and the set of data source commands for deleting data source objects from the data source are included in a second SQL script.

FIG. 18 illustrates a content pack data structure of some embodiments. However, the content pack data structure shown in FIG. 18 is just one example of a content pack data structure that may be used to represent items in a content pack. One of ordinary skill in the art will realize that the content pack data structure may include additional and/or different fields in some embodiments. For example, a content pack may not include a presentation object in some instances. In such instances, the content pack data structure does not include presentation object definitions and data dependencies that specify presentation objects.

Figure 19:
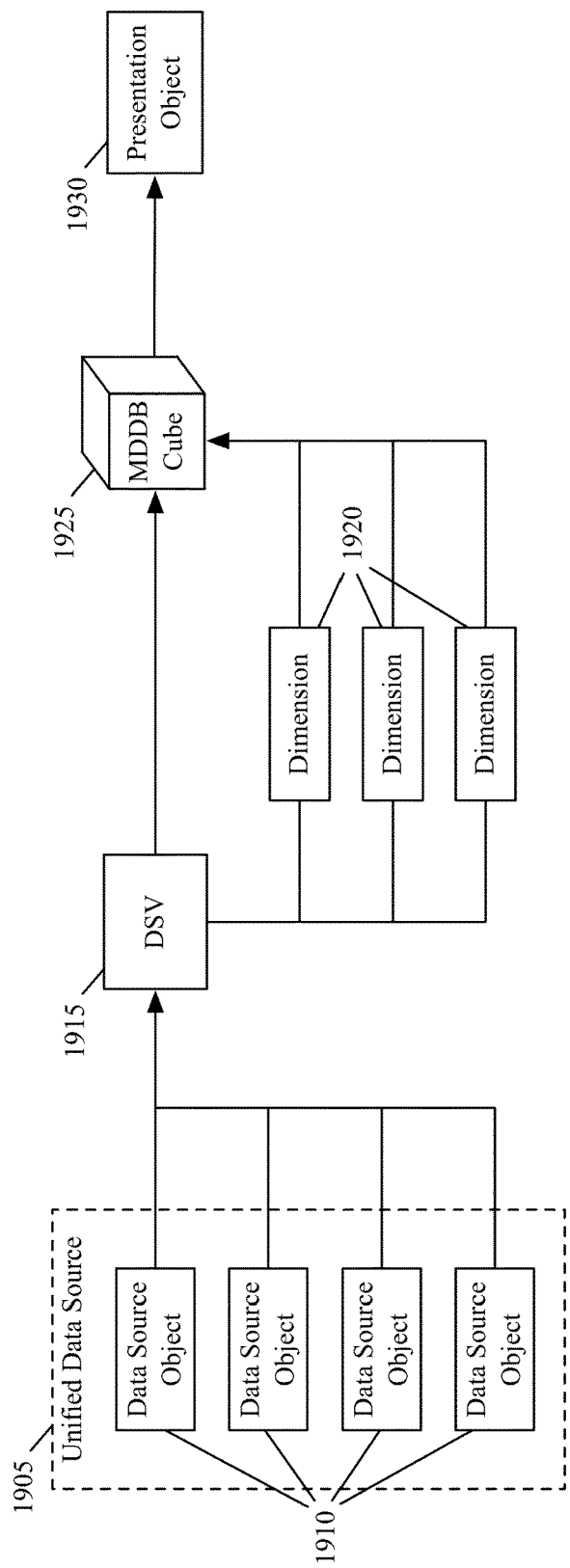
FIG. 19 conceptually illustrates data relationships included in a content map according to some embodiments of the invention.

FIG. 19 conceptually illustrates data relationships included in a content map according to some embodiments of the invention. As illustrated, FIG. 19 shows a unified data source 1905 that includes a set of data source objects 1910, a DSV 1915, a set of dimensions 1920, an MDDB cube 1925, and a presentation object 1930.

In this example, the unified data source 1905 is a collection of data source objects 1910 that presents a single source of data to the DSV 1915. Each data source object in the set of data source objects 1910 is a representation of data in a data source (not shown). The content map in this example includes a dependency (e.g., a dependency in the set of dependencies 1850) that specifies a DSV ID that identifies the DSV 1915 as dependent on a set of data source object IDs that identify the set of data source objects 1910.

As shown in FIG. 19, the set of dimensions 1920, which are metadata for categorizing a set of measures (not shown) along the set of dimensions 1920, are derived from the DSV 1915. The content map in this example includes a set of dependencies (e.g., the set of dependencies 1855) that each specifies a dimension ID that identifies a dimension in the set of dimension 1920 as dependent on a DSV ID that identifies the DSV 1915.

The MDDB cube 1925 is defined by a set of measures (not shown) and the set of dimensions 1920. For this example, the set of measures is derived from the DSV 1915. As such, the content map in this example includes a dependency (e.g., a dependency in the set of dependencies 1860) that specifies an MDDB cube ID that identifies the MDDB cube 1925 as dependent on a DSV ID that identifies the DSV 1915. Moreover, the content map also includes a set of dependencies (e.g., the set of dependencies 1860) that each specifies the MDDB cube ID that identifies the MDDB cube 1925 as dependent on a dimension ID that identifies a dimension in the set of dimension 1920.

As shown, the presentation object 1930 is derived from the MDDB cube 1925. Thus, the content map in this example includes a dependency (e.g., a dependency in the set of dependencies 1865) that specifies a presentation object ID that identifies the presentation object 1930 as dependent on the MDDB cube ID that identifies the MDDB cube 1925.

FIG. 19 illustrates an example of the manner in which data relationships may be specified in a content pack. However, one of ordinary skill in the art will realize that different content packs may specify different data relationships between different entities (e.g., data source objects, DSVs, dimensions, MDDB cubes, presentation objects, etc.). In some cases, a content pack may not include presentation object definitions, and thus may not specify data relationships that include presentation objects.

III. Exemplary Content Pack and MDDB System

Section II described a variety of details related to content packs. The following section describes numerous details of an MDDB system of some embodiments that utilizes content packs to manage MDDB cubes. In some embodiments, an installation process is performed to configure such an MDDB system. The following description discusses an example of such a process as well as example GUIs for configuring the MDDB system.

A. System Configuration

Figure 20:
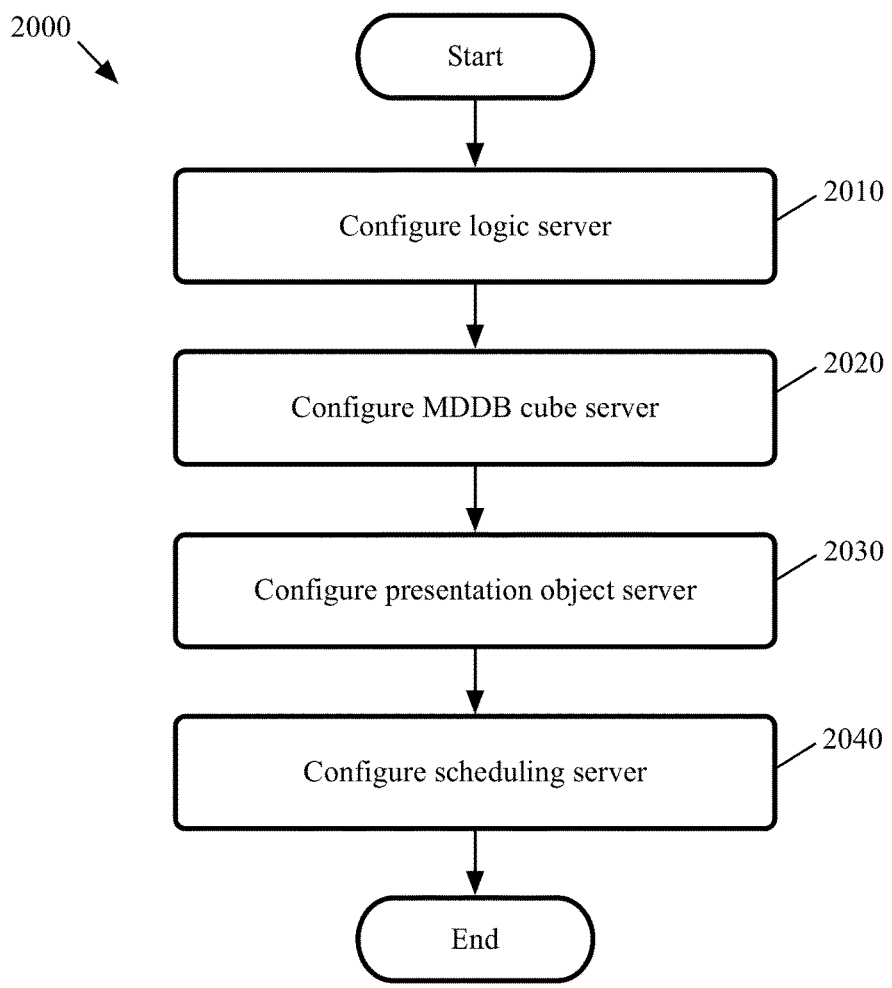
FIG. 20 conceptually illustrates a process of some embodiments for configuring a content pack and MDDB system.

FIG. 20 conceptually illustrates a process 2000 of some embodiments for configuring a content pack and MDDB system. In some embodiments, the process 2000 is performed by a predefined installation program (e.g., a Windows installation file) executing on a computing device in order to set up a content pack and MDDB system. In some such embodiments, the installation program may be initiated by a user (e.g., through a GUI of an operating system, a command line interface to an operating system, etc.) of the computing device.

Figure 21:
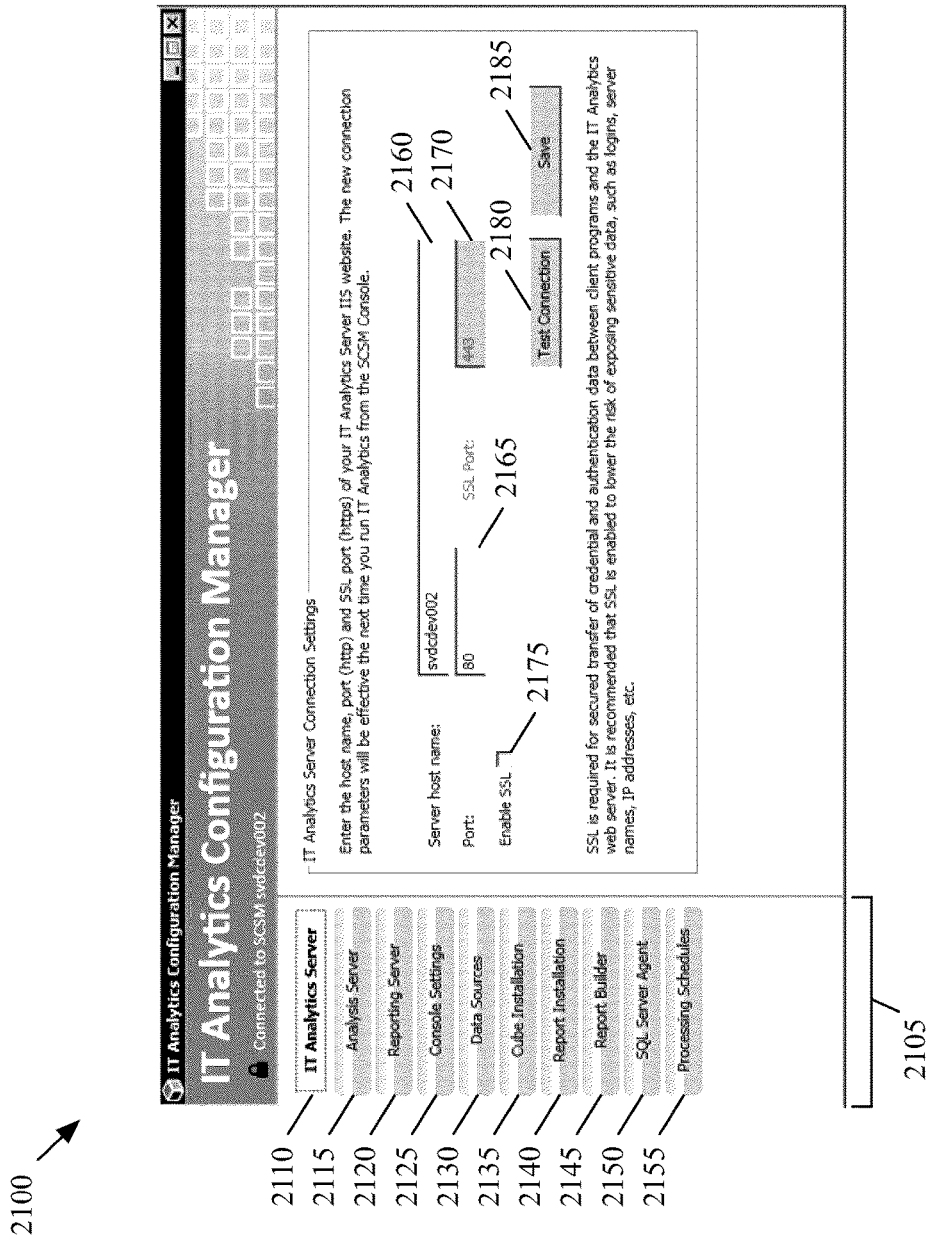
FIG. 21-24 conceptually illustrate example graphical user interfaces (GUIs) for configuring a content pack and MDDB system.
Figure 22:
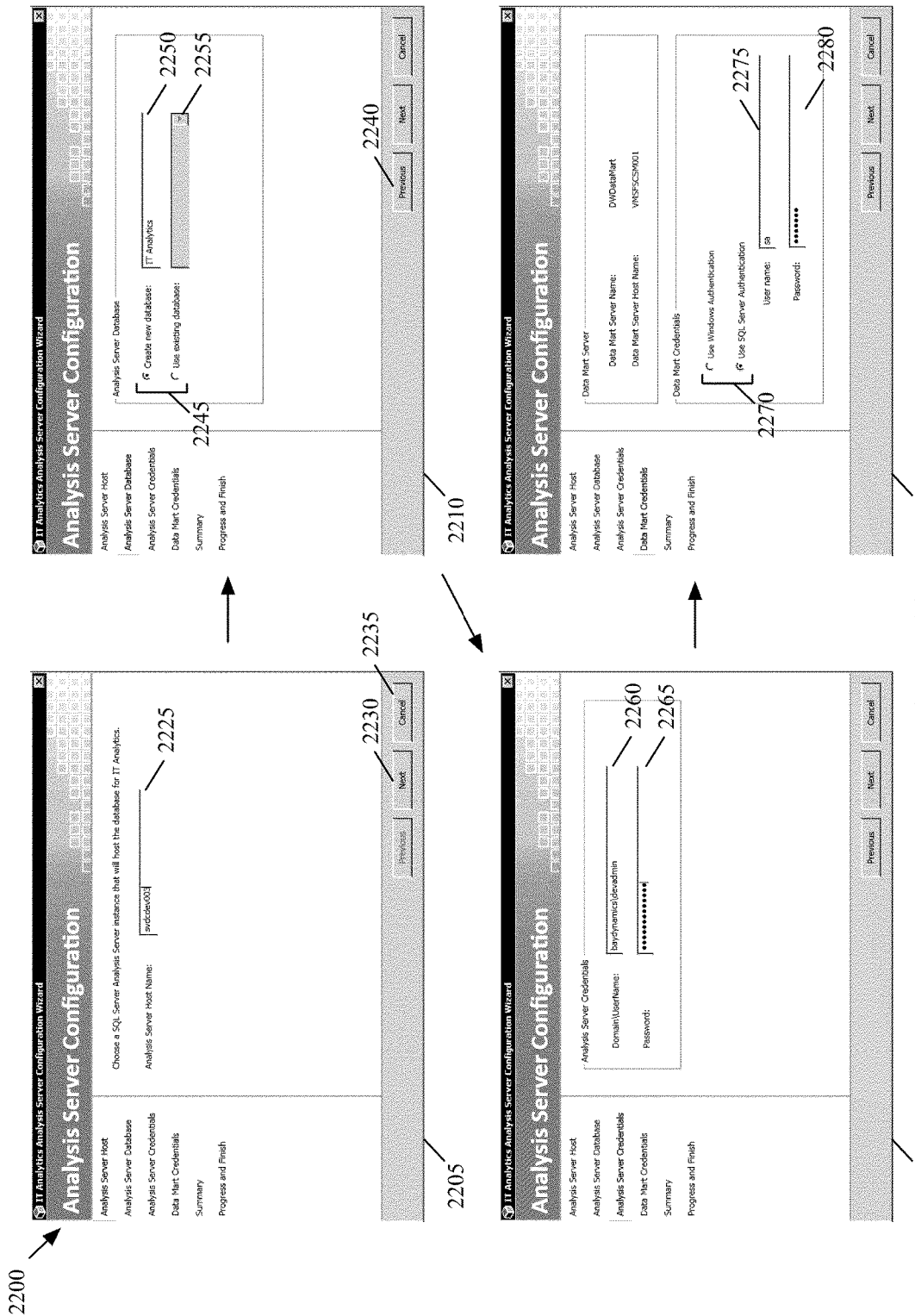
Figure 23:
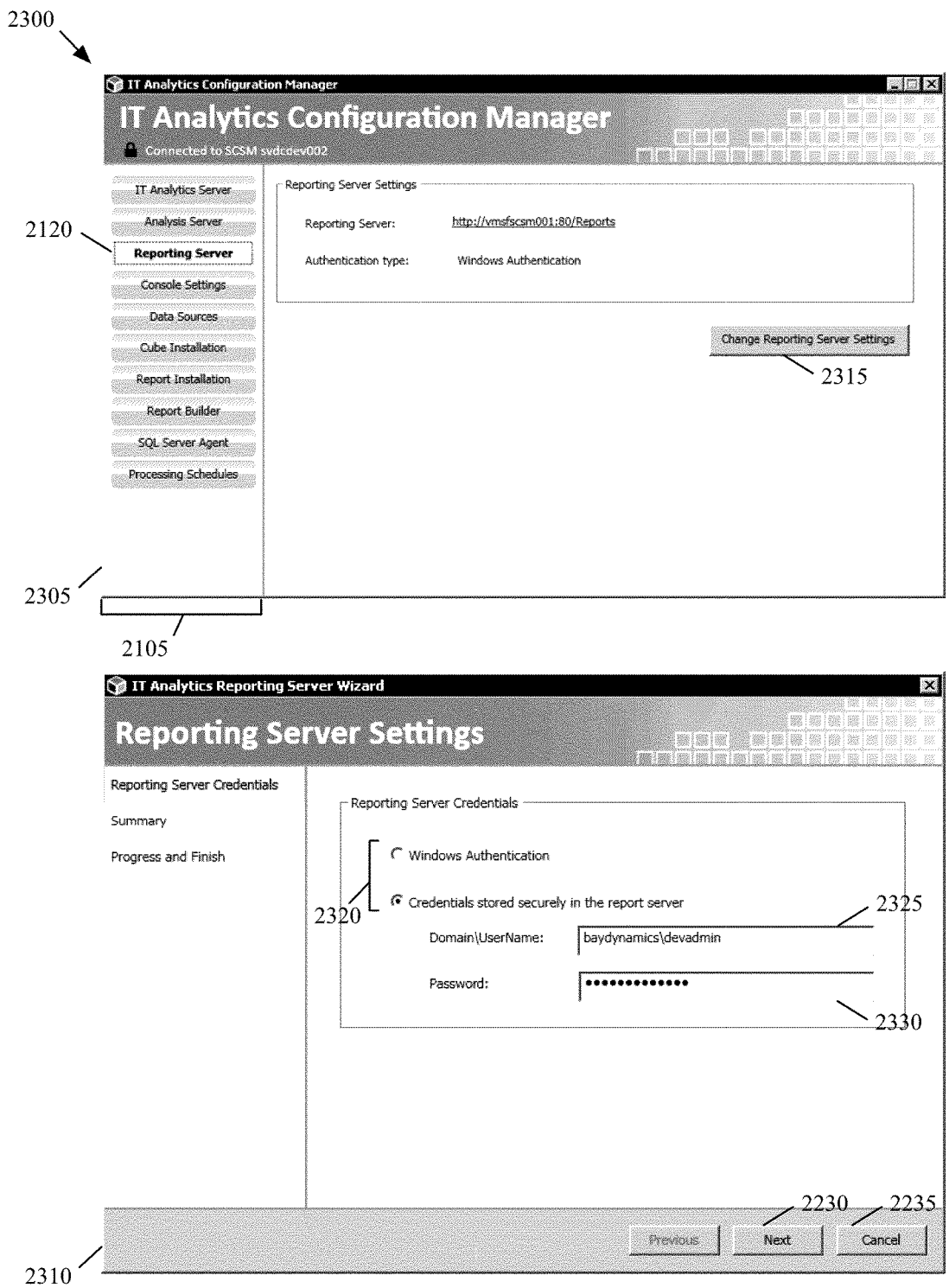
Figure 24:
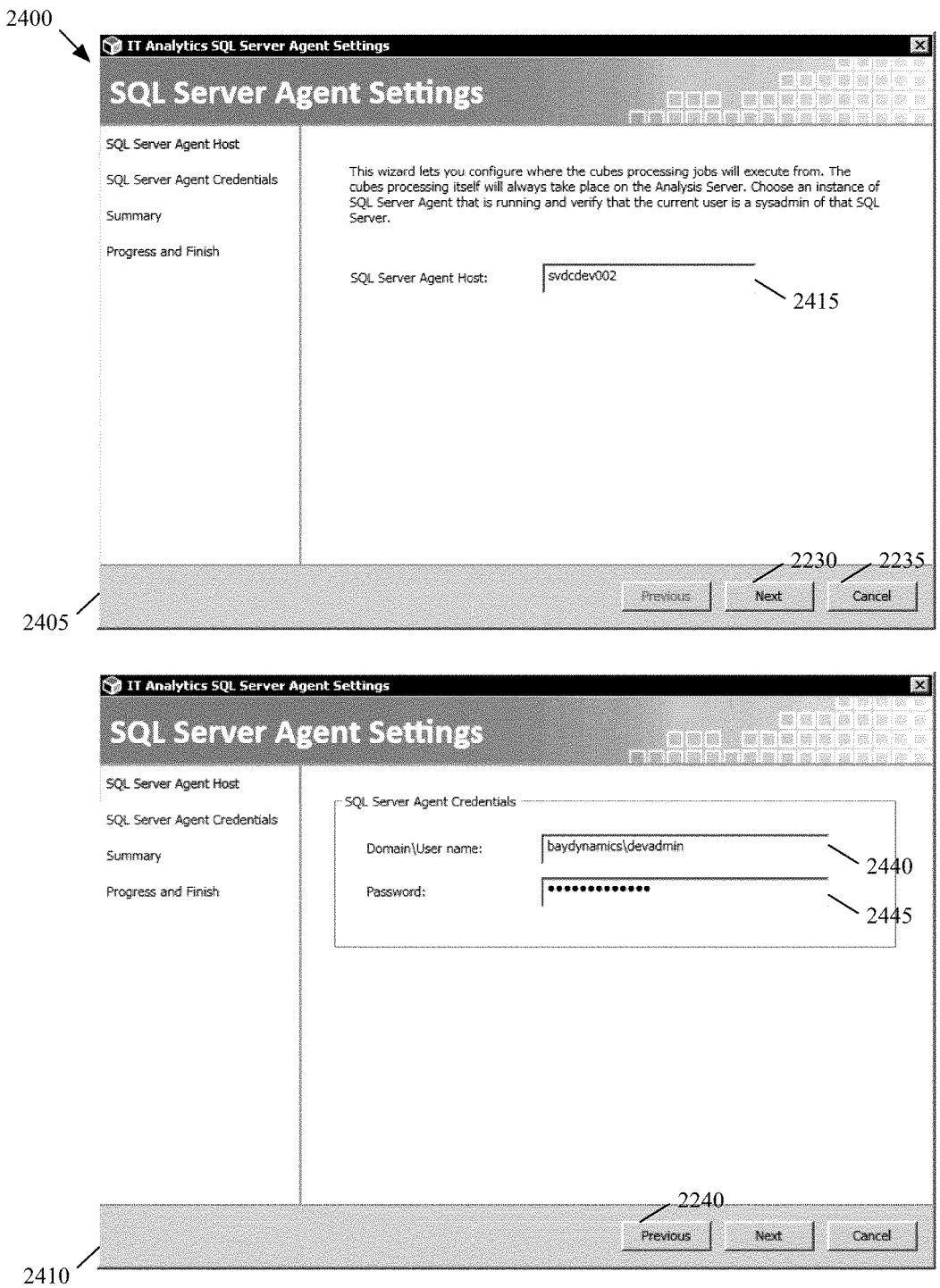

The process 2000 will be described by reference to FIGS. 21-24, which conceptually illustrate example GUIs for configuring a content pack and MDDB system. Specifically, FIG. 21 illustrates a GUI 2100 for configuring a logic server, FIG. 22 illustrates a GUI 2200 for configuring an MDDB cube server, FIG. 23 illustrates a GUI 2300 for configuring a presentation object server, and FIG. 24 illustrates a GUI 2400 for configuring a scheduling server.

The process 2000 begins by configuring (at 2010) a logic server. In some embodiments, the logic server is configured based on configuration data. Examples of such configuration data may include a server host name, a port number, a secure sockets layer (SSL) port number, and/or any other data for identifying the logic server. The process 2000 of some embodiments provides an interface (e.g., a GUI, a command line interface, or any other interface for receiving input) for receiving configuration data to configure the logic server. As part of the configuration of the logic server, the process 2000 of some embodiments provisions a web server (e.g., Microsoft Internet Information Services (IIS)®) and a database (e.g., an SQL database) for hosting a unified data source. In some such embodiments, the process 2000 provisions the web server and the database by initiating a setup program that provisions the web server and the database.

As mentioned above, the process 2000 of some embodiments may be performed by a predefined installation program executing on a set of computing devices in order to set up a content pack and MDDB system. In some such embodiments, the logic server is hosted on the set of computing devices on which the predefined installation program is executed while, in other such embodiments, the logic server is hosted on a set of computing devices that is different than the set of computing devices on which the predefined installation program is executed (e.g., remote installation).

In some embodiments, the logic server is responsible for implementing the logic of the content pack and MDDB system. The logic server of some embodiments implements such logic through a set of web services hosted on the web server. In some of these embodiments, the logic server configures and communicates with other servers (e.g., an MDDB cube server, a presentation object server, a scheduling server, etc.) in the content pack and MDDB system through the set of web services.

After the logic server is configured, the process 2000 of some embodiments configures the rest of the content pack and MDDB system through the logic server. In some of these embodiments, the logic server provides an interface for configuring the rest of the content pack and MDDB system. FIG. 21 illustrates an example of such an interface. Specifically, FIG. 21 illustrates a GUI 2100 that the logic server provides for modifying the configured logic server when a connection is established to the logic server. As shown, the GUI 2100 includes a selection panel 2105, user interface (UI) text input items 2160-2170, and selectable UI items 2175-2185.

The selection panel 2105 includes selectable UI items 2110-2155. The selectable UI item 2110 is for navigating to the GUI 2100. Thus, when GUI 2100 receives a selection (e.g., through a cursor control operation such as clicking a mouse button, tapping a trackpad, or touching a touchscreen) of the selectable UI item 2110, the process 2000 provides the GUI 2100. Similarly, the selectable UI items 2115-2155 are each for navigating to a GUI that corresponds to the selectable UI item when the GUI 2100 receives a selection of the selectable UI item.

The UI text input item 2160 (e.g., the Server host name text input field) is for receiving input that modifies the host name of the logic server. In this example, the host name "svdcdev002" has been input (e.g., through a series of keystrokes) into the UI text input item 2160. The UI text input item 2165 (e.g., the Port text input field) is for receiving input that modifies a port number through which the logic server is hosted. In this example, a port number 80 has been input (e.g., through a series of keystrokes) into the UI text input item 2165.

The UI text input item 2170 (e.g., the SSL Port text input field) is for receiving input that modifies an SSL port number through which the logic server is hosted. In this example, a port number 443 has been has been input (e.g., through a series of keystrokes) into the UI text input item 2170. The selectable UI item 2175 (e.g., the Enable SSL check box) is for enabling and disabling SSL. As shown, selectable UI item 2175 is disabled and the UI text input item 2170 is grayed out to prevent the UI text input item 2170 from receiving input. When the GUI 2100 receives a selection (e.g., through a cursor control operation such as clicking a mouse button, tapping a trackpad, or touching a touchscreen) of the selectable UI item 2175, the process 2000 enables the UI text input item 2170 by removing the graying out of the UI text input item 2170 in order for the UI text input item 2170 to receive input. In some embodiments, the process 2000 disables the UI text input item 2165 when the GUI 2100 receives a selection of the selectable UI item 2175.

The selectable UI item 2180 (e.g., the Test Connection button) is for invoking a test that attempts to establish a connection to a logic server based on the input received in the UI text input items 2160-2170 and the selectable UI item 2175. The selectable UI item 2185 (e.g., the Save button) is for saving the input received in the UI text input items 2160-2170 and the selectable UI item 2175. When the GUI 2100 receives a selection of the selectable UI item 2185 (e.g., through a cursor control operation such as clicking a mouse button, tapping a trackpad, or touching a touchscreen), the process 2000 stores (e.g., in an SQL database) the configuration data received through the GUI 2100 for the logic server and configures the logic server based on the configuration data received through the GUI 2100. In some embodiments, the process 2000 configures the logic server by configuring a data storage (e.g., an SQL database) for the content pack and MDDB system.

Returning back to FIG. 20, the process 2000 then configures (at 2020) an MDDB cube server. Similar to the logic server, the MDDB cube server of some embodiments is configured based on configuration data. Examples of such configuration data may include a server host name, a database identifier, a set of server credentials, and/or any other data for configuring the MDDB cube server.

The process 2000 of some embodiments provides the GUI 2200 illustrated in FIG. 22 in order to receive configuration data for configuring the MDDB cube server. In particular, FIG. 22 illustrates the GUI 2200 at four stages 2205-2220 of receiving configuration data for the MDDB cube server.

The first stage 2205 illustrates that a user has entered input (e.g., through a series of keystrokes) into a UI text input item 2225 (e.g., the Analysis Server Host Name text input field) that is for receiving input that specifies the host name of the MDDB cube server. The first stage 2205 also illustrates selectable UI items 2230 and 2235.

The selectable UI item 2230 (e.g., the Next button) is for navigating to the second stage 2210 of the GUI 2200. When the GUI 2200 receives a selection (e.g., through a cursor control operation such as clicking a mouse button, tapping a trackpad, or touching a touchscreen) of the selectable UI item 2230, the process 2000 provides the second stage 2210 of the GUI 2200. The selectable UI item 2235 (e.g. the Cancel button) is for terminating the GUI 2200. In some embodiments, the process 2000 provides a GUI (not shown) that includes the selection panel 2105 when the GUI 2200 receives a selection (e.g., through a cursor control operation such as clicking a mouse button, tapping a trackpad, or touching a touchscreen) of the selectable UI item 2235.

The second stage 2210 shows the GUI 2200 after the user has selected the selectable UI item 2230 in the first stage 2205. As shown, the GUI 2200 includes the selectable UI items 2230 and 2235. The GUI 2200 also includes selectable UI items 2240 and 2245 and UI text input items 2250 and 2255.

The UI text input item 2250 (e.g., the Create name database text input field) is for receiving input that specifies a database identifier for an MDDB cube database that is going to be created. The UI text input item 2255 (e.g., the Use existing database drop-down list) is for receiving input that specifies a database identifier of an existing MDDB cube database.

The selectable UI item 2245 (e.g., the set of radio buttons) is for selecting between an option to create a new MDDB cube database and an option to use an existing MDDB cube database. The GUI 2200 allows the UI text input item 2250 to receive input when the GUI 2200 receives a selection (e.g., through a cursor control operation such as clicking a mouse button, tapping a trackpad, or touching a touchscreen) of the top portion of the selectable UI item 2245. For this example, such a selection has been made, as indicated by the highlighting of the radio button next to the Create new database option of the selectable UI item 2245. However, the GUI 2200 allows the UI text input item 2255 to receive input when the GUI 2200 receives a selection (e.g., through a cursor control operation such as clicking a mouse button, tapping a trackpad, or touching a touchscreen) of the bottom portion of the selectable UI item 2245. The second stage 2210 shows that the user has entered "IT Analytics" (e.g., through a series of keystrokes) into the UI text input item 2250 to specify a name identifier for an MDDB cube server that is going to be created.

The selectable UI item 2240 is for navigating back to the first stage 2205 of the GUI 2200. When the GUI 2200 receives a selection (e.g., through a cursor control operation such as clicking a mouse button, tapping a trackpad, or touching a touchscreen) of the selectable UI item 2240, the process 2000 provides the first stage 2205 of the GUI 2200. In this stage 2210, the selectable UI item 2230 is for navigating to the third stage 2215 of the GUI 2200. Thus, when the GUI 2200 receives a selection (e.g., through a cursor control operation such as clicking a mouse button, tapping a trackpad, or touching a touchscreen) of the selectable UI item 2240, the process 2000 provides the third stage 2215 of the GUI 2200.

The MDDB cube server of some embodiments includes a multidimensional database for managing, storing, and provisioning MDDB cubes. Many different MDDB cube servers that are provided by different vendors may be utilized. Examples of MDDB cube servers include Essbase®, icCube®, Microsoft Analysis Services®, Mondrian OLAP Server®, Oracle Database OLAP Option®, etc.

The third stage 2215 illustrates the GUI 2200 after the user has selected the selectable UI item 2230 in the second stage 2210. In this stage 2215, the GUI 2200 includes the selectable UI items 2230-2240. The GUI 2200 further includes UI text input items 2260 and 2265.

The UI text input item 2260 (e.g., the Domain\UserName text input field) is for receiving input that specifies a domain and username of a set of server credentials for a database of the MDDB cube server. The UI text input item 2265 (e.g., the Password text input field) is for receiving input that specifies a password of the set of server credentials for the database of the MDDB cube server. The third stage 2215 illustrates that the user has entered "baydynamics\devadmin" (e.g., through a series of keystrokes) into the UI text input item 2260 to specify a domain and username for a set of server credentials for a database of the MDDB cube server. In addition, this stage 2215 shows that the user has entered a series of characters (e.g., through a series of keystrokes), which are hidden by asterisks, into the UI text input item 2265 to specify a password for the set of server credentials for the database of the MDDB cube server.

At the third stage 2215, the selectable UI item 2240 is for navigating back to the second stage 2210 of the GUI 2200 and the selectable UI item 2230 is for navigating to the fourth stage 2220 of the GUI 2200. As such, when the GUI 2200 receives a selection (e.g., through a cursor control operation such as clicking a mouse button, tapping a trackpad, or touching a touchscreen) of the selectable UI item 2240, the process 2000 provides the second stage 2210 of the GUI 2200. Furthermore, when the GUI 2200 receives a selection (e.g., through a cursor control operation such as clicking a mouse button, tapping a trackpad, or touching a touchscreen) of the selectable UI item 2230, the process 2000 provides the fourth stage 2220 of the GUI 2200.

The fourth stage 2220 shows the GUI 2200 after the user has selected the selectable UI item 2230 in the third stage 2215. As shown, this stage 2220 of the GUI 2200 includes the selectable UI items 2230-2240. The GUI 2200 at this stage 2220 further includes selectable UI item 2270 and UI text input items 2275 and 2280.

The UI text input item 2275 (e.g., the User name text input field) is for receiving input that specifies a username for a set of server credentials for a data source (e.g., a data mart). The UI text input item 2280 (e.g., the Password text input field) is for receiving input that specifies a password of the set of server credentials for the data source.

The selectable UI item 2270 (e.g., the set of radio buttons) is for selecting between types of authentication options (Windows authentication and SQL Server authentication in this example) for the data source. One type of authentication option (Windows authentication in this example) is selected when the GUI 2200 receives a selection (e.g., through a cursor control operation such as clicking a mouse button, tapping a trackpad, or touching a touchscreen) of the top portion of the selectable UI item 2270. Another type of authentication option (SQL Server authentication in this example) is selected when the GUI 2200 receives a selection (e.g., through a cursor control operation such as clicking a mouse button, tapping a trackpad, or touching a touchscreen) of the bottom portion of the selectable UI item 2270. For this example, such a selection has been made, as indicated by the highlighting of the radio button next to the Use SQL Server authentication option of the selectable UI item 2270.

The fourth stage 2220 shows that the user has entered "sa" (e.g., through a series of keystrokes) into the UI text input item 2275 to specify a user name for a set of server credentials for a data source. This stage 2220 also shows that the user has entered a series of characters (e.g., through a series of keystrokes), which are hidden by asterisks, into the UI text input item 2280 to specify a password for the set of server credentials for the data source.

In the fourth stage 2220, the selectable UI item 2240 is for navigating back to the third stage 2215 of the GUI 2200. Thus, when the GUI 2200 receives a selection (e.g., through a cursor control operation such as clicking a mouse button, tapping a trackpad, or touching a touchscreen) of the selectable UI item 2240, the process 2000 provides the third stage 2215 of the GUI 2200.

At this stage 2220, the selectable UI item 2230 is for completing the receipt of configuration data for the MDDB cube server. When the GUI 2200 receives a selection (e.g., through a cursor control operation such as clicking a mouse button, tapping a trackpad, or touching a touchscreen) of the selectable UI item 2230, the process 2000 stores (e.g., in an SQL database) the configuration data received through the GUI 2200 for the MDDB cube server and configures the MDDB cube server based on the configuration data received through the GUI 2200. In some embodiments, the process 2000 configures the MDDB cube server by verifying that the MDDB cube server configuration data is valid (e.g., by attempting to establish a connection to the MDDB cube server using the configuration data received through the GUI 2200).

Returning back to FIG. 20, the process 2000 configures (at 2030) a presentation object server. The presentation object server of some embodiments is configured based on configuration data. Examples of such configuration data may include a server host name, a port number, a secure sockets layer (SSL) port number, a set of server credentials, and/or any other data for configuring the presentation object server.

In some embodiments, the presentation object server is hosted on the same set of computing devices that hosts the MDDB cube server while, in other embodiments, the presentation object server is hosted on a set of computing devices separate from the set of computing devices used to host the MDDB cube server.

The process 2000 in some embodiments provides a GUI (not shown) similar to the GUI 2100 illustrated in FIG. 21 except that the GUI is for receiving configuration data for configuring the presentation object server. Thus, such a GUI includes a selection panel 2105, a first user interface (UI) text input (e.g., the Server host name text input field) for receiving input that specifies the host name of the presentation object server, a second UI text input item (e.g., the Port text input field) for receiving input that specifies a port number or an SSL port number through which the presentation object server is hosted, a first selectable UI item (e.g., a Test Connection button) for invoking a test that attempts to establish a connection to a presentation object server based on the input received in the first and second UI text input items, and a second selectable UI item (e.g., the Save button) for saving the input received in the first and second UI text input items. The process 2000 of some embodiments automatically configures the presentation object server based on configuration data for configuring other servers (e.g., the logic server or the MDDB cube server).

Additionally, the process 2000 in some embodiments provides the GUI 2300 illustrated in FIG. 23 after receiving configuration data for configuring the presentation object server. In particular, FIG. 23 illustrates the GUI 2300 at two stages 2305 and 2310 after receiving configuration data for the presentation object server.

The first stage 2305 illustrates that the GUI 2300 includes the selection panel 2105 and a selectable UI item 2315 (e.g., the Change Reporting Server Settings button) for navigating to the second stage 2310 of the GUI 2300 to edit configuration data for configuring the presentation object server when the GUI 2300 receives a selection (e.g., through a cursor control operation such as clicking a mouse button, tapping a trackpad, or touching a touchscreen) of the selectable UI item 2315. This stage 2305 also shows the GUI 2300 displaying the uniform resource locator (URL) of the current presentation object server as well as the authentication type configured for the current presentation object server.

The second stage 2310 shows the GUI 2300 after the user has selected the selectable UI item 2315 in the first stage 2305. As shown, the GUI 2300 includes UI text input items 2325 and 2330 and selectable UI items 2320, 2230, and 2235.

The UI text input item 2325 (e.g., the Domain\UserName text input field) is for receiving input that specifies a domain and username of a set of server credentials for the presentation object server. The UI text input item 2330 (e.g., the Password text input field) is for receiving input that specifies a password of the set of server credentials for the presentation object server. The second stage 2310 illustrates that the user has entered "baydynamics\devadmin" (e.g., through a series of keystrokes) into the UI text input item 2325 to specify a domain and username for a set of server credentials for the presentation object server. Also, this stage 2310 shows that the user has entered a series of characters (e.g., through a series of keystrokes), which are hidden by asterisks, into the UI text input item 2330 to specify a password for the set of server credentials for the presentation object server.

The selectable UI item 2320 (e.g., the set of radio buttons) is for selecting between types of server credential options (Windows authentication and Credentials stored securely in the presentation object server in this example) for the presentation object server. One type of server credential option (Windows authentication in this example) is selected when the GUI 2300 receives a selection (e.g., through a cursor control operation such as clicking a mouse button, tapping a trackpad, or touching a touchscreen) of the top portion of the selectable UI item 2320. Another type of server credential option (Credentials stored securely in the presentation object server in this example) is selected when the GUI 2300 receives a selection (e.g., through a cursor control operation such as clicking a mouse button, tapping a trackpad, or touching a touchscreen) of the bottom portion of the selectable UI item 2320. For this example, such a selection has been made, as indicated by the highlighting of the radio button next to the Credentials stored securely in the presentation object server option of the selectable UI item 2320.

In some embodiments, the selectable UI item 2230 (e.g., the Next button) is for completing the editing of configuration data for the presentation object server. When the GUI 2200 receives a selection (e.g., through a cursor control operation such as clicking a mouse button, tapping a trackpad, or touching a touchscreen) of the selectable UI item 2230, the process 2000 stores (e.g., in an SQL database) the configuration data received through the GUI 2300 for the presentation object server and configures the presentation object server based on the configuration data received through the GUI 2300. In some embodiments, the process 2000 configures the presentation object server by verifying that the presentation object server configuration data is valid (e.g., by attempting to establish a connection to the presentation object server using the configuration data received through the GUI 2300).

The selectable UI item 2235 (e.g. the Cancel button) is for terminating the GUI 2300. In some embodiments, the process 2000 provides a GUI (not shown) that includes the selection panel 2105 when the GUI 2300 receives a selection (e.g., through a cursor control operation such as clicking a mouse button, tapping a trackpad, or touching a touchscreen) of the selectable UI item 2235.

The presentation object server of some embodiments handles the generation and management (e.g., storing and provisioning) of presentation objects. A presentation object, in some embodiments, is a predefined representation of a perspective of a set of MDDB cubes. In other words, the presentation object of such embodiments consumes a portion of or all of a set of MDDB cubes. The presentation object of some embodiments can include a set of charts, graphs, reports, and/or tables. The charts, graphs, reports, and/or tables of the presentation object are generated based on the perspective of the set of MDDB cubes that define the presentation object.

Returning back to FIG. 20, the process 2000 configures (at 2040) a scheduling server and then the process 2000 ends. In some embodiments, the scheduling server is configured based on configuration data. Examples of such configuration data may include a server host name, a set of credentials, or any other data for configuring the scheduling server.

In some embodiments, the process 2000 provides the GUI 2400 illustrated in FIG. 24 in order to receive configuration data for configuring the scheduling server. In particular, FIG. 24 illustrates the GUI 2400 at two stages 2405 and 2410 of receiving configuration data for the scheduling server.

The first stage 2405 illustrates that a user has entered input (e.g., through a series of keystrokes) into a UI text input item 2415 (e.g., the SQL Server Agent Host text input field) that is for receiving input that specifies the host name of the scheduling server. The first stage 2205 also illustrates selectable UI items 2230 and 2235.

The selectable UI item 2230 (e.g., the Next button) is for navigating to the second stage 2410 of the GUI 2400. When the GUI 2400 receives a selection (e.g., through a cursor control operation such as clicking a mouse button, tapping a trackpad, or touching a touchscreen) of the selectable UI item 2230, the process 2000 provides the second stage 2410 of the GUI 2400. The selectable UI item 2235 (e.g. the Cancel button) is for terminating the GUI 2400. In some embodiments, the process 2000 provides a GUI (not shown) that includes the selection panel 2105 when the GUI 2400 receives a selection (e.g., through a cursor control operation such as clicking a mouse button, tapping a trackpad, or touching a touchscreen) of the selectable UI item 2235.

The second stage 2410 shows the GUI 2400 after the user has selected the selectable UI item 2230 in the first stage 2405. As shown in this stage 2410, the GUI 2400 includes the selectable UI items 2230 and 2235. The GUI 2200 further includes selectable UI item 2240 and UI text input items 2440 and 2445.

The UI text input item 2440 (e.g., the Domain\UserName text input field) is for receiving input that specifies a domain and username of a set of server credentials for the scheduling server. The UI text input item 2445 (e.g., the Password text input field) is for receiving input that specifies a password of the set of server credentials for the scheduling server. As shown, the second stage 2410 illustrates that the user has entered "baydynamics\devadmin" (e.g., through a series of keystrokes) into the UI text input item 2440 to specify a domain and username for a set of server credentials for a database of the MDDB cube server. Additionally, this stage 2410 shows that the user has entered a series of characters (e.g., through a series of keystrokes), which are hidden by asterisks, into the UI text input item 2445 to specify a password for the set of server credentials for the scheduling server.

The selectable UI item 2240 is for navigating back to the first stage 2405 of the GUI 2400. When the GUI 2400 receives a selection (e.g., through a cursor control operation such as clicking a mouse button, tapping a trackpad, or touching a touchscreen) of the selectable UI item 2240, the process 2000 provides the first stage 2405 of the GUI 2400.

In the second stage 2410, the selectable UI item 2230 (e.g., the Next button) is for completing the receipt of configuration data for the scheduling server. When the GUI 2400 receives a selection (e.g., through a cursor control operation such as clicking a mouse button, tapping a trackpad, or touching a touchscreen) of the selectable UI item 2230, the process 2000 stores (e.g., in an SQL database) the configuration data received through the GUI 2400 for the scheduling server and configures the scheduling server based on the configuration data received through the GUI 2400. In some embodiments, the process 2000 configures the presentation object server by verifying that the presentation object server configuration data is valid (e.g., by attempting to establish a connection to the presentation object server using the configuration data received through the GUI 2400).

The scheduling server of some embodiments manages the processing of MDDB cubes. For instance, the scheduling server processes a set of specified MDDB cubes according to a defined schedule (e.g., a frequency at which to process MDDB cubes, a time at which to process MDDB cubes), in some embodiments.

B. Software Architecture

As described above, the logic server of some embodiments handles the implementation of the logic of the content pack and MDDB system. The logic server of some embodiments is implemented by a web server (e.g., Microsoft Internet Information Services (IIS)®). In some of these embodiments, the logic server communicates with other servers (e.g., an MDDB cube server, a presentation object server, a scheduling server, etc.) in the content pack and MDDB system through a set of web services provided by the logic server.

Figure 25:
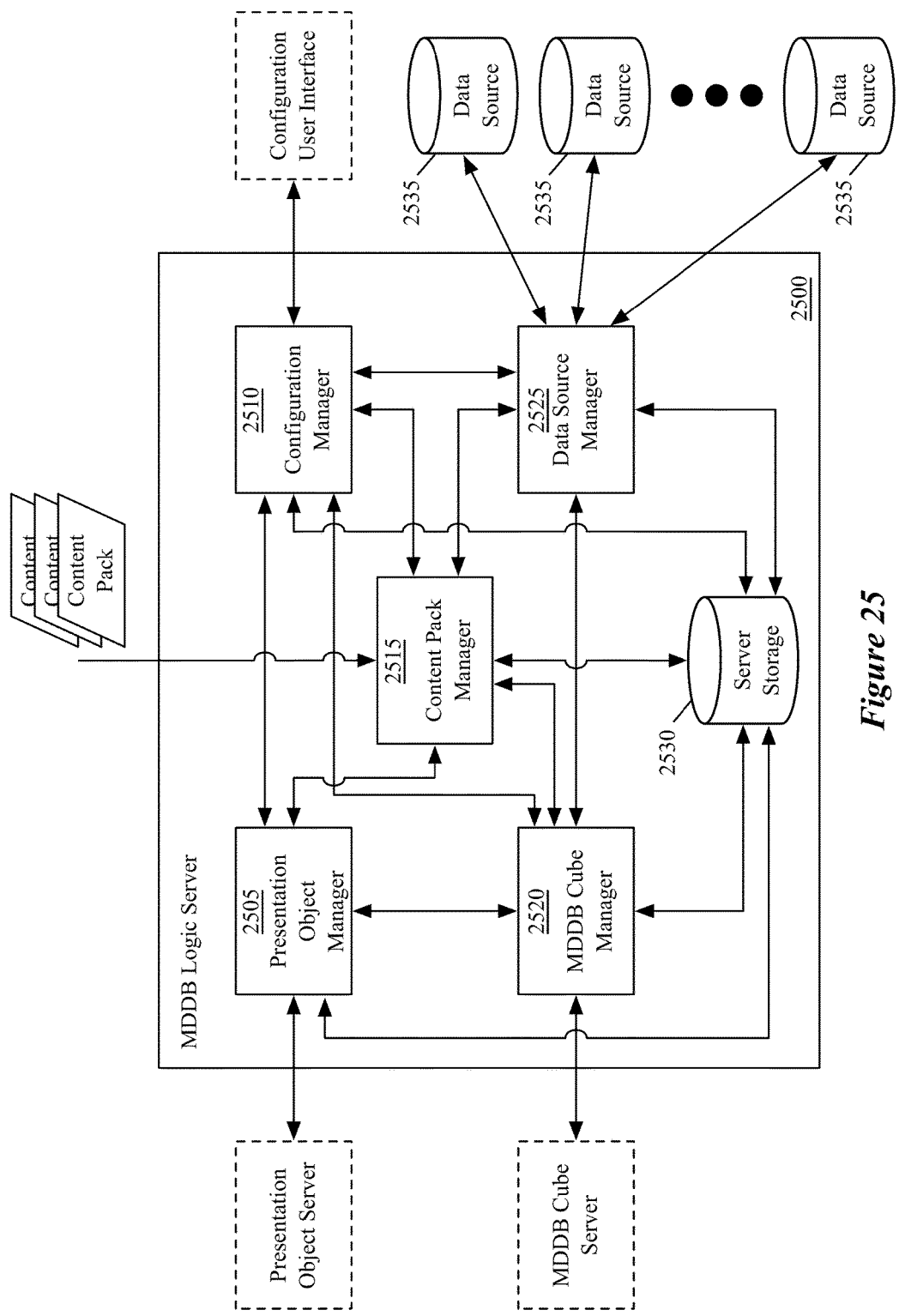
FIG. 25 conceptually illustrates a software architecture of an MDDB system of some embodiments.

FIG. 25 conceptually illustrates a software architecture 2500 of an MDDB system of some embodiments. Specifically, the MDDB system of some such embodiments is an MDDB logic server that may be configured by the process 2000, which is described above by reference to FIG. 20. As shown, the software architecture 2500 includes a presentation object manager 2505, a configuration manager 2510, a content pack manager 2515, an MDDB cube manager 2520, a data source manager 2525, a server storage 2530, and data sources 2535.

In some embodiments, the configuration manager 2510 serves as a communication gateway between users of the MDDB logic server and the MDDB logic server. For instance, the configuration manager 2510 is responsible for managing requests and commands that the configuration manager 2510 receives through UIs (e.g., a GUI, command line interfaces, or any other type of interface for receiving input). In response, the configuration manager 2510 forwards the requests and commands to one or more modules in the MDDB logic server (e.g., the presentation object manager 2505, the content pack manager 2515, the MDDB cube manager 2520, the data source manager 2525, and the server storage 2530) to fulfill the requests and perform the commands. In some embodiments, the configuration manager 2510 accesses the server storage 2530 in order to manage the requests and commands.

The content pack manager 2515 of some embodiments manages content packs for the MDDB system. For instance, the content pack manager 2515 receives content packs, as shown in FIG. 25, and processes the received content packs. In some embodiments, these content packs may have a data structure similar to the one described above by reference to FIG. 18. In such instances, the content pack manager 2515 accesses the data structures in order to process the content packs.

Moreover, the content pack manager 2515 receives requests (e.g., from the presentation object manager 2505 and the MDDB cube manager 2520) for a single content map that combines the relationships specified in the content map of each content pack in the MDDB system. In some embodiments, the single content map is referred to as a unified content map. When the content pack manager 2515 receives such requests, the content pack manager 2515 generates a unified content map based on the content packs and sends the unified content map to the requestor. In some embodiments, the content pack manager 2515 also accesses a unified data source (e.g., hosted by the server storage 2530 and managed by the data source manager 2525) for data (e.g., to generate a unified content map) in order to manage the content packs for the MDDB system.

The MDDB cube manager 2520 of some embodiments manages MDDB cubes for the MDDB system. For instance, the MDDB cube manager 2520 is responsible for handling requests received from the configuration manager 2510 that are related to MDDB cubes. The MDDB cube manager 2520 may receive requests to install and uninstall MDDB cubes. In response, the MDDB cube manager 2520 may install the requested MDDB cubes on an MDDB cube server, which hosts MDDB cubes, and/or may uninstall the requested MDDB cubes from the MDDB cube server.

The MDDB cube manager 2520 of some embodiments sends requests to the content pack manager 2515 for a unified content map in order for the MDDB cube manager 2520 to determine the statuses (e.g., not available, available, and available and installed) of each MDDB cube. To manage MDDB cubes, the MDDB cube manager 2520, in some embodiments, accesses a unified data source (e.g., hosted by the server storage 2530 and managed by the data source manager 2525) for data (e.g., to install and uninstall MDDB cubes).

In some embodiments, the presentation object manager 2505 manages presentation objects for the MDDB system. For example, the presentation object manager 2505 handles requests received from the configuration manager 2510 that are related to presentation objects. Examples of some requests include requests to install and uninstall presentation objects. In response to such requests, the presentation object manager 2505 may install the requested presentation objects on a presentation object server, which hosts presentation objects, and/or may uninstall the requested presentation objects from the presentation object server.

The presentation object manager 2505 of some embodiments sends request to the content pack manager 2515 for a unified content map in order for the presentation object manager 2505 to determine the statuses of presentation objects. To manage the presentation objects, the presentation object manager 2505, in some embodiments, accesses a unified data source (e.g., hosted by the server storage 2530 and managed by the data source manager 2525) for data (e.g., to install and uninstall presentation objects). In some embodiments, the presentation object manager 2505 implements the presentation object manager 2505, which is described above by reference to FIG. 7.

The data source manager 2525 is responsible for managing the data sources 2535. In some embodiments, the data source manager 2525 is implemented as one of the data source managers previously described above (e.g., the data source manager described above by reference to FIG. 10 or FIG. 14). Thus, the data source manager 2525 may establish connections to each of the data sources 2535 in order to verify that the data source is valid. Once a connection is established to a data source, in some embodiments, the data source manager 2525 maintains the connection to the data source.

Additionally, the data source manager 2525 is responsible for the provisioning of a unified data source (e.g., hosted by the server storage 2530), which provides a layer of abstraction between the data sources 2535 and the MDDB system. When changes occur to the data sources 2535 (e.g., a data source 2535 is removed or a new data source is added), the data source manager 2525 propagates such changes to the unified data source.

In some embodiments, the server storage 2530 includes a relational database for hosting a unified data source for the MDDB system. Also, the server storage 2530 may store information for managing MDDB cubes and/or presentation objects. Examples of such information include content packs, metadata associated with the content packs, metadata related to UIs for allowing a user to interact with the MDDB system, and MDDB system configuration data. In some embodiments, the server storage 2530 hosts connections to the data sources 2535 that are managed by the data source manager 2525. In some embodiments, the data source manager 2525 and the server storage 2530 are implemented as part of a relational database management system.

The data sources 2535 of some embodiments are similar to the data sources 1130, which are described above by reference to FIG. 11. That is, each of the data sources 2535 stores data that is represented by data source objects and/or stored in a unified data source (e.g., by the server storage 2530). In addition, each of the data sources 2535 may be implemented in any number of different ways. For instance, a data source 2535 may be implemented as a database (e.g., a relational database, a hierarchical database, a flat file database, or any other type of database for storing data). Also, the data source 2535 may be implemented as a file (e.g., an XML file, an spreadsheet file, a comma-separated values (CSV) file, a text file, etc.). In addition, the data source 2535 may be implemented as a combination of databases and/or files, or as any other type of object that serves as a source of data. Additionally, the data sources 2535 may be different data storages, in some embodiments. For instance, the data sources 2535 may include different instances of one data storage of one product from one vendor and/or include different instances of different data storages of different products from one vendor or different vendors.

While many of the features have been described as being performed by one module (e.g., the content pack manager 2515 or the data source manager 2525), one of ordinary skill in the art would recognize that the features might be split up among multiple modules. Similarly, the features described as being performed by several different modules might be performed by a single module in some embodiments (e.g., the presentation object manager 2505 might be part of the MDDB cube manager 2520).

C. Adding and Removing Data Sources

Some of the figures described above discuss a data source manager of some embodiments that provisions a unified data source in order to provide a layer of abstraction between multiple data sources and an MDDB system. As mentioned above, a unified data source of some embodiments is a collection of data source objects that represent data in the multiple data sources. Moreover, adding data sources to the MDDB system and removing data sources from the MDDB system may cause the data source manager of some such embodiments to perform corresponding adjustments to data source objects in the unified data source.

Figure 26:
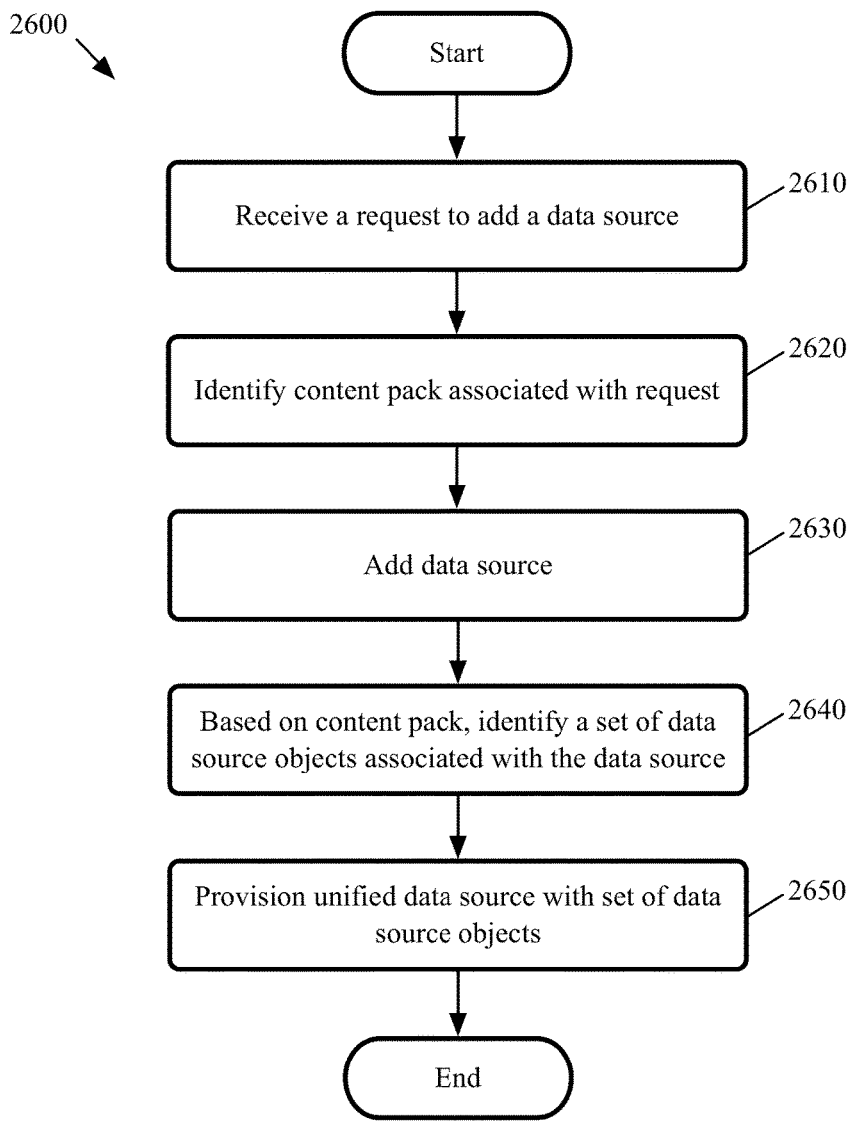
FIG. 26 conceptually illustrates a process of some embodiments for adding data source objects to a unified data source.
Figure 27:
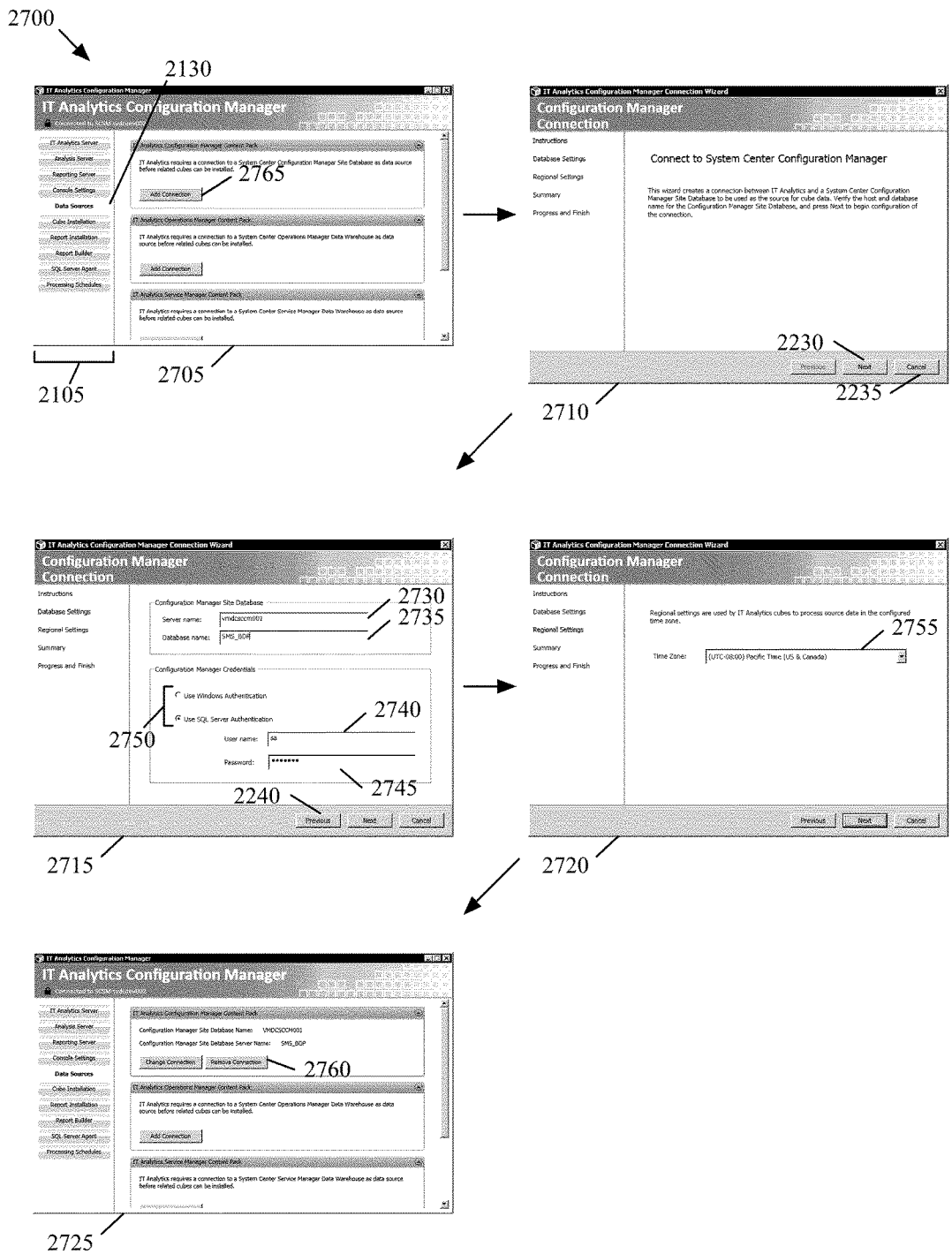
FIG. 27 conceptually illustrates an example GUI for adding a data source.

FIG. 26 conceptually illustrates a process 2600 of some embodiments for adding data source objects to a unified data source. In some embodiments, a data source manager (e.g., such as any of the data source managers described above by reference to FIGS. 10, 11, 14, and 25) performs the process 2600 when a data source is added to an MDDB system. FIG. 26 will be described by reference to FIG. 27, which conceptually illustrates an example GUI 2700 for adding a data source. Specifically, FIG. 27 illustrates the GUI 2700 at five different stages 2705-2725 of a data source addition operation.

The process 2600 begins by receiving (at 2610) a request to add a data source to an MDDB system. In some embodiments, the request is received from a user of an MDDB system through a UI. FIG. 27 illustrates an example of such a UI that the process 2600 provides in some embodiments. As shown, the first stage 2705 of the GUI 2700 includes the selection panel 2105 and several selectable UI items. In some embodiments, the first stage 2705 of the GUI 2700 is provided when the GUI 2700 receives a selection (e.g., through a cursor control operation such as clicking a mouse button, tapping a trackpad, or touching a touchscreen) of the selectable UI item 2130 included in the selection panel 2105.

The selectable UI item 2765 (e.g., the Add Connection button) is for initiating a data source addition operation. When the GUI 2700 receives a selection (e.g., through a cursor control operation such as clicking a mouse button, tapping a trackpad, or touching a touchscreen) of the selectable UI item 2765, the process 2600 receives the request to add the data source to the MDDB system.

Next, the process 2600 identifies (at 2620) a content pack associated with the data source that is requested to be added to the MDDB system. In some embodiments, the process 2600 identifies the content pack by accessing a content pack ID field of a content pack data structure described above by reference to FIG. 18.

The process 2600 of some embodiments provides the second stage 2710 of the GUI 2700 after the process 2600 identifies the content pack associated with the request. As illustrated in FIG. 27, the second stage 2710 shows the GUI 2700 after a user has selected (e.g., through a cursor control operation such as clicking a mouse button, tapping a trackpad, or touching a touchscreen) the selectable UI item 2765. As shown, this stage 2710 of the GUI 2700 displays instructions for configuring a data source to add to the MDDB system.

The GUI 2700 at the second stage 2710 includes selectable UI items 2230 and 2235. In this stage 2710, the selectable UI item 2230 is for navigating to the third stage 2715 of the GUI 2700. Therefore, when the GUI 2700 receives a selection (e.g., through a cursor control operation such as clicking a mouse button, tapping a trackpad, or touching a touchscreen) of the selectable UI item 2230, the process 2600 provides the third stage 2715 of the GUI 2700. In this example, the selectable UI item 2235 is for terminating the GUI 2700. In some embodiments, the process 2600 provides a GUI (not shown) that includes the selection panel 2105 when the GUI 2700 receives a selection (e.g., through a cursor control operation such as clicking a mouse button, tapping a trackpad, or touching a touchscreen) of the selectable UI item 2235.

The third stage 2715 illustrates the GUI 2700 after the user has selected the selectable UI item 2230 in the second stage 2710. In this stage 2715, the GUI 2700 includes the selectable UI items 2230 and 2235. The GUI 2200 further includes UI text input items 2730-2745 and selectable UI items 2240 and 2750.

The UI text input item 2730 (e.g., the Server name text input field) is for receiving input that specifies the server name of the data source that is to be added to the MDDB system. In this example, the server name "vmdcsccm001" has been input (e.g., through a series of keystrokes) into the UI text input item 2730. The UI text input item 2735 (e.g., the Database name text input field) is for receiving input that specifies a name for the data source that is to be added to the MDDB system. In this example, a data source name of "SMS_BDP" has been input (e.g., through a series of keystrokes) into the UI text input item 2735.

The UI text input item 2740 (e.g., the User name text input field) is for receiving input that specifies a username for a set of credentials for the data source that is to be added to the MDDB system. The UI text input item 2745 (e.g., the Password text input field) is for receiving input that specifies a password of the set of credentials for the data source.

The selectable UI item 2750 (e.g., the set of radio buttons) is for selecting between types of authentication options (Windows authentication and SQL Server authentication in this example) for the data source. One type of authentication option (Windows authentication in this example) is selected when the GUI 2700 receives a selection (e.g., through a cursor control operation such as clicking a mouse button, tapping a trackpad, or touching a touchscreen) of the top portion of the selectable UI item 2750. Another type of authentication option (SQL Server authentication in this example) is selected when the GUI 2700 receives a selection (e.g., through a cursor control operation such as clicking a mouse button, tapping a trackpad, or touching a touchscreen) of the bottom portion of the selectable UI item 2750. For this example, such a selection has been made, as indicated by the highlighting of the radio button next to the Use SQL Server authentication option of the selectable UI item 2750.

The selectable UI item 2240 is for navigating back to the second stage 2710 of the GUI 2700. When the GUI 2700 receives a selection (e.g., through a cursor control operation such as clicking a mouse button, tapping a trackpad, or touching a touchscreen) of the selectable UI item 2740, the process 2600 provides the second stage 2710 of the GUI 2700. At the third stage 2715, the selectable UI item 2230 is for navigating to the fourth stage 2720 of the GUI 2700. As such, when the GUI 2700 receives a selection (e.g., through a cursor control operation such as clicking a mouse button, tapping a trackpad, or touching a touchscreen) of the selectable UI item 2230, the process 2600 provides the fourth stage 2720 of the GUI 2700.

The fourth stage 2720 of the GUI 2700 illustrates that the user has selected the selectable UI item 2230 in the third stage 2715. At this stage 2720, the GUI 2700 includes a selectable UI item 2755 (e.g., a Time Zone drop-down list) for receiving input that specifies a time zone for the data source that is to be added to the MDDB system.

At the fourth stage 2720, the selectable UI item 2240 is for navigating back to the third stage 2715 of the GUI 2700. As such, when the GUI 2700 receives a selection (e.g., through a cursor control operation such as clicking a mouse button, tapping a trackpad, or touching a touchscreen) of the selectable UI item 2240, the process 2600 provides the third stage 2715 of the GUI 2700.

Also at this stage 2720, the selectable UI item 2230 is for completing the data source addition operation. Therefore, when the GUI 2700 receives a selection (e.g., through a cursor control operation such as clicking a mouse button, tapping a trackpad, or touching a touchscreen) of the selectable UI item 2230, the process 2600 of some embodiments receives the request to add the data source based on the information provided through the GUI 2700 at the third stage 2715 and the fourth stage 2720.

Several stages of the GUI 2700 (e.g., stages 2705, 2710, and 2720) illustrated in FIG. 27 display strings (e.g., text) in the GUI 2700. In some embodiments, these strings displayed in the GUI 2700 are provided from a data source metadata field of a content pack data structure as described above by reference to FIG. 18.

Returning back to FIG. 26, the process 2600 then adds (at 2630) the data source to the MDDB system. The process 2600 of some embodiments adds the data source by establishing a connection to the data source based on the information provided through the UI (e.g., the third stage 2715 and the fourth stage 2720 of the GUI 2700) in order to verify that the data source is valid. In some embodiments, the process 2600 stores the connection and/or the connection information in a data storage (e.g., in the server storage 2530).

Based on the content pack, the process 2600 then identifies (at 2640) a set of data source objects associated with the data source. In some embodiments, the process 2600 identify the data source objects by accessing a set of data source commands (e.g., a set of data source commands for creating data source objects in a data source) specified in a field of the content pack data structure, which is described above by reference to FIG. 18.

Finally, the process 2600 provisions (at 2650) the unified data source to include the identified set of data source objects. In some embodiments, the process 2600 provisions the unified data source by (1) removing any data source objects in the unified data source that are associated with the identified content pack and then (2) provisioning the remaining data source objects in the unified data source with the identified set of data source objects. This ensures that the unified data source does not include duplicates of a data source object. In some embodiments, the process 2600 provisions the unified data source by executing a set of data source commands (e.g., a set of data source commands for creating data source objects in a data source) specified in a field of the content pack data structure, which is described above by reference to FIG. 18. As shown, the fifth stage 2725 of FIG. 27 illustrates the GUI 2700 after the process 2600 of some embodiments is completed.

Figure 28:
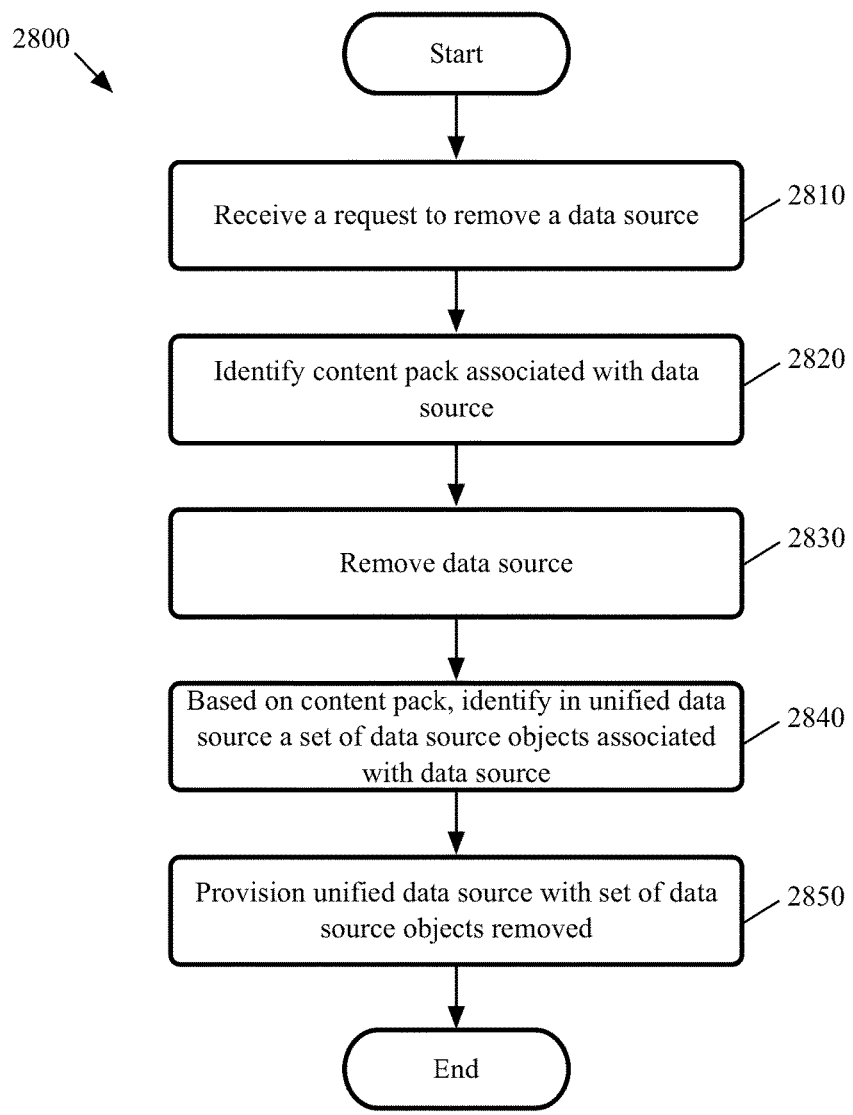
FIG. 28 conceptually illustrates a process of some embodiments for removing data source objects from a unified data source.

In addition to adding a data source to an MDDB system, some embodiments allow a data source to be removed from the MDDB system. FIG. 28 conceptually illustrates a process 2800 of some embodiments for removing data source objects from a unified data source. In some embodiments, a data source manager (e.g., such as any of the data source managers described above by reference to FIGS. 10, 11, 14, and 25) performs the process 2800 when a data source is removed from an MDDB system.

The process 2800 starts by receiving (at 2810) a request to remove a data source from an MDDB system. Referring to FIG. 27, the fifth stage 2725 of the GUI 2700 includes a selectable UI item 2760 (e.g., the Remove Connection button) for initiating a data source removal operation. In some embodiments, the process 2800 receives the request to remove the data source from the MDDB system when the GUI 2700 receives a selection (e.g., through a cursor control operation such as clicking a mouse button, tapping a trackpad, or touching a touchscreen) of the selectable UI item 2760.

Next, the process 2800 identifies (at 2820) a content pack associated with the data source that is requested to be removed from the MDDB system. In some embodiments, the process 2800 identifies the content pack by accessing a content pack ID field of a content pack data structure described above by reference to FIG. 18.

The process 2800 then removes (at 2830) the data source from the MDDB system. The process 2800, in some embodiments, removes the data source from the MDDB system by destroying a connection that has been established to the data source. In some such embodiments, the process 2800 destroys the connection by removing the connection and/or the connection information from a data storage (e.g., in the server storage 2530).

Based on the content pack, the process 2800 then identifies (at 2840), in the unified data source, a set of data source objects associated with the removed data source. In some embodiments, the process 2800 identifies the data source objects by accessing a set of data source commands (e.g., a set of data source commands for deleting data source objects from a data source) specified in a field of the content pack data structure, as described above by reference to FIG. 18.

Finally, the process 2800 provisions (at 2850) the unified data source with the set of data source objects removed from the unified data source (i.e., the set of data source objects is not included in the provisioned unified data source). In some embodiments, the process 2800 provisions the unified data source by executing a set of data source commands (e.g., a set of data source commands for deleting data source objects from a data source) specified in a field of the content pack data structure, as described above by reference to FIG. 18.

D. Content Pack Manager

Figure 29:
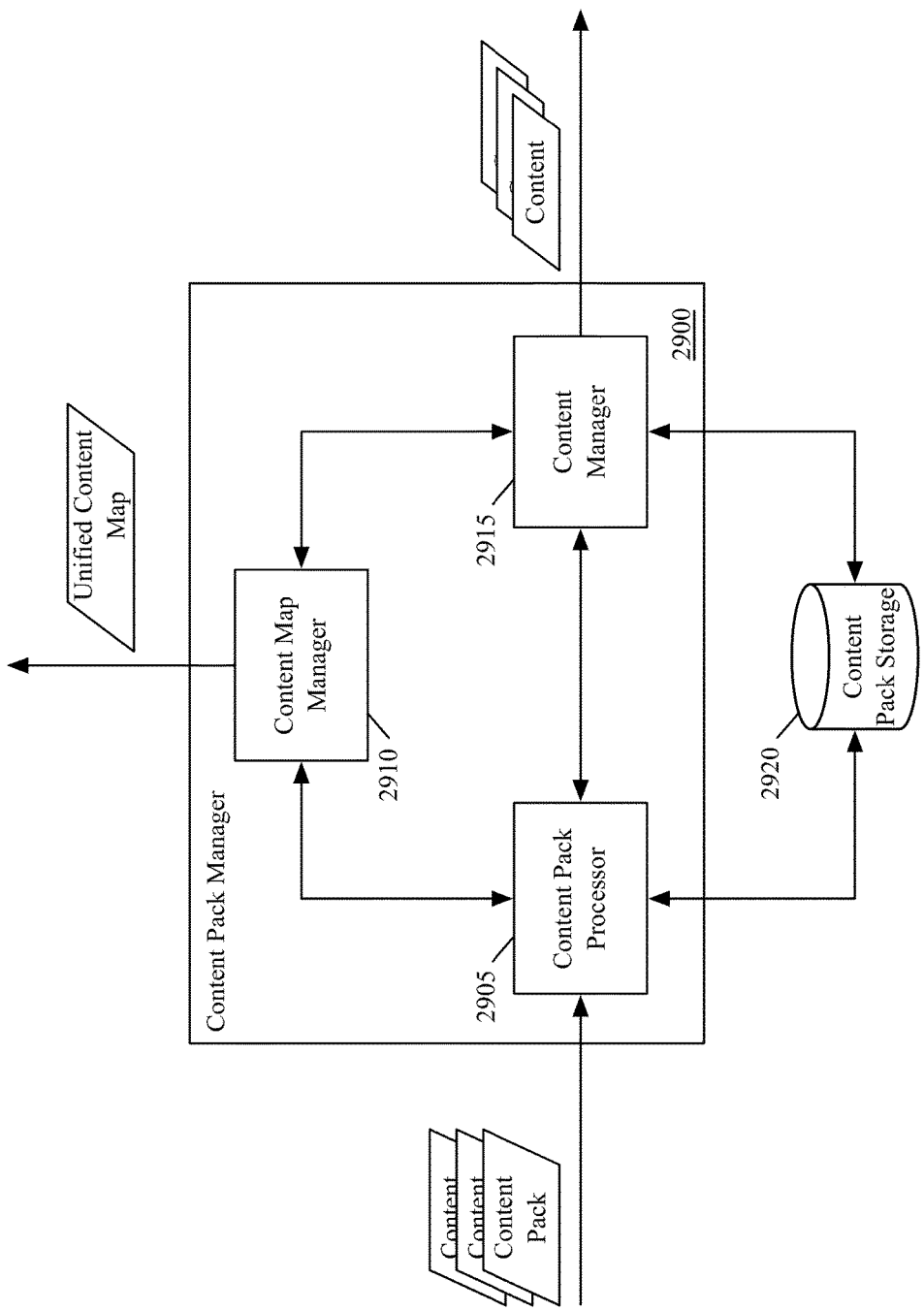
FIG. 29 conceptually illustrates a software architecture of a content pack manager of some embodiments.

As noted above, the content pack manager of some embodiments handles the management of content packs for an MDDB system. The following section will discuss details of such a content pack manager. FIG. 29 conceptually illustrates a software architecture of a content pack manager 2900 of some embodiments. The content pack manager 2900 of some embodiments is employed to implement the content pack manager 2515, which is described above by reference to FIG. 25. As shown, the content pack manager 2900 includes a content pack processor 2905, a content map manager 2910, a content manager 2915, and a content pack storage 2920.

The content pack processor 2905 receives and processes content packs. In some embodiments, the content pack processor 2905 receives a content pack when the content pack is installed in the MDDB system. To install the content pack in the MDDB system, some embodiments store the content pack in the content pack storage 2920 as a binary object. Some embodiments may install the content pack by storing the content pack in a set of system directories utilized by the MDDB system. In some embodiments, the content pack manager 2900 installs the content pack while, in other embodiments, another component in the MDDB system (e.g., the configuration manager 2510) installs the content pack. In some cases, the content pack may be installed in response to a request received (e.g., through a GUI, a command line interface, or any other type of interface for receiving input) from a user of the MDDB system.

As such, the content pack processor 2905 of some embodiments monitors the MDDB system for newly-installed content packs. When the content pack processor 2905 of some such embodiments detects a newly-installed content pack, the content pack processor 2905 processes the content pack by (1) identifying the content (e.g., DSV definitions, dimension definitions, MDDB cube definitions, presentation object definitions, etc.) and associated information (e.g., data source metadata, content map, data source commands, etc.) and (2) sending the content and associated information to the content manager 2915 for storage in the content pack storage 2920. In some of these embodiments, the content pack processor 2905 accesses the data structures of the content packs, such as the one described above by reference to FIG. 18, in order to process the content packs.

In addition, the content pack processor 2905 of some embodiments may receive requests to uninstall content packs. When the content pack processor 2905 uninstalls a requested content pack, the content pack processor 2905 may uninstall (e.g., remove) some or all of the entities defined by the content pack. In some cases, other entities may depend on entities defined by a content pack that is requested to be uninstalled. In some embodiments, the content pack processor 2905 delays the uninstallation of the content pack until the other entities are uninstalled while, in other embodiments, the content pack processor 2905 uninstalls the other entities as part of uninstalling the content pack.

In some embodiments, the content map manager 2910 manages content maps that are included in the content packs. As noted above, a content map of some embodiments specifies relationships (e.g., data dependencies) between the entities defined by the entity definitions included in the content pack. In some embodiments, the content map manager 2910 receives requests for a unified content map and, in response to the requests, generates a unified content map for the requestors of the unified content map. A unified content map, as mentioned above, is a single content map that combines the relationships specified in the content map of each content pack in the MDDB system. To generate a unified content map, the content map manager 2910 may retrieve the content map of each content pack in the MDDB system from the content manager 2915, which retrieves the content maps from the content pack storage 2920.

The content manager 2915 receives the contents of content packs from the content pack processor 2905 to store in the content pack storage 2920. In addition, the content manager 2915 receives requests for content from content packs (e.g., DSV definitions, dimension definitions, MDDB cube definitions, presentation object definitions, etc.). For example, the content manager 2915 may receive requests for DSV definitions, dimension definitions, and MDDB cube definitions from an MDDB cube manager (e.g., the MDDB cube manager 2520) in order for the MDDB cube manager to manage the MDDB cubes (e.g., determine statuses of MDDB cubes, install MDDB cubes, and uninstall MDDB cubes, etc.). Similarly, the content manager 2915 of some embodiments also receives requests for presentation object definitions and MDDB cube definitions from a presentation object manager (e.g., the presentation object manager 2505) in order for the presentation object manager to install and uninstall presentation objects. In some embodiments, the content manager 2915 accesses the data structures of the content packs, such as the one described above by reference to FIG. 18, in order to manager the content of the content packs.

Furthermore, the content manager 2915 of some embodiments sends other types of data in response to other types of requests. For instance, the content manager 2915 may send definitions of data sources associated with a content pack. As such, the content manager 2915 may receive requests for content maps from the content map manager 2910 in order for the content map manager 2910 to generate unified content maps.

The content pack storage 2920 stores data from content packs (e.g., entity definitions, data source metadata, content map, data source commands) that the content pack storage 2920 receives from the content manager 2915. For instance, the content pack storage 2920 of some embodiments stores the data structures (such as the one described above by reference to FIG. 18) of the content packs. As shown, the content pack processor 2905 and the content manager 2915 access data stored in the content pack storage 2920. In some embodiments, the content map manager 2910 also directly accesses (not shown) data stored in the content pack storage 2920 while, in other embodiments, the content map manager 2910 accesses data stored in the content pack storage 2920 through the content manager 2915.

Different embodiments of the content pack storage 2920 are implemented in different ways. For instance, the content pack storage 2920 may be implemented as a database (e.g., a relational database, a hierarchical database, a flat file database, or any other type of database for storing data). The content pack storage 2920 may also be implemented as a file (e.g., an XML file, an spreadsheet file, a comma-separated values (CSV) file, a text file, etc.). In addition, the content pack storage 2920 may be implemented as a combination of databases and/or files, or may be implemented as any other type of object that serves as a source of data. The content pack storage 2920, in some cases, may be implemented as part of another data storage (e.g., the server storage 2530).

Figure 30:
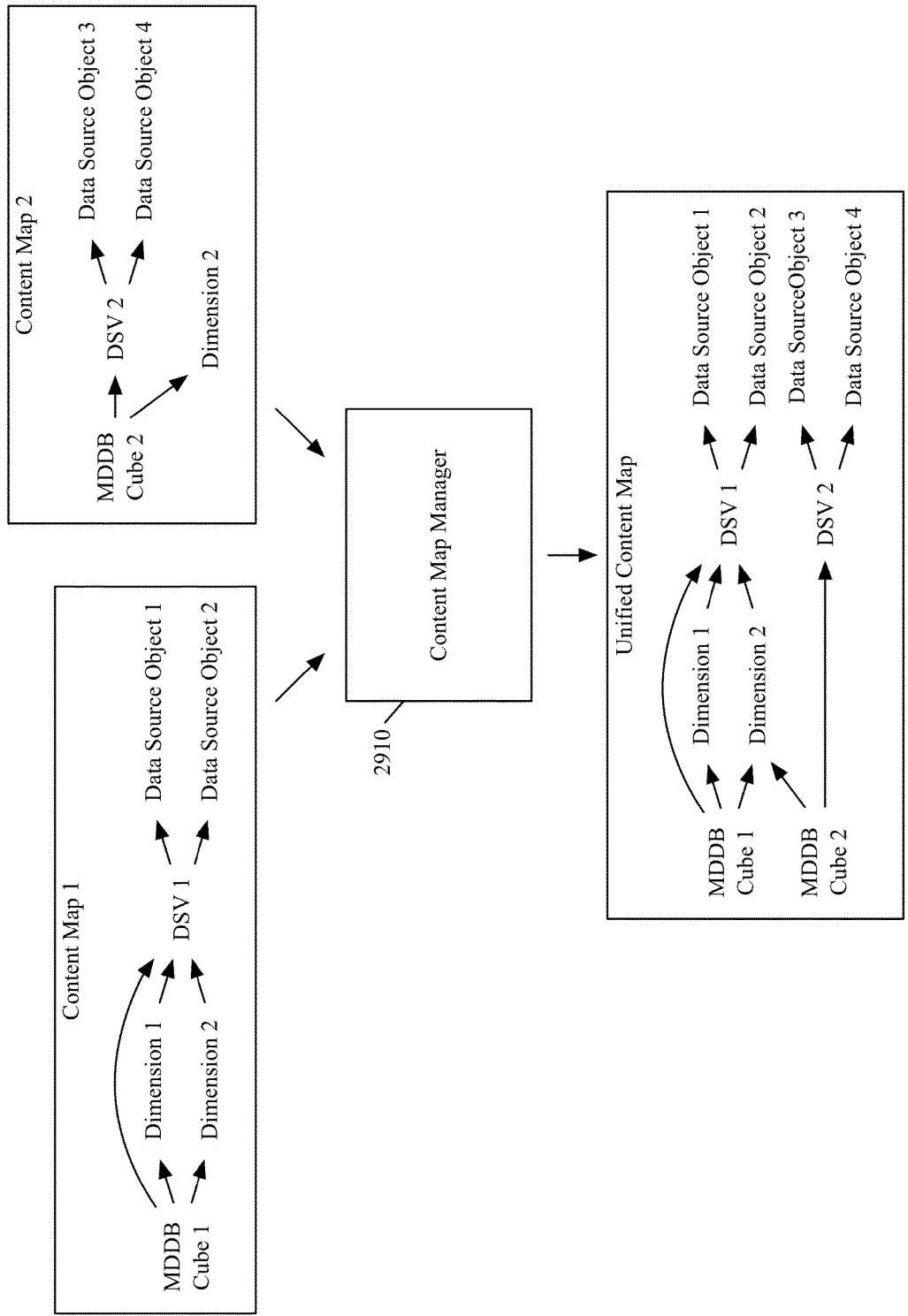
FIG. 30 conceptually illustrates a content map manager of some embodiments that generates a unified content map.

FIG. 30 conceptually illustrates the content map manager 2910 of some embodiments that generates a unified content map. As mentioned above, a unified content map is a single content map that combines the relationships specified in the content map of each content pack in the MDDB system. For purposes of explanation and clarity, two content maps are illustrated. As shown, the content map manager 2910 receives content map 1 and content map 2. In some embodiments, the content map manager 2910 retrieves the content maps 1 and 2 from the content pack storage 2920 through the content manager 2915 while, in other embodiments, the content map manager 2910 retrieves the content maps 1 and 2 directly from the content pack storage 2920.

As discussed above, an MDDB cube of some embodiments is defined by a set of measures and a set of dimensions. In this example, an MDDB cube 1 in the content map 1 depends on DSV 1 (from which the set of measures is derive), dimension 1, and dimension 2. The dimension 1 and the dimension 2 depend on DSV 1. A DSV of some embodiments, as described above, is an object that provides a logical view of data in a unified data source, which is a collection of data source objects in some embodiments. In other words, such a DSV is dependent on a set of data source objects that are included in a unified data source. For this example, the DSV 1 depends on data source object 1 and data source object 2, which are included in a unified data source. The content map 2 specifies an MDDB cube 2, which is dependent on DSV 2 and the dimension 2. The DSV 2 depends on data source object 3 and data source object 4.

When the content map manager 2910 receives the content maps 1 and 2, the content map manager 2910 processes the content maps 1 and 2 to generate a unified content map. Specially, the content map manager 2910 merges the relationships specified in the content maps 1 and 2 into a single content map that combines the relationships specified in the content maps 1 and 2. To generate the unified content map, the content map manager 2910 of some embodiments analyzes the content maps 1 and 2 to identify common entities in the content maps 1 and 2. The content map manager 2910 then reconciles the dependencies that include the identified common entities to eliminate any duplicates in the unified content map. In this example, the dimension 2 is a common entity in the content map 1 and the content map 2. In the content map 1, the MDDB cube 1 is dependent on the dimension 2 while, in the content map 2, the MDDB cube 2 is dependent on the dimension 2. As illustrated in FIG. 30, a single instance of the dimension 2 is included in the unified content map with both the MDDB cube 1 and the MDDB cube 2 specified as dependent on the single instance of the dimension 2.

The content maps in FIG. 30 are conceptual representations of content maps that are illustrated for purposes of explanation and clarity. While the content maps illustrated in FIG. 30 are implemented as single chains of dependencies, the content maps of some embodiments are implemented as lists of single dependencies (e.g., a relationship that specifies two entity definitions and a dependency between the two entity definitions), such as the content map described above by reference to FIG. 18.

Figure 31:
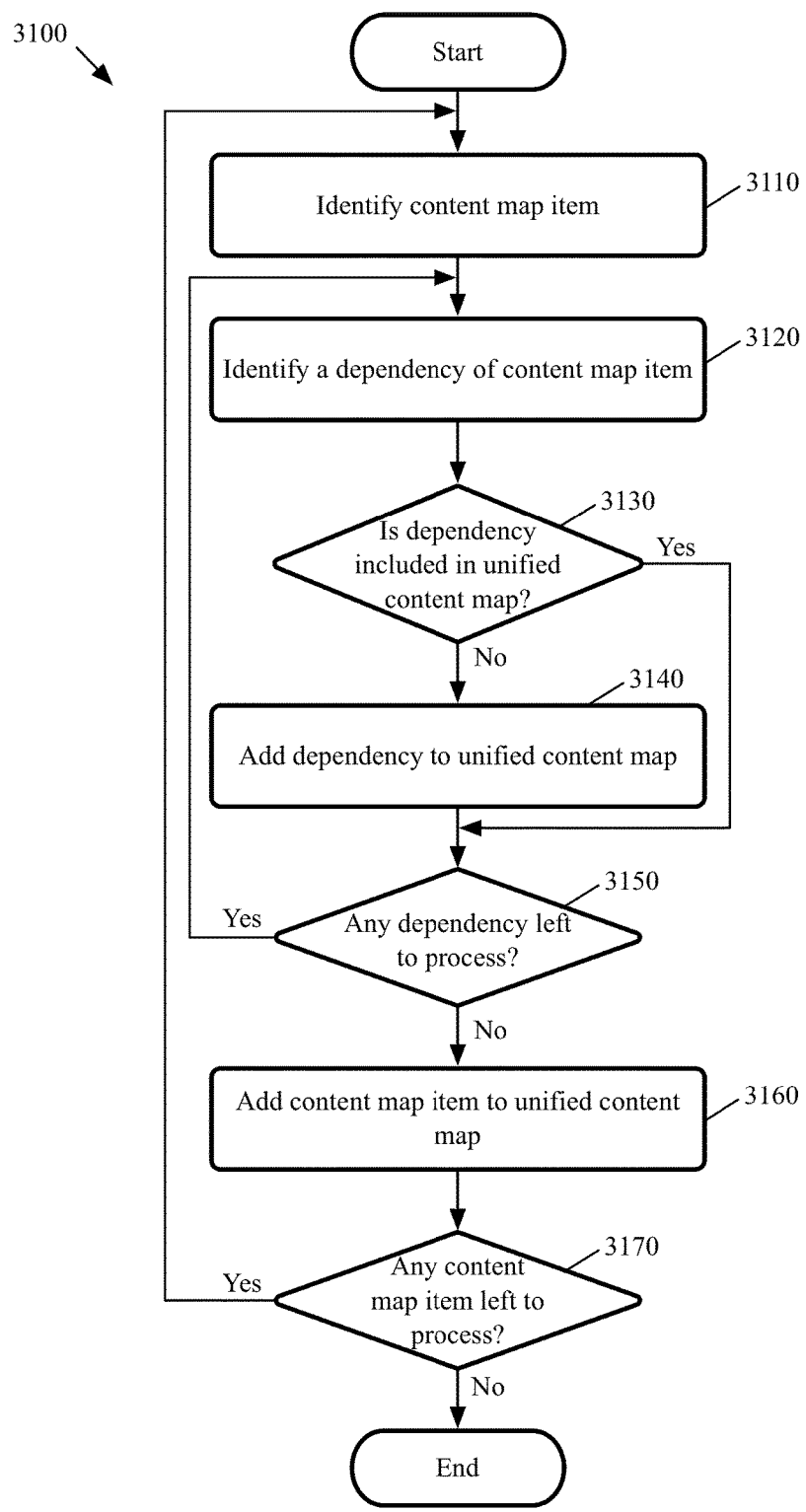
FIG. 31 conceptually illustrates a process of some embodiments for generating a unified content map.

FIG. 31 conceptually illustrates a process 3100 of some embodiments for generating a unified content map. In particular, the process 3100 is for merging a content map with a unified content map. However, the process 3100 may be used to merge a first content map with a second content map as well (e.g., when a unified content map has not been generated).

In some embodiments, the content map manager 2910, which is described above by reference to FIG. 29, performs the process 3100 when the content map manager 2910 receives a request for a unified content map. In some such embodiments, the content map manager 2910 performs the process 3100 on two content maps to generate a unified content map and then performs the process 3100 for each remaining content map that has not been processed in order to merge the content map of each content pack into a single content map.

The process 3100 starts by identifying (at 3110) a content map item (e.g., a DSV ID, a dimension ID, an MDDB cube ID, or a presentation object ID) in the content map. In some embodiments, the process 3100 identifies the content map item by examining a data structure (e.g., the data structure of the content map described above by reference to FIG. 18) that represents the content map.

Next, the process 3100 identifies (at 3120) a dependency of the content map item. In some cases, the content map may specify one dependency for the content map item while, in other cases, the content map may specify multiple dependencies for the content map item. The process 3100 of some embodiments identifies the dependency of the content map item by examining the data structure that represents the content map.

The process 3100 then determines (at 3130) whether the dependency is included in the unified content map. The process 3100 of some embodiments determines whether the dependency is included in the unified content map by examining a data structure (e.g., a data structure that is similar to the one of the content map described above by reference to FIG. 18) that represents the unified content map. When the process 3100 determines that the dependency is included in the unified content map, the process 3100 proceeds to operation 3150. However, when the process 3100 determines that the dependency is not included in the unified content map, the process 3100 proceeds to operation 3140.

At 3140, the process 3100 adds the dependency to the unified content map. The process 3100 of some embodiments adds the dependency to the unified content map by adding a field to a data structure (e.g., a data structure that is similar to the one for the content map described above by reference to FIG. 18) that represents the unified content map.

Next, the process 3100 determines (at 3150) whether any dependency is left to process. When the process 3100 determines that there is a dependency left to process, the process 3100 returns to operation 3120 to continue processing any remaining dependencies of the content map item. When the process 3100 determines that there is no dependency left to process, the process 3100 proceeds to operation 3160.

The process 3100 then adds (at 3160) the content map item to the unified content map. In some embodiments, the process 3100 adds the content map item to the unified content map by (1) adding a field to a data structure (e.g., a data structure that is similar to the one for the content map described above by reference to FIG. 18) that represents the unified content map and (2) specifying in the data structure that the content map item is dependent on each of the identified dependencies of the content map item in the content map.

Finally, the process 3100 determines (at 3170) whether any content map item in the content map is left to process. When the process 3100 determines that there is a content map item in the content map left to process, the process 3100 returns to operation 3110 to continue processing any remaining content map items in the content map. When the process 3100 determines that there is no content map item in the content map left to process, the process 3100 ends.

E. MDDB Cube Manager

Figure 32:
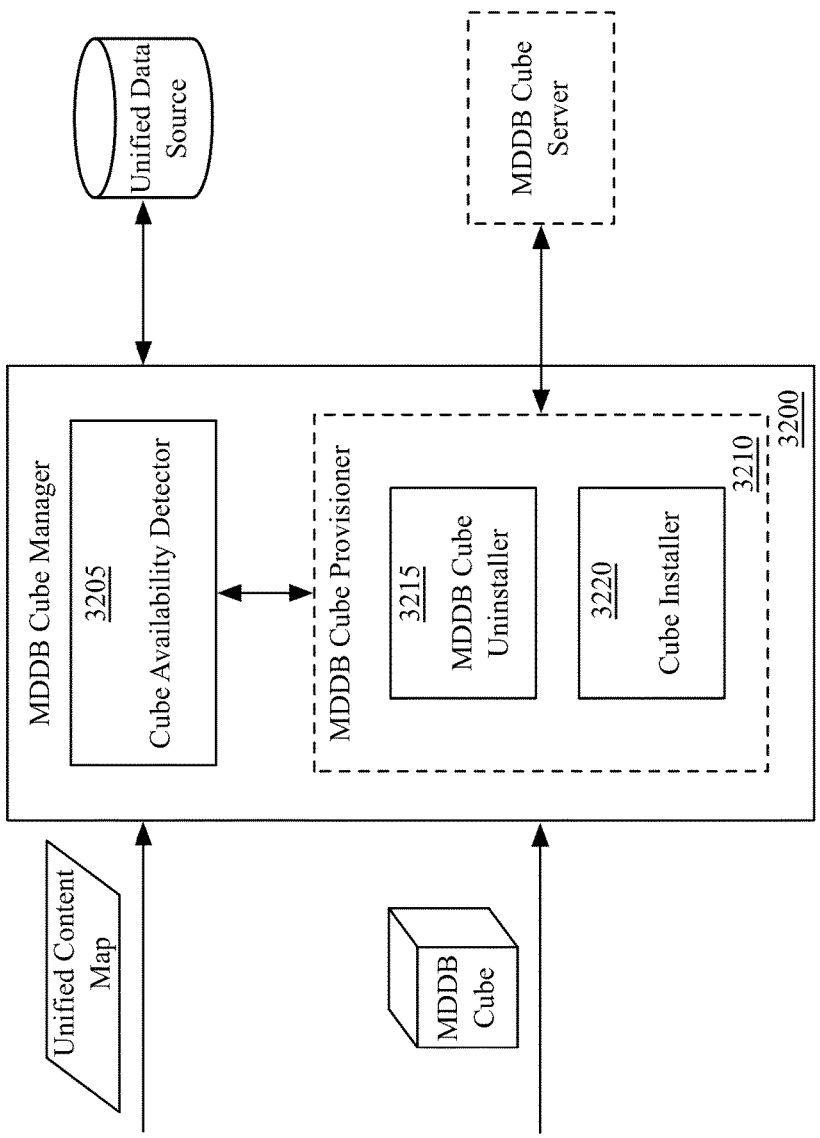
FIG. 32 conceptually illustrates a software architecture of an MDDB cube manager of some embodiments.

As discussed above, the MDDB cube manager of some embodiments handles the management of MDDB cubes in an MDDB system. This section will discuss details of such an MDDB cube manager. FIG. 32 conceptually illustrates a software architecture of an MDDB cube manager 3200 of some embodiments. The MDDB cube manager 3200, in some embodiments, is utilized to implement the MDDB cube manager 2520, which is described above by reference to FIG. 25. As illustrated, the MDDB cube manager 3200 includes an Cube availability detector 3205 and an MDDB cube provisioner 3210.

The cube availability detector 3205 of some embodiments determines the statuses (e.g., not available, available, and available and installed) of MDDB cubes in the MDDB system. As noted above, in some embodiments, an MDDB cube is available when the cube availability detector 3205 determines that data specified for the MDDB cube exists (e.g., a connection can be established to a set of data sources containing the data specified for the MDDB cube).

The cube availability detector 3205 of some embodiments determines the status of an MDDB cube based on a unified content map (e.g., the unified content map described above by reference to FIG. 29, 30 or 31). As such, the MDDB cube manager 3200 of some such embodiments sends requests (e.g., to the content pack manager 2515) for a unified content map and receives the unified content map in response to such requests.

In some embodiments, the cube availability detector 3205 determines the statuses of the MDDB cube based on an MDDB cube definition for the MDDB cube. The cube availability detector 3205 of some such embodiments accesses the MDDB cube definition for the MDDB cube by examining a data structure that includes the MDDB cube definition (e.g., the data structure described above by reference to FIG. 18), which may be stored in a data storage (e.g., the server storage 2530). In some embodiments, the cube availability detector 3205 retrieves the MDDB cube definition for the MDDB cube from a content pack manager (e.g., the content pack manager 2515).

Moreover, the cube availability detector 3205 determines the statuses of the MDDB cube by accessing a unified data source (e.g., hosted by the server storage 2530 and managed by the data source manager 2525) to determine whether data specified by the MDDB cube definition for the MDDB cube exists in the unified data source.

The MDDB cube provisioner 3210 is responsible for handling the provisioning and deprovisioning of MDDB cubes. The MDDB cube provisioner 3210, in some embodiments, provisions MDDB cubes on an MDDB cube server and deprovisions MDDB cubes from the MDDB cube server. As noted above, an MDDB cube server of some embodiments manages, stores, and provisions MDDB cubes. In some such embodiments, the MDDB cube provisioner 3210 instructs the MDDB cube server to manage, store, and provision MDDB cubes.

As shown in FIG. 32, the MDDB cube provisioner 3210 includes an MDDB cube uninstaller 3215 and a cube installer 3220. The cube installer 3220 is responsible for installing MDDB cubes in the MDDB system. For instance, when the MDDB cube manager 3200 receives a request to install an MDDB cube, the cube installer 3220 installs the requested MDDB cube on an MDDB cube server. In some embodiments, the cube installer 3220 automatically installs the MDDB cube on the MDDB cube server when the MDDB cube is determined to be available by the cube availability detector 3205.

In some embodiments, the cube installer 3220 installs an MDDB cube based on an MDDB cube definition for the MDDB cube and a unified content map. Based on the MDDB cube definition for the MDDB cube and the unified content map, the cube installer 3220 may identify and install entities (e.g., DSVs and dimensions) on which the MDDB cube depends but that are not yet installed.

To retrieve the MDDB cube definition, the cube installer 3220 accesses a data structure that includes the MDDB cube definition (e.g., the data structure described above by reference to FIG. 18), which may be stored in a data storage (e.g., the server storage 2530). The cube installer 3220 of some embodiments retrieves the MDDB cube definition for the MDDB cube from a content pack manager (e.g., the content pack manager 2515). The cube installer 3220 may retrieve a unified content map from a content pack manager (e.g., the content pack manager 2515) in some embodiments.

The MDDB cube uninstaller 3215 is responsible for uninstalling (e.g., removing, deprovisioning, etc.) MDDB cubes from the MDDB system. When the MDDB cube manager 3200 receives a request to uninstall an MDDB cube, the MDDB cube uninstaller 3215 uninstalls the requested MDDB cube from the MDDB cube server. In addition, the MDDB cube uninstaller 3215 of some embodiments uninstalls entities (e.g., DSVs and dimensions) on which the uninstalled MDDB cube depended.

Figure 33:
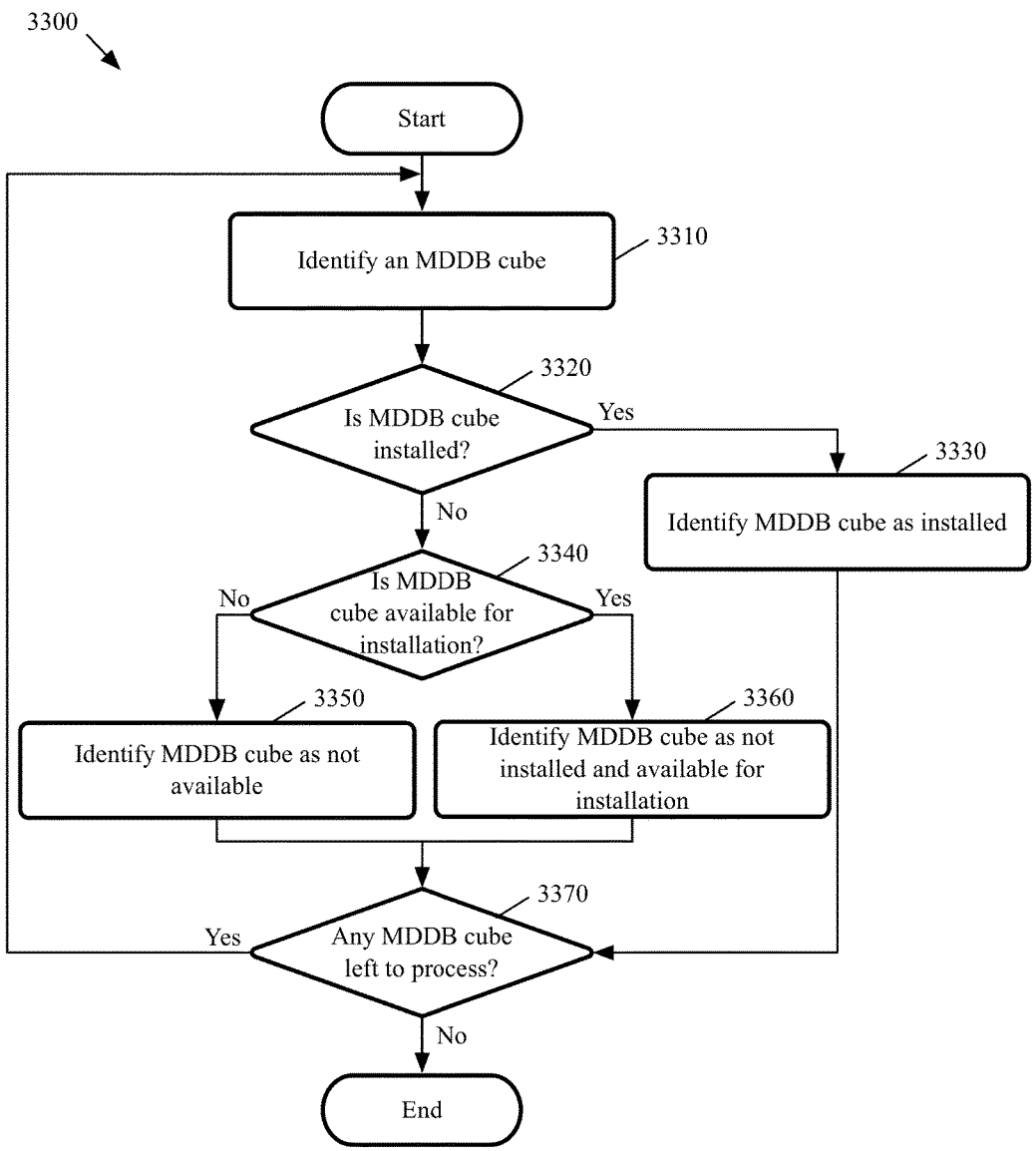
FIG. 33 conceptually illustrates a process of some embodiments for determining statuses for MDDB cubes.

FIG. 33 conceptually illustrates a process 3300 of some embodiments for determining statuses for MDDB cubes. In some embodiments, a cube availability detector (e.g., the cube availability detector described above by reference to FIG. 2 or FIG. 32) performs the process 3300. In some instances, the cube availability detector of such embodiments performs the process 3300 when the cube availability detector receives a request for the statuses of MDDB cubes in the MDDB system. In other instances, the cube availability detector of such embodiments performs the process 3300 when the cube availability detector receives a request for the statuses of MDDB cubes specified in a content pack. In some embodiments, the process 3300 is an automated process that is performed without user intervention.

The process 3300 begins by identifying (at 3310) an MDDB cube. The process 3300 of some embodiments identifies the MDDB cube by (1) examining a data structure that represents a content pack (e.g., the content pack data structure described above by reference to FIG. 18) and (2) identifying an MDDB cube definition of the MDDB cube.

Next, the process 3300 determines (at 3320) whether the MDDB cube is installed in the MDDB system. The process 3300 determines whether the MDDB cube is installed by accessing an MDDB cube server (e.g., through the MDDB cube provisioner 3210) to retrieve a list of installed MDDB cubes on the MDDB server. The MDDB cube is installed in the MDDB system if the MDDB cube is included in the list. Otherwise, the MDDB cube is not installed in the MDDB system. When the process 3300 determines that the MDDB cube is installed, the process 3300 identifies (at 3330) the MDDB cube as installed and then proceeds to operation 3370.

When the process 3300 determines that the MDDB cube is not installed, the process 3300 determines (at 3340) whether the MDDB cube is available for installation. To determine whether the MDDB cube is available for installation, the process 3300 of some embodiments performs the process described below by reference to FIG. 34. When the process 3300 determines that the MDDB cube is not available for installation, the process identifies (at 3350) the MDDB cube as not available and then proceeds to operation 3370. When the process 3300 determines that the MDDB cube is available for installation, the process identifies (at 3360) the MDDB cube as available and then proceeds to operation 3370.

Finally, the process 3300 determines (at 3370) whether any MDDB cube is left to process. When the process 3300 determines that there is an MDDB cube left to process, the process 3300 returns to operation 3310 to continue processing any remaining MDDB cubes.

Figure 34:
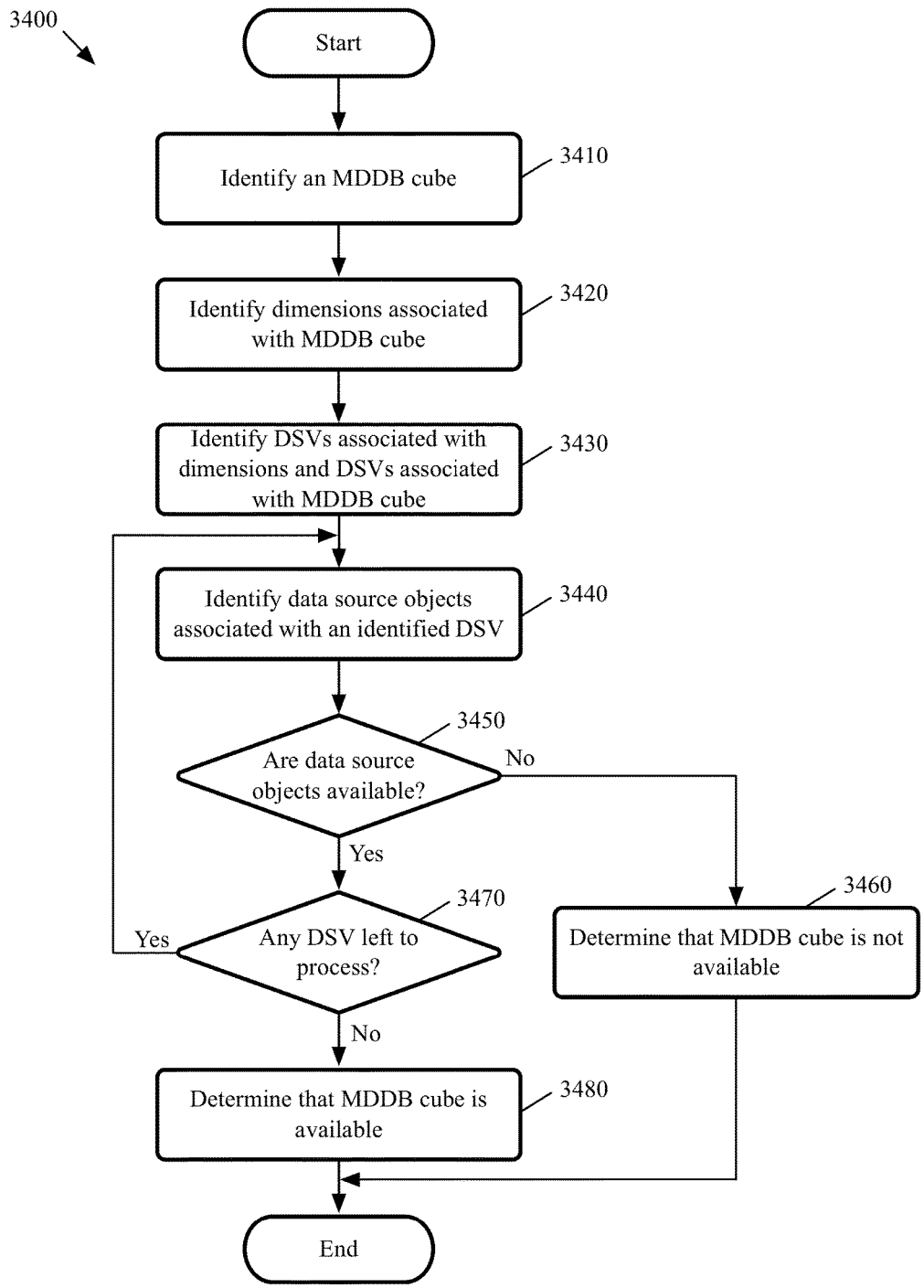
FIG. 34 conceptually illustrates a process of some embodiments for determining that an MDDB cube is available.

FIG. 34 conceptually illustrates a process 3400 of some embodiments for determining that an MDDB cube is available. In some embodiments, the process described above by reference to FIG. 33 performs the process 3400. Also, a cube availability detector (e.g., the cube availability detector described above by reference to FIG. 2 or FIG. 32) may perform the process 3400. The process 3400 of some embodiments is performed when determining the status of an MDDB cube (e.g., by the cube availability detector 210 or the cube availability detector 3205). In some embodiments, the process 3400 is an automated process that is performed without user intervention.

The process starts by identifying (at 3410) an MDDB cube. In some embodiments, the process 3400 identifies the MDDB cube by (1) examining a data structure that represents a content pack (e.g., the content pack data structure described above by reference to FIG. 18) and (2) identifying an MDDB cube definition of the MDDB cube.

After identifying the MDDB cube, the process 3400 identifies (at 3420) a set of dimensions associated with the identified MDDB cube. In some embodiments, the MDDB cube is defined by a set of measures and a set of dimensions. In these embodiments, the process 3400 identifies the set of dimensions that define the MDDB cube as the set of dimensions that are associated with the MDDB cube. The process 3400 of some embodiments identifies the set of dimensions by examining a data structure of a content map (e.g., the content map described above by reference to FIG. 18). In some embodiments, the process 3400 identifies the set of dimensions by accessing a unified content map (e.g., the unified content map described above by reference to FIG. 29, 30, or 31).

Next, the process 3400 identifies (at 3430) a set of DSVs associated with the identified set of dimensions and a set of DSVs associated with the MDDB cube. As mentioned above, the MDDB cube of some embodiments is defined by a set of measures and a set of dimensions. The MDDB cube may be associated with a single DSV from which the set of measures that defines the MDDB cube is derived for the MDDB cube. In some cases, an identified dimension (i.e., a dimension that defines the MDDB cube) is derived from the DSV that is associated with the MDDB cube from which the set of measures is derived for the MDDB cube. However, in other cases, an identified dimension is derived from a DSV that is different from the DSV that is associated with the MDDB cube from which the set of measures is derived for the MDDB cube. In other words, the set of DSVs associated with the identified set of dimensions may include DSVs that are different from the set of DSVs that is associated with the MDDB cube. In some embodiments, the process 3400 identifies the set of DSVs associated with the MDDB cube and the set of DSVs associated with the identified set of dimensions by examining the unified content map.

The process 3400 then identifies (at 3440) a set of data source objects that are associated with an identified DSV. As described above, a DSV of some embodiments is an object that provides a logical view of data in a unified data source. A unified data source, as described above, is a collection of data source objects in some embodiments. Therefore, a DSV is dependent on the set of data source objects that are included in a unified data source. The process 3400 of some embodiments identifies the set of data source objects that are associated with an identified DSV by examining the unified content map.

The process 3400 then determines (at 3450) whether the identified set of data source objects are available. In some embodiments, the process 3400 determines that the set of data source objects are available by accessing the unified data source. If the set of data source objects are included in the collection of data source objects of the unified data source, then the process 3400 determines that the set of data source objects are available. Otherwise, the process 3400 determines that the set of data source objects is not available. When the process 3400 determines that the set of data source objects is not available, the process 3400 determines (at 3460) that the MDDB cube is not available. Then the process 3400 ends.

When the process 3400 determines that the set of data source objects are available, the process 3400 determines (at 3470) whether any DSV is left to process. When the process 3400 determines that there is no DSV left to process, the process 3400 determines (at 3480) that the MDDB cube is available and then the process 3400 ends. Otherwise, the process 3400 returns to operation 3440 to continue processing any remaining identified DSVs.

Figure 35:
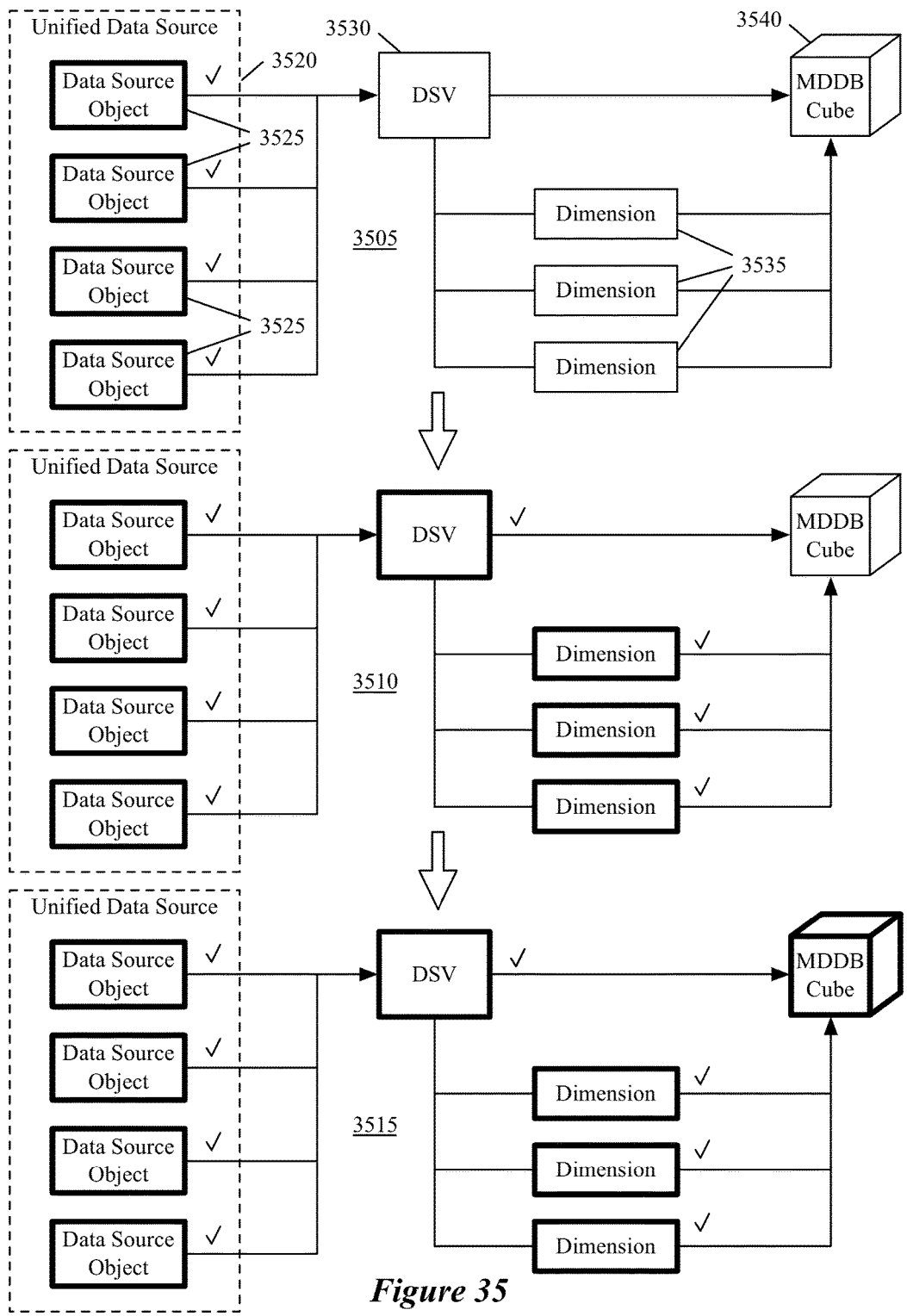
FIG. 35 conceptually illustrates an example of an MDDB cube that is determined to be available.

The following figures conceptually illustrate examples of available and not available MDDB cubes, in terms of data relationships. FIG. 35 conceptually illustrates an example of an MDDB cube 3540 that is determined to be available in terms of data relationships that are used to define the MDDB cube 3540. In particular, FIG. 35 illustrates the determination of the MDDB cube as available in three stages 3505-3515 of an MDDB cube data relationship diagram.

FIG. 35 illustrates a unified data source 3520, a DSV 3530, a set of dimensions 3535, and the MDDB cube 3540. In this example, the unified data source 3520 is a collection of data source objects, which includes a set of data source objects 3525, that presents a single source of data to the DSV 3530. That is, the DSV 3530, which is a logical view of data in the unified data source 3520, is derived from the set of data source objects 3525. The set of dimensions 3535, each of which is metadata for categorizing a set of measures (not shown) along the dimension, is derived from the DSV 3530. The MDDB cube 3540 is defined by a set of measures (not shown) and the set of dimensions 3535. For this example, the set of measures is derived from the DSV 3530.

The first stage 3505 of the MDDB cube data relationship diagram shows that the set of data source objects 3525 in the unified data source 3520 is available, as indicated by the bold outlines and checkmarks for each data source object in the set of data source objects 3525. The DSV 3530 is available, as shown in the first stage 3505, because the DSV 3530 is derived from the set of data source objects 3525 and all of the data source objects in the set of data source objects 3525 are available. In addition, the set of dimensions 3535 is available because the set of dimensions 3535 is derived from the DSV 3530.

The second stage 3510 of the MDDB cube data relationship diagram illustrates that the DSV 3530 and the set of dimensions 3535 are available. The availability of these items is indicated, as in the first stage 3505 of FIG. 35, by bold outlines and checkmarks for the items. The MDDB cube 3540 is available because the MDDB cube 3540 is derived from the DSV 3530 and the set of dimensions 3535, which are both available. The third stage 3515 of the MDDB cube data relationship diagram shows that the MDDB cube 3540 is available, as indicated by a bolding of the MDDB cube 3540.

Figure 36:
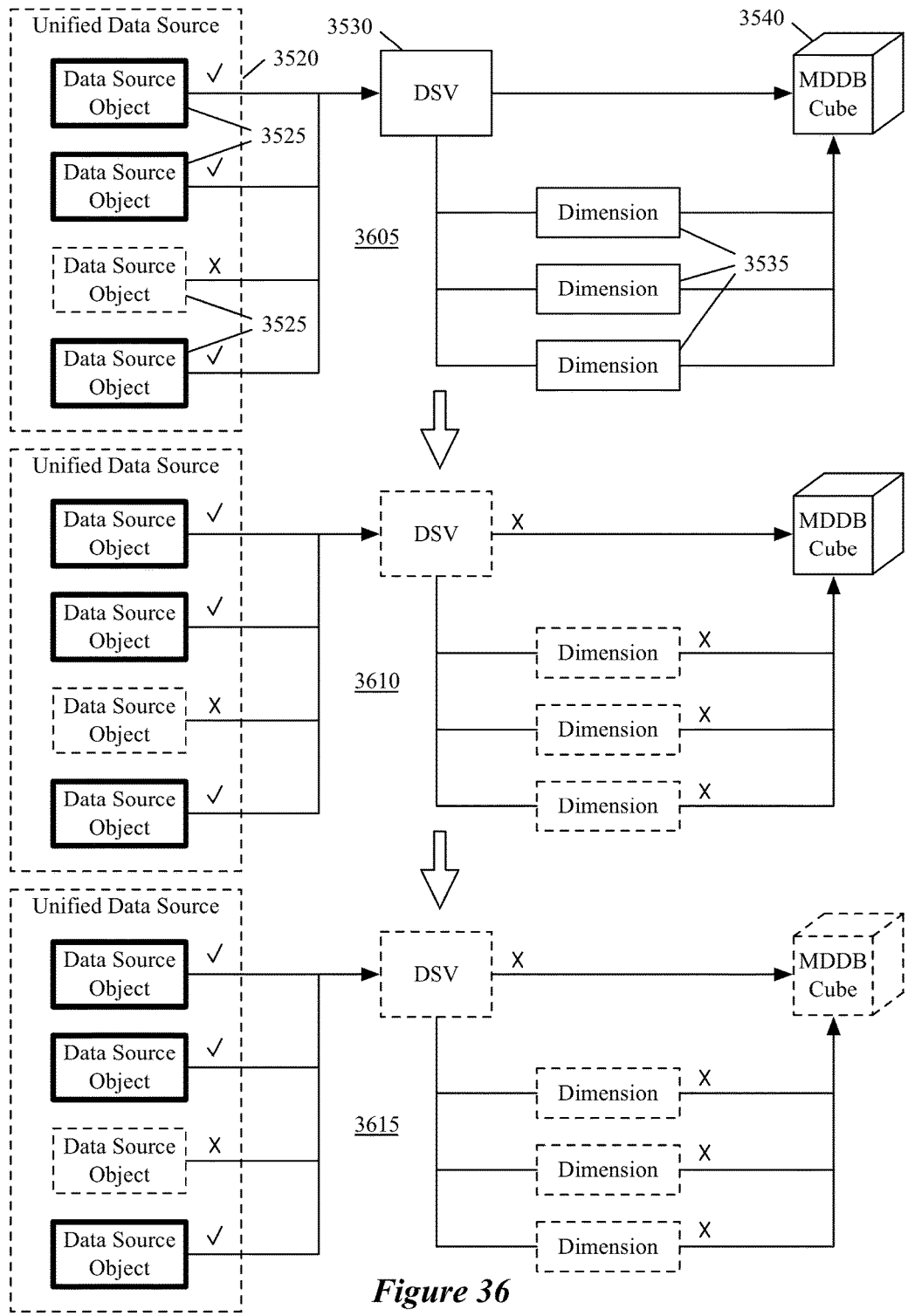
FIG. 36 conceptually illustrates an example of an MDDB cube that is determined to be not available.

In contrast to FIG. 35, FIG. 36 conceptually illustrates an example of the MDDB cube 3540 that is determined to be not available. Specifically, FIG. 36 illustrates the determination of the availability of the MDDB cube 3540 in three stages 3605-3615 of an MDDB cube data relationship diagram. FIG. 36 illustrates the same components (i.e., the unified data source 3520, the set of data source objects 3525, the DSV 3530, the set of dimensions 3535, and the MDDB cube 3540) as those illustrated in FIG. 35.

The first stage 3605 of the MDDB cube data relationship diagram is similar to the first stage 3505 of the MDDB cube data relationship diagram illustrated in FIG. 35 except that one of the data source objects 3525 that is available in the first stage 3505 is not available in the first stage 3605. As shown, the third data source object 3525 from the top in the unified data source 3520 is not available, as indicated by dashed lines of data source object 3525 and an "X" mark next to the unavailable data source object 3525. In this case, the DSV 3530 is not available because the DSV 3530 is derived from the set of data source objects 3525 and one of the data source objects 3525 is not available. As shown, the set of dimensions 3535 is derived from the DSV 3530. Since the DSV 3530 is not available, the set of dimensions 3535 is also not available.

The second stage 3610 of the MDDB cube data relationship diagram illustrates that the DSV 3530 is not available, as indicated by dashed lines of the DSV 3530 and an "X" mark next to the DSV 3530. Furthermore, the second stage 3610 shows that the set of dimensions 3535 is not available, as indicated by dashed lines of the set of dimensions 3535 and an "X" mark next to each dimension in the set of dimensions 3535. The MDDB cube 3540 is derived from the DSV 3530 and the set of dimensions 3535, which are not available. Therefore, the MDDB cube 3540 is not available. The third stage 3615 of the MDDB cube data relationship diagram shows that the MDDB cube 3540 is not available, as indicated by dashed lines of the MDDB cube 3540.

As described above, the cube installer of some embodiments handles the installation of MDDB cubes. During the installation of an MDDB cube, the cube installer may install entities (e.g., DSVs and dimensions) upon which the MDDB cube depends, but that are not yet installed. The following figures (i.e., FIGS. 37A-B) illustrate a process that includes such entity installation operations.

Figure 37A:
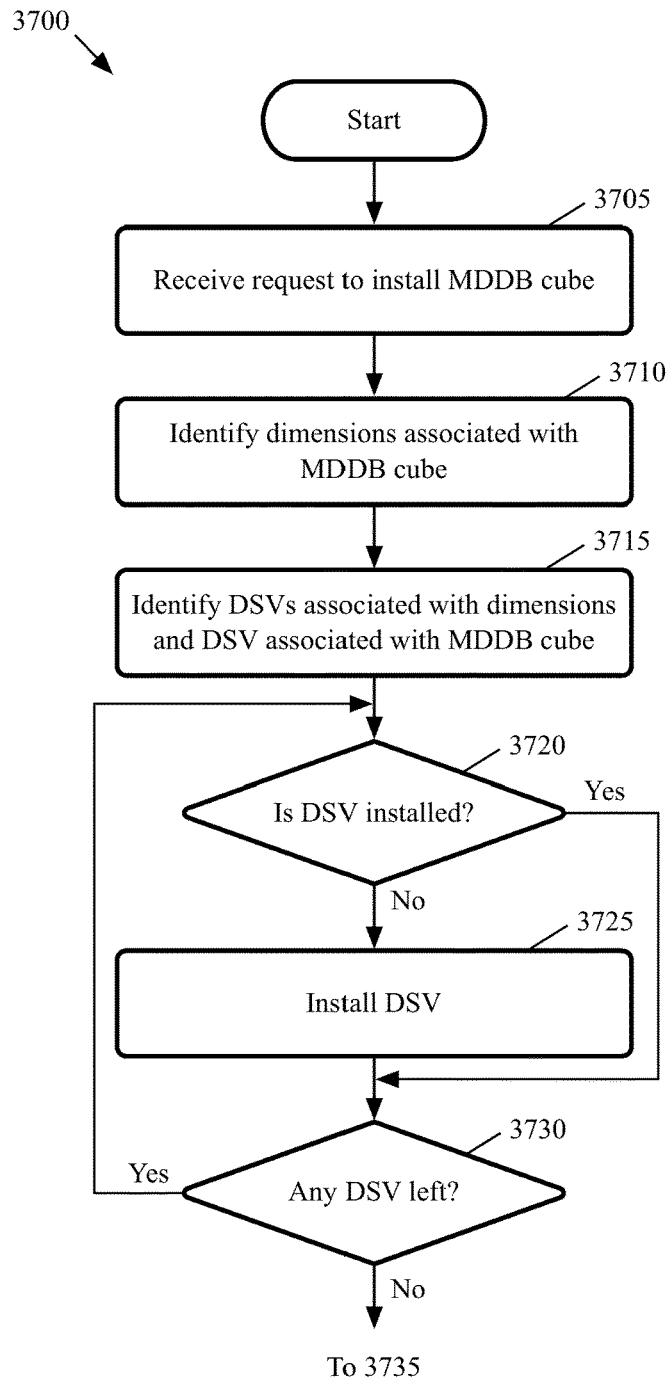
FIGS. 37A-B conceptually illustrates a process of some embodiments for installing an MDDB cube.
Figure 37B:
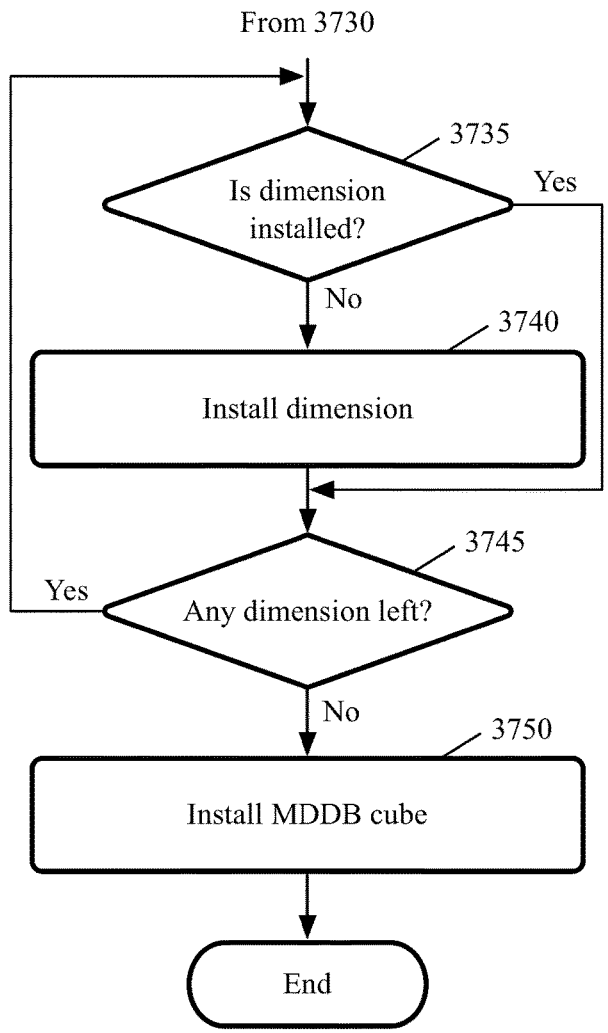

FIGS. 37A-B conceptually illustrates a process 3700 of some embodiments for installing an MDDB cube. In some embodiments, the process 3700 is performed by a cube installer (e.g., the cube installer 3220 described above by reference to FIG. 32) to install an MDDB cube on an MDDB cube server. The process 3700 of some of these embodiments is performed when the cube installer receives a request (e.g., from a user of the MDDB system through a UI) to install an MDDB cube.

The process 3700 begins by receiving (at 3705) a request to install an MDDB cube. In some embodiments, the request to install the MDDB cube is received from a user of the MDDB system through a UI (e.g., a GUI, a command line interface, or any other type of interface for receiving input).

Next, the process 3700 identifies (at 3710) a set of dimensions associated with the MDDB cube. The MDDB cube of some embodiments is defined by a set of measures and a set of dimensions. In such embodiments, the set of dimensions that define the MDDB cube are the identified set of dimensions that are associated with the MDDB cube. In some embodiments, the process 3700 identifies the set of dimensions by examining a data structure of a content map (e.g., the content map described above by reference to FIG. 18) while, in other embodiments, the process 3700 identifies the set of dimensions by accessing a unified content map (e.g., the unified content map described above by reference to FIG. 29, 30, or 31).

The process 3700 then identifies (at 3715) a set of DSVs associated with the identified set of dimensions and a set of DSVs associated with the MDDB cube. As noted above, the MDDB cube of some embodiments is defined by a set of measures and a set of dimensions. In some instances, the MDDB cube may be associated with a single DSV. For example, the set of measures that defines the MDDB cube may be derived from the single DSV. Furthermore, an identified dimension (i.e., a dimension that defines the MDDB cube) also may be derived from the same single DSV that is associated with the MDDB cube. However, in other cases, an identified dimension is derived from a DSV that is different from the DSV that is associated with the MDDB cube from which the set of measures is derived for the MDDB cube. In other words, the set of DSVs associated with the identified set of dimensions may include DSVs that are different from the set of DSVs associated with the MDDB cube. The process 3700 of some embodiments identifies the set of DSVs associated with the MDDB cube and the set of DSVs associated with the identified set of dimensions by examining the unified content map.

After identifying the sets of DSVs, the process 3700 determines (at 3720) whether a DSV in the sets of identified DSVs is installed. In some embodiments, the process 3700 determines whether the DSV is installed by accessing an MDDB cube server that manages, stores, and provisions MDDB cubes. The DSV is installed on the MDDB cube server when an instance of the DSV exists in the MDDB cube server (e.g., by creating, based on a DSV definition of the DSV, a data structure in the MDDB cube server that represents the DSV), in some such embodiments.

When the process 3700 determines that the DSV is installed, the process 3700 proceeds to operation 3730. Otherwise, the process 3700 installs (at 3725) the DSV and then proceeds to operation 3730. The process 3700 of some embodiments installs the DSV on the MDDB cube server by creating, based on a DSV definition of the DSV, a data structure in the MDDB cube server that represents the DSV.

At 3730, the process 3700 determines whether any DSV is left to review for installation. When the process 3700 determines that there is a DSV left to review for installation, the process 3700 returns to operation 3720 to continue reviewing any remaining DSVs. When the process 3700 determines that there is no DSV left to review for installation, the process 3700 proceeds to operation 3735 (as shown in FIG. 37B).

Next, the process 3700 determines (at 3735) whether a dimension in the identified set of dimensions is installed. The process 3700 of some embodiments determines whether the dimension is installed by accessing the MDDB cube server. The dimension is installed on the MDDB cube server when an instance of the dimension exists in the MDDB cube server (e.g., a data structure that represents the dimension has been created on the MDDB cube server), in some such embodiments.

When the process 3700 determines that the dimension is installed, the process 3700 proceeds to operation 3745. When the process 3700 determines that the dimension is not installed, the process 3700 installs (at 3740) the dimension and then proceeds to operation 3745. The process 3700 of some embodiments installs the dimension on the MDDB cube server by creating, based on a dimension definition of the dimension, a data structure in the MDDB cube server that represents the dimension.

At 3745, the process 3700 determines whether any dimension in the identified set of dimensions is left to review for installation. When the process 3700 determines that there is a dimension left to review for installation, the process 3700 returns to operation 3735 to continue reviewing any remaining dimensions in the identified set of dimensions. When the process 3700 determines that there is no dimension left to review for installation, the process 3700 installs (at 3750) the MDDB cube and then ends. In some embodiments, the process 3700 installs the MDDB cube on the MDDB cube server by creating, based on an MDDB cube definition of the MDDB cube, a data structure in the MDDB cube server that represents the MDDB cube.

As described above, the process illustrated in FIGS. 37A-B installs an MDDB cube in response to a request to install the MDDB cube. However, some embodiments include a feature for automatically installing (e.g., upon a cube availability detector determining that MDDB cubes in the MDDB system are available but not already installed) every MDDB cube that is available but not yet installed. In such embodiments, a process similar to the process described above by reference to FIGS. 37A-B is performed. For example, the request to install an MDDB cube may be a request to install every MDDB cube that is available but not yet installed. In that case, the process repeats operations 3710-3750 for each MDDB cube that is available but not yet installed.

Moreover, the cube installer also handles the uninstallation of MDDB cubes, in some embodiments. When uninstalling an MDDB cube, the cube installer of some such embodiments uninstalls entities (e.g., DSVs and dimensions) upon which the MDDB cube depends and that are not used by other entities (e.g., other MDDB cubes). The following figures (i.e., FIGS. 38A-B) illustrate a process that includes such entity uninstallation operations.

Figure 38A:
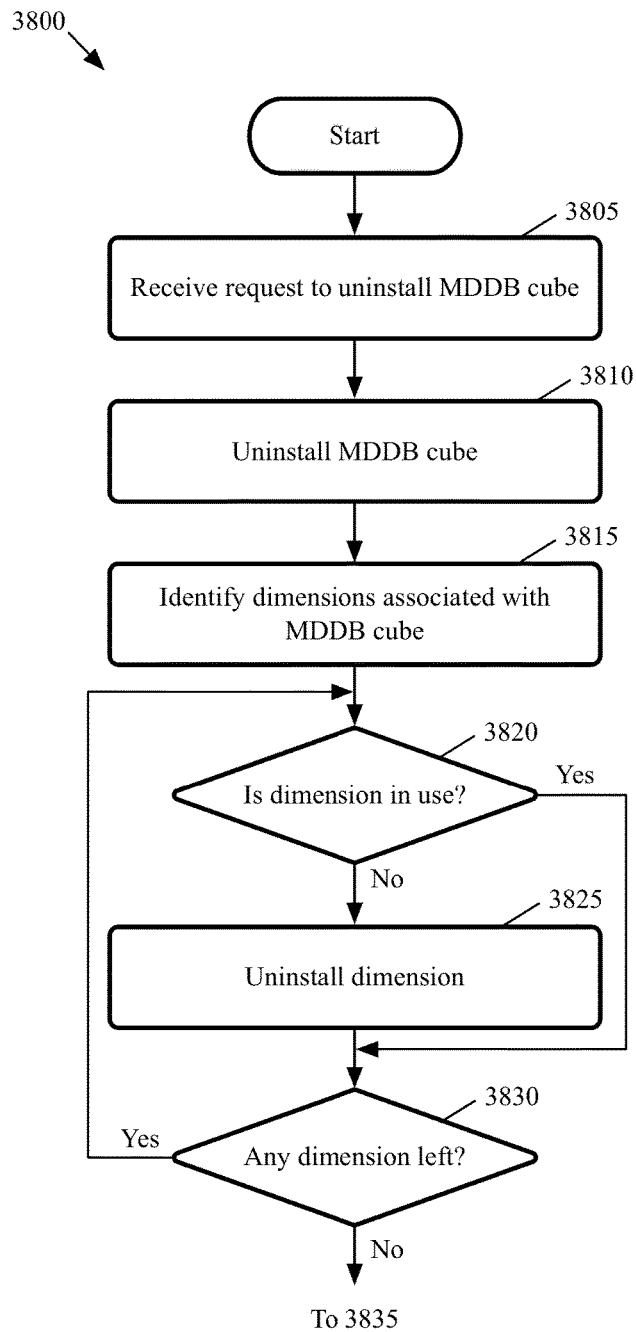
FIGS. 38A-B conceptually illustrates a process of some embodiments for uninstalling an MDDB cube.
Figure 38B:
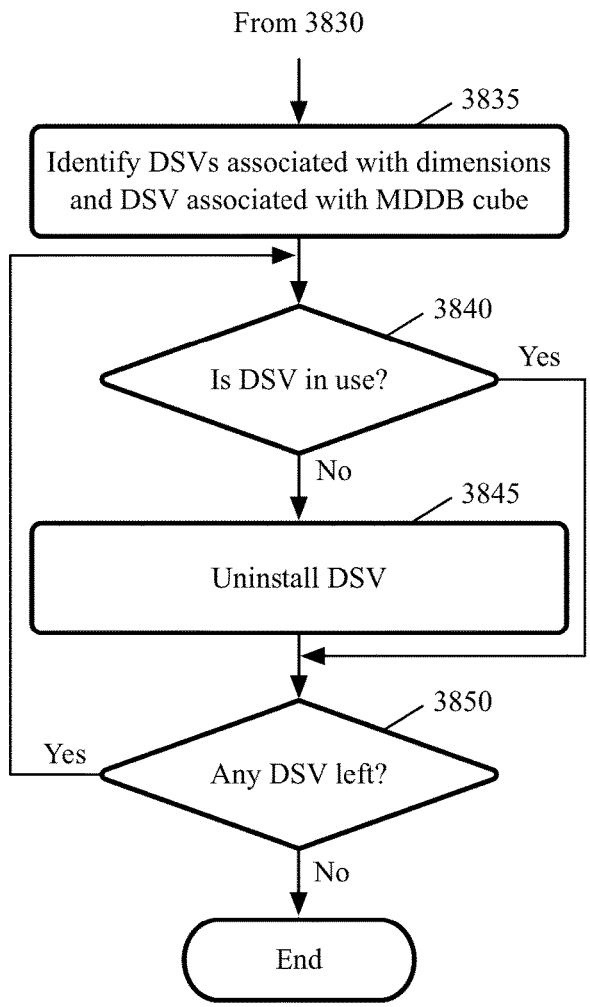

FIGS. 38A-B conceptually illustrates a process of some embodiments for uninstalling an MDDB cube. In some embodiments, the process 3800 is performed by a cube installer (e.g., the cube installer 3220 described above by reference to FIG. 32) to uninstall an MDDB cube on an MDDB cube server. Some such embodiments of the process 3800 are performed when the cube installer receives a request (e.g., from a user of the MDDB system through a UI) to uninstall an MDDB cube.

FIGS. 38A-B will be described by reference to FIGS. 39-41, which conceptually illustrate examples of uninstalling an MDDB cube in terms of data relationships. In particular, FIG. 39 illustrates, in four stages 3905-3920 of an MDDB cube data relationship diagram, the uninstallation of an MDDB cube 3935 and entities on which the MDDB cube 3935 depends.

Figure 39:
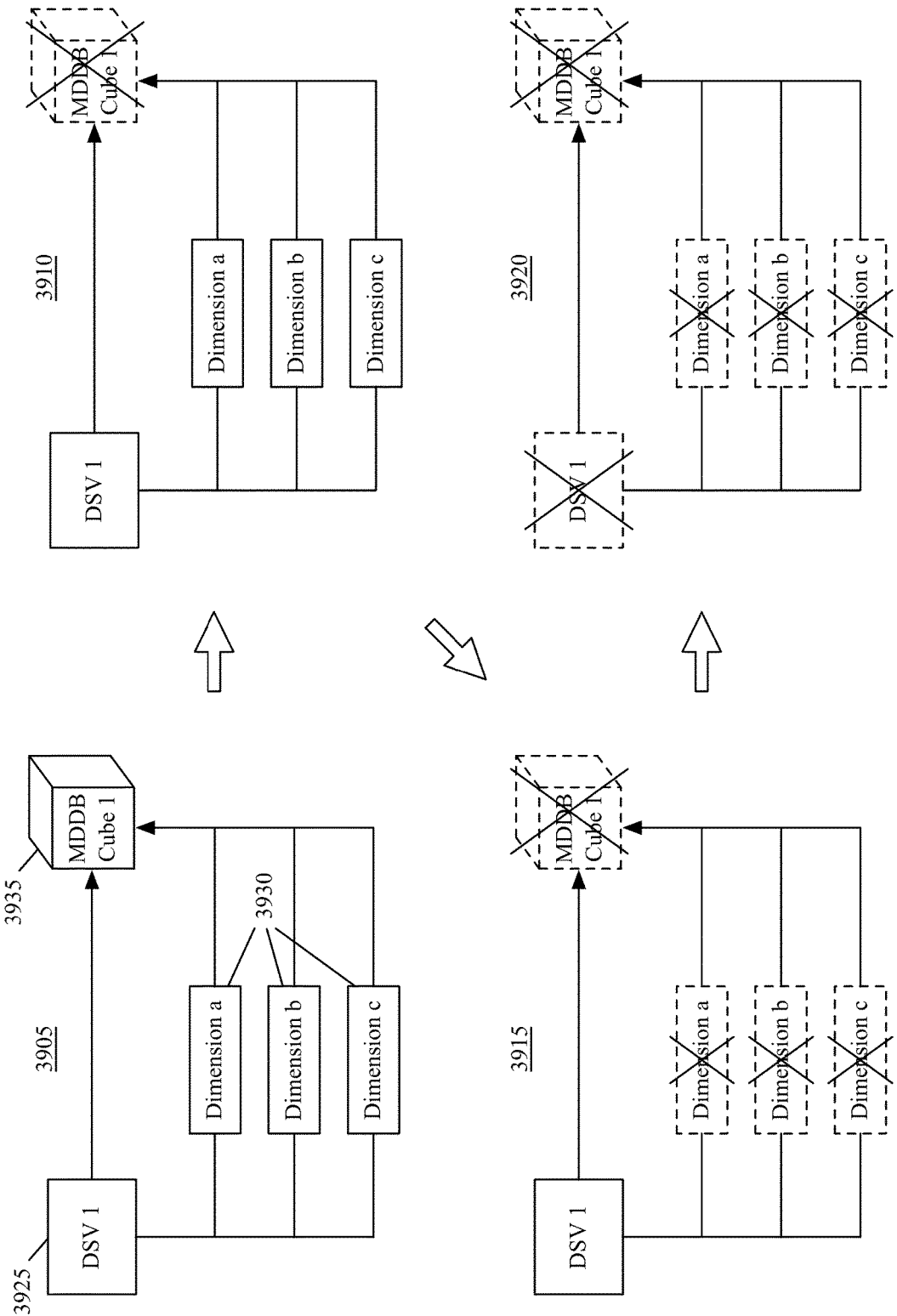
FIGS. 39-41 conceptually illustrate examples of uninstalling an MDDB cube.

FIG. 39 illustrates DSV 3925, a set of dimensions 3930, and the MDDB cube 3935. For this example, the set of dimensions 3930, each of which is metadata for categorizing a set of measures (not shown) along the set of dimensions 3930, are derived from the DSV 3925. The MDDB cube 3935 is defined by a set of measures (not shown) and the set of dimensions 3930. For this example, the set of measures for the MDDB cube 3935 is derived from the DSV 3925.

Figure 40:
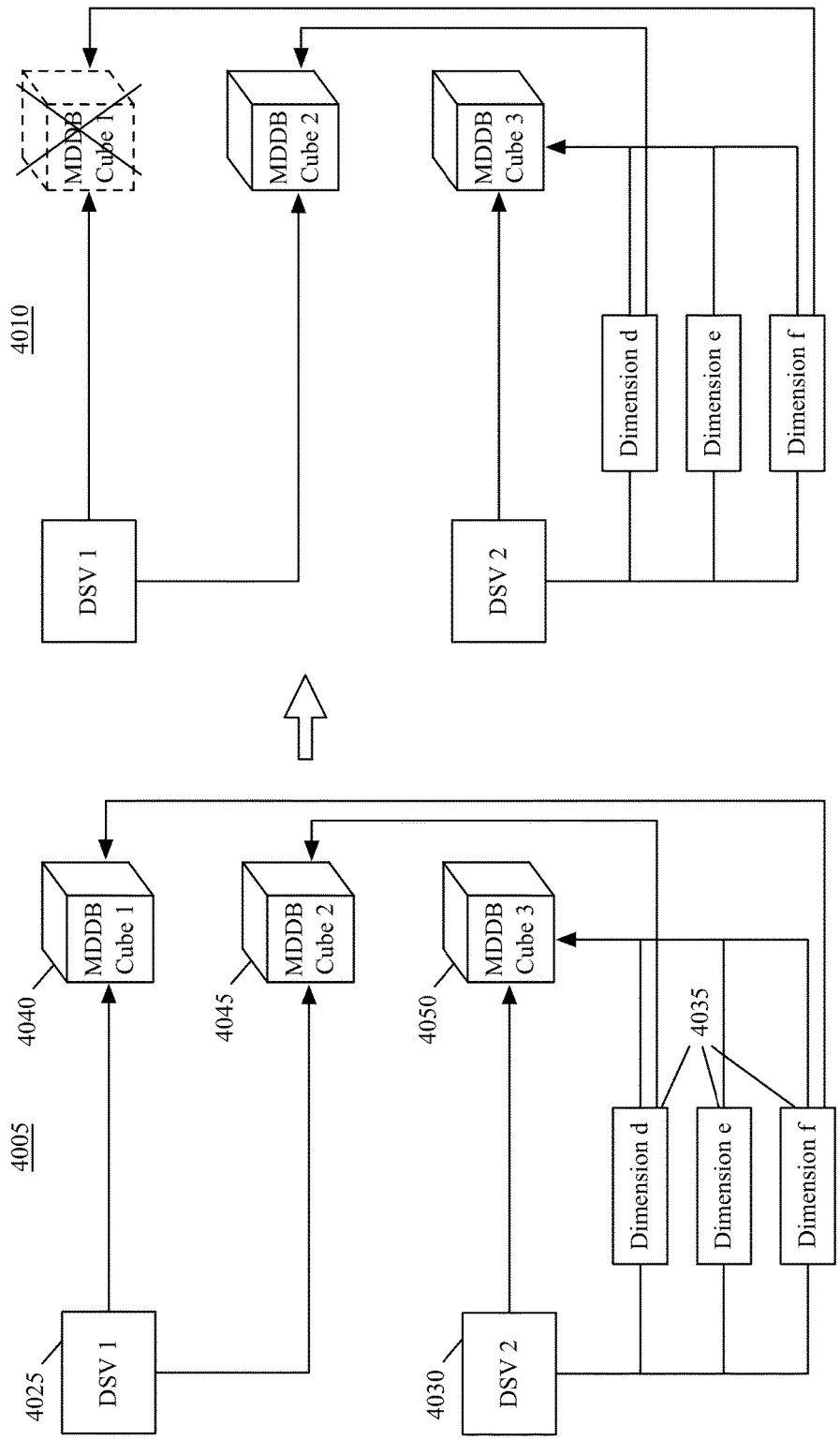
Figure 41:
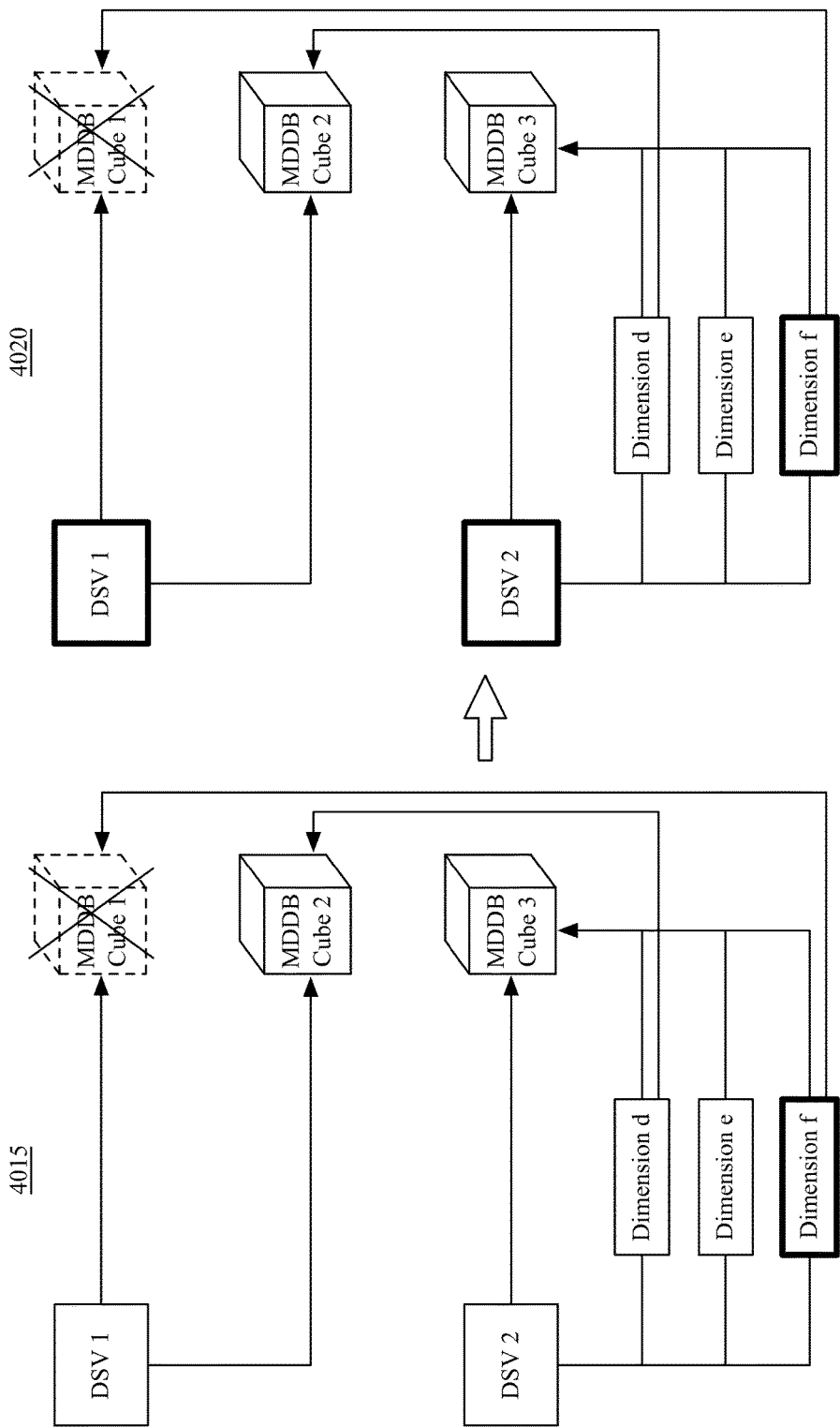

FIGS. 40 and 41 illustrate, in four stages 4005-4020 of an MDDB cube data relationship diagram, the uninstallation of an MDDB cube 4040 and a portion of the entities on which the MDDB 4040 cube depends. FIGS. 40 and 41 illustrate DSVs 4025 and 4030, a set of dimensions 4035, and MDDB cubes 4040-4050. For this example, the set of dimensions 4035, each of which is metadata for categorizing a set of measures (not shown) along the set of dimensions 4035, are derived from the DSV 4030. The MDDB cube 4040 is defined by a set of measures (not shown) and a single dimension (i.e., dimension f) in the set of dimensions 4035. For this example, the set of measures for the MDDB cube 4040 is derived from the DSV 4025. In addition, the MDDB cube 4045 is defined by a set of measures (not shown) and a single dimension (i.e., dimension d) in the set of dimensions 4035. For this example, the set of measures for the MDDB cube 4045 is derived from the DSV 4025. Furthermore, the MDDB cube 4050 is defined by a set of measures (not shown) and the set of dimensions 4035. In this example, the set of measures for the MDDB cube 4050 is derived from the DSV 4030.

The first stage 3905 of FIG. 39 illustrates the MDDB cube data relationship diagram before the process 3800 is performed. In this example, the DSV 3925, the set of dimensions 3930, and the MDDB cube 3935 are installed. In addition, the first stage 4005 of FIG. 40 illustrates the MDDB cube data relationship diagram before the process 3800 is performed. For this example, the DSVs 4025 and 4030, the set of dimensions 4035, and the MDDB cubes 4040-4050 are installed.

The process 3800 starts by receiving (at 3805) a request to uninstall an MDDB cube. In some embodiments, the request to uninstall the MDDB cube is received from a user of the MDDB system through a UI (e.g., a GUI, a command line interface, or any other type of interface for receiving input).

Next, the process 3800 uninstalls (at 3810) the MDDB cube. In some embodiments, the process 3800 uninstalls the MDDB cube from an MDDB cube server that manages, stores, and provisions MDDB cubes. The process 3800 of some embodiments uninstalls the MDDB cube by determining whether the MDDB cube is installed. When the process 3800 determines that the MDDB cube is installed, the process 3800 uninstalls the MDDB cube. Otherwise, the process 3800 proceeds to operation 3815.

The second stage of FIGS. 39 and 40 each shows a particular MDDB that is uninstalled. In this example, these second stages illustrate the corresponding MDDB cube data relationship diagram after operation 3810 has been performed by the process 3800. Referring to FIG. 39, the second stage 3910 of the MDDB cube data relationship diagram shows that the MDDB cube 3935 is uninstalled, as indicated by dashed lines of the MDDB cube 3935 and an "X" mark placed over the MDDB cube 3935. Referring to FIG. 40, the second stage 4010 of the MDDB cube data relationship diagram shows that the MDDB cube 4040 is uninstalled, as indicated by dashed lines of the MDDB cube 4040 and an "X" mark placed over the MDDB cube 4040.

When the process 3800 uninstalls the MDDB cube, the process 3800 of some embodiments also determines whether any presentation objects are dependent on the MDDB cube. In some of these embodiments, the process 3800 determines whether any presentation objects are dependent on the MDDB cube by accessing a unified content map (e.g., the unified content map described above by reference to FIG. 29, 30, or 31). When the process 3800 determines that there are presentation objects that are dependent on the MDDB, the process 3800 uninstalls these dependent presentation objects.

The process 3800 then identifies (at 3815) a set of dimensions that are associated with the MDDB cube. In some embodiments, the MDDB cube is defined by a set of measures and a set of dimensions. In these embodiments, the set of dimensions that define the MDDB cube are the identified set of dimensions that are associated with the MDDB cube. The process 3800 of some embodiments identifies the set of dimensions by examining a data structure of a content map (e.g., the content map described above by reference to FIG. 18) while, in other embodiments, the process 3800 identifies the set of dimensions by examining the unified content map.

After identifying the set of dimensions, the process 3800 determines (at 3820) whether a dimension in the identified set of dimensions is in use. The process 3800 of some embodiments determines whether the dimension is in use by examining the unified content map. In some embodiments, the process 3800 determines that the dimension is in use when another entity (e.g., an MDDB cube) is dependent on the dimension and such entity is installed in the MDDB system (e.g., installed on the MDDB cube server). When the process 3800 determines that the dimension is in use, the process 3800 proceeds to operation 3830. When the process 3800 determines that the dimension is not in use, the process 3800 uninstalls (at 3825) the dimension. In some embodiments, the process 3800 uninstalls the dimension from the MDDB cube server. After uninstalling the dimension, the process 3800 proceeds to operation 3830.

At 3830, the process 3800 determines whether any dimension in the set of identified dimensions is left to review for uninstallation. When the process 3800 determines that there is a dimension left to review for uninstallation, the process 3800 returns to operation 3820 to continue reviewing any remaining dimensions in the identified set of dimensions. Otherwise, the process 3800 proceeds to operation 3835 (as shown in FIG. 38B).

The third stage of FIGS. 39 and 41 each shows the corresponding MDDB cube data relationship diagram after operations 3820-3830 have been performed by the process 3800. Referring to FIG. 39, the third stage 3915 of the MDDB cube data relationship diagram illustrates an example of uninstalling dimensions when the MDDB cube that depends on the dimensions is uninstalled. As illustrated in this stage 3915, each dimension in the set of dimensions 3930 is uninstalled, as indicated by dashed lines of the set of dimension 3930 and an "X" mark placed over each dimension in the set of dimensions 3930. In this example, each dimension of the set of dimensions 3930 is uninstalled because none of the dimensions are in use (e.g., no MDDB cubes depend on a dimension in the set of dimensions 3930).

Referring to FIG. 41, the third stage 4015 of the MDDB cube data relationship diagram illustrates an example of dimensions on which an MDDB cube depends that are in use, and thus, are not uninstalled. This stage 4015 shows that the dimension on which the MDDB cube 4040 depends (i.e., dimension f) is still installed. This is highlighted by a bolding of dimension f. In this example, the dimension f (as well as dimension d and dimension e) is still in use by the MDDB cube 4050, which is derived from the set of dimensions 4035. Furthermore, the dimension d is still in use by the MDDB cube 4045 since the MDDB cube 4045, which is still installed, is derived from the dimension d.

The process 3800 then identifies (at 3835) a set of DSVs associated with the identified set of dimensions and a set of DSVs associated with the MDDB cube. As noted above, the MDDB cube of some embodiments is defined by a set of measures and a set of dimensions. The MDDB cube may be associated with a single DSV from which the set of measures that defines the MDDB cube is derived for the MDDB cube. In some instances, an identified dimension (i.e., a dimension that defines the MDDB cube) is derived from the same DSV that is associated with the MDDB cube from which the set of measures is derived. However, in other cases, an identified dimension is derived from a DSV that is different from the DSV that is associated with the MDDB cube from which the set of measures is derived. In other words, the set of DSVs associated with the identified set of dimensions may include DSVs that are different from the set of DSVs that is associated with the MDDB cube. The process 3700 of some embodiments identifies the set of DSVs associated with the MDDB cube and the set of DSVs associated with the identified set of dimensions by examining the unified content map.

Next, the process 3800 determines (at 3840) whether a DSV in the identified sets of DSVs is in use. In some embodiments, the process 3800 determines whether the DSV is in use by examining the unified content map. The process 3800 of some embodiments determines that the DSV is in use when another entity (e.g., a dimension or an MDDB cube) that is dependent on the DSV is installed in the MDDB system (e.g., installed on the MDDB cube server). When the process 3800 determines that the DSV is in use, the process 3800 proceeds to operation 3850. When the process 3800 determines that the DSV is not in use, the process 3800 uninstalls (at 3845) the DSV. In some embodiments, the process 3800 uninstalls the DSV from the MDDB cube server. After uninstalling the DSV, the process 3800 proceeds to operation 3850.

Finally, the process 3800 determines (at 3850) whether any DSV in the identified sets of DSVs is left to review for uninstallation. When the process 3800 determines that there is a DSV left to review for uninstallation, the process 3800 returns to operation 3840 to continue reviewing any remaining DSV in the identified sets of DSVs. When the process 3800 determines that there is no DSV left to review for uninstallation, the process 3800 ends.

The fourth stage of FIGS. 39 and 41 each shows the corresponding MDDB cube data relationship diagram after the process 3800 has ended. Referring to FIG. 39, the fourth stage 3920 of the MDDB cube data relationship diagram illustrates an example of uninstalling a DSV when an MDDB cube that depends on the DSV is uninstalled. In the fourth stage 3920, the DSV 3925 is uninstalled, as indicated by dashed lines of the DSV 3925 and an "X" mark placed over the DSV 3925, because the DSV 3925 is not in use (e.g. no MDDB cubes and dimensions depend on the DSV 3925) in this example.

Referring to FIG. 41, the fourth stage 4020 of the MDDB cube data relationship diagram illustrates an example of a DSV on which an MDDB cube depends that is in use, and, therefore, not uninstalled. The fourth stage 4020 shows that the DSV 4025 on which the MDDB cube 4045 depends is still installed. This stage 4020 also shows that DSV 4030 is still installed. This is highlighted by a bolding of the DSVs 4025 and 4030. For this example, the DSV 4025 is still in use by the MDDB cube 4045 because the MDDB cube 4045 is still installed and is derived from DSV 4025. Moreover, the DSV 4030 is still in use by the MDDB cube 4050 because the MDDB cube 4050 is still installed and is derived from DSV 4030.

Figure 42:
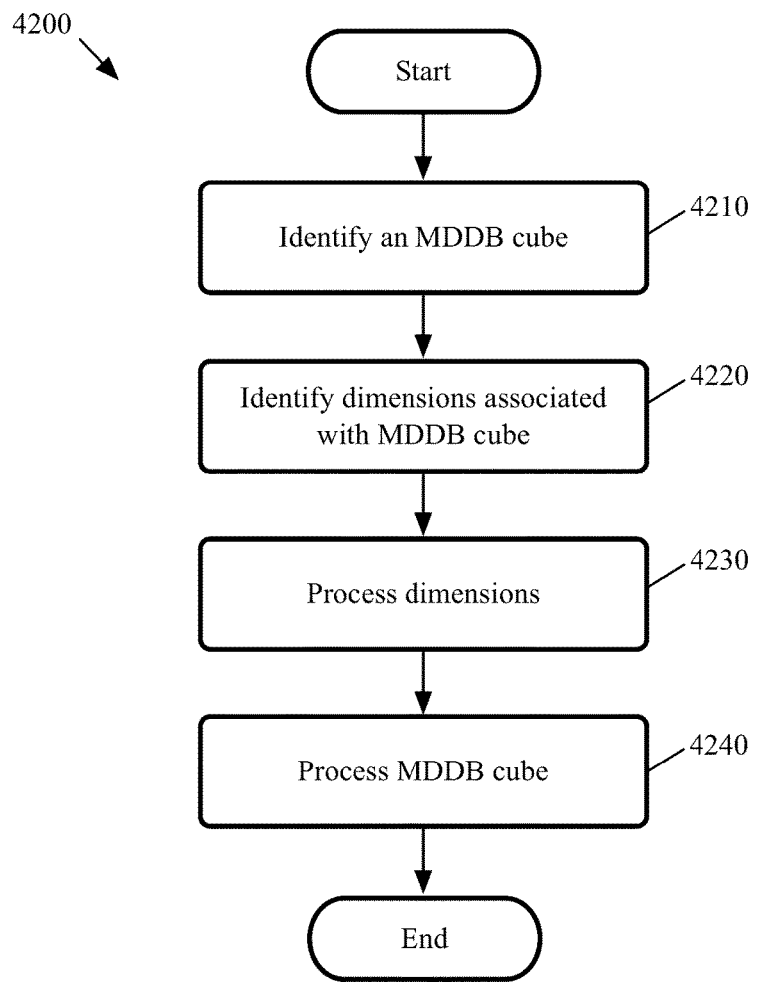
FIG. 42 conceptually illustrates a process of some embodiments for processing an MDDB cube.

After MDDB cubes are installed, the MDDB cubes of some embodiments are processed (e.g., by aggregating data for the MDDB cubes) in order to provision the MDDB cubes for MDDB clients to consume. FIG. 42 conceptually illustrates a process 4200 of some embodiments for processing an MDDB cube. In some embodiments, the process 4200 is performed by an MDDB cube server that manages, stores, and provisions MDDB cubes. In some cases, the process 4200 is performed by an MDDB cube provisioner (e.g., the MDDB cube provisioner or the cube installer as described above by reference to FIG. 32).

The process 4200 starts by identifying (at 4210) an MDDB cube. In some embodiments, the process 4200 is performed in response to a request to process the MDDB cube (e.g., a request from a scheduling server that manages the processing of MDDB cubes). In such cases, the identified MDDB cube is the MDDB cube that is requested to be processed. In some embodiments, the process 4200 identifies the MDDB cube by accessing a unified content map (e.g., the unified content map described above by reference to FIG. 29, 30, or 31).

Next, the process 4200 identifies (at 4220) a set of dimensions that are associated with the MDDB cube. As mentioned above, the MDDB cube of some embodiments is defined by a set of measures and a set of dimensions. In such embodiments, the set of dimensions that define the MDDB cube are the identified set of dimensions that are associated with the MDDB cube. The process 4200 of some embodiments identifies the set of dimensions by examining the unified content map.

The process 4200 then processes (at 4230) the identified set of dimensions. As noted above, a dimension of some embodiments is metadata that is derived from a DSV. To process the identified set of dimensions, the process 4200 aggregates data specified by dimension definitions of the set of dimensions derived from a DSV. In some embodiments, the DSV is derived from a unified data source (e.g., the unified data source described above by reference to FIG. 10, 11, or 13). To process the identified set of dimensions in some such embodiments, the process 4200 aggregates data specified by each dimension in the identified set of dimensions from the unified data source through the DSV. The process 4200 may aggregate the data specified by the identified dimension by (1) querying, through the unified data source, a set of data sources abstracted by the unified data source, (2) receiving query results for data specified by the dimension, and (3) storing the queried data in a data structure that represents the dimension.

After the identified set of dimensions is processed, the process 4200 processes (at 4240) the MDDB cube. As noted above, the MDDB cube of some embodiments is defined by a set of measures and a set of dimensions. In some such embodiments, the set of measures are derived from a DSV. In order to process the MDDB cube, in some embodiments, the process 4200 aggregates data specified by an MDDB cube definition for the MDDB cube. The data is aggregated from the DSV from which the set of measures are derived. In some embodiments, the DSV is derived from the unified data source. To process the MDDB cube in some such embodiments, the process 4200 aggregates data specified by an MDDB cube definition for the MDDB cube from the unified data source through the DSV. The process 4200 may aggregate the data specified by the MDDB cube definition for the MDDB cube by (1) querying, through the unified data source, a set of data sources abstracted by the unified data source, (2) receiving query results for data specified by the MDDB cube definition, and (3) storing the queried data in a data structure that represents the MDDB cube.

F. Presentation Object Manager

Figure 43:
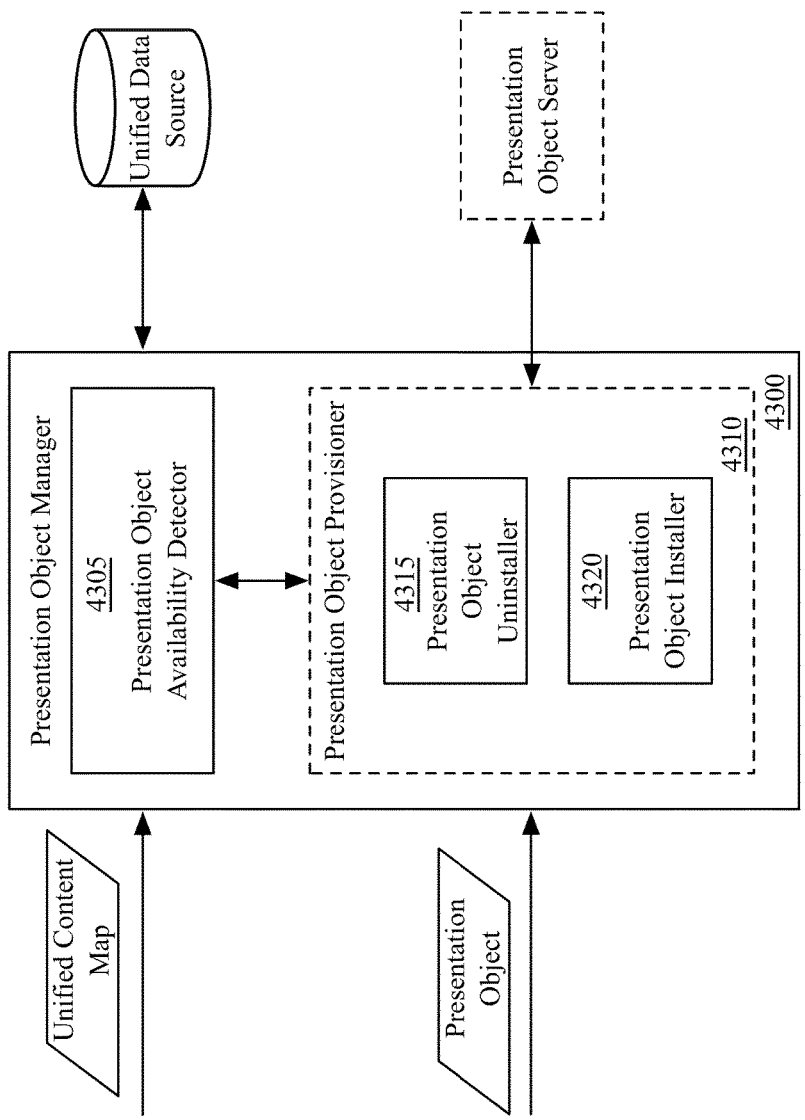
FIG. 43 conceptually illustrates a software architecture of a presentation object manager of some embodiments.

As described above, the presentation object manager of some embodiments handles the management of presentation objects in an MDDB system. This section will discuss details of such a presentation object manager. FIG. 43 conceptually illustrates a software architecture of a presentation object manager 4300 of some embodiments. The presentation object manager 4300 of some embodiments is used to implement any of the presentation object managers described above (e.g., the presentation object managers 705 and 2505 that are described above by reference to FIGS. 7 and 25, respectively). As illustrated, the presentation object manager 4300 includes a presentation object availability detector 4305 and a presentation object provisioner 4310.

The presentation object availability detector 4305 of some embodiments determines the statuses (e.g., not available, available, and available and installed) of presentation objects in the MDDB system. In some embodiments, a presentation object is available when the presentation object availability detector 4305 determines that data specified for the presentation object exists (e.g., the MDDB cubes from which the presentation object derives its data is installed).

The presentation object availability detector 4305 determines the statuses of a presentation object based on a unified content map (e.g., the unified content map described above by reference to FIG. 29, 30 or 31), in some embodiments. As such, the presentation object manager 4300 of some such embodiments sends requests (e.g., to the content pack manager 2515) for a unified content map and receives the unified content map in response to such requests.

In some embodiments, the presentation object availability detector 4305 determines the statuses of the presentation object based on a presentation object definition for the presentation object. The presentation object availability detector 4305 of some such embodiments accesses the presentation object definition for the presentation object by examining a data structure that includes the presentation object definition (e.g., the data structure described above by reference to FIG. 18). The presentation object definition may be stored in a data storage (e.g., the server storage 2530). In some embodiments, the presentation object availability detector 4305 retrieves the presentation object definition for the presentation object from a content pack manager (e.g., the content pack manager 2515).

Furthermore, the presentation object availability detector 4305 determines the statuses of the presentation object by accessing a unified data source (e.g., hosted by the server storage 2530 and managed by the data source manager 2525). For instance, the presentation object availability detector 4305 may access the unified data source to determine whether a set of MDDB cubes specified by the presentation object definition for the presentation object exists in the unified data source.

To determine whether a presentation object is available, the presentation object availability detector 4305 determines whether the set of MDDB cubes that define the presentation object is installed. In some embodiments, the presentation object availability detector 4305 requests an MDDB cube manager (e.g., the MDDB cube manager described above by reference to FIG. 25 or FIG. 32) to determine whether the set of MDDB cubes that defines the presentation object is installed.

When a presentation object is determined as available, the presentation object availability detector 4305 may determine that the presentation object is installed by accessing a presentation object server that generates, manages, stores, and provisions presentation objects. In some embodiments, a presentation object is installed when an instance of the presentation object exists in the presentation object server (e.g., a data structure that represents the presentation object exists in the presentation object server).

The presentation object provisioner 4310 is responsible for handling the provisioning and deprovisioning of presentation objects. In some embodiments, the presentation object provisioner 4310 handles the provisioning and deprovisioning of presentation objects on a presentation object server. As noted above, a presentation object server of some embodiments generates, manages, stores, and provisions presentation objects. In some such embodiments, the presentation object provisioner 4310 instructs the presentation object server to generate, manage, store, and provision presentation objects.

As shown in FIG. 43, the presentation object provisioner 4310 includes a presentation object uninstaller 4315 and a presentation object installer 4320. The presentation object installer 4320 is responsible for installing presentation objects in the MDDB system. For instance, when the presentation object manager 4300 receives a request to install a presentation object, the presentation object installer 4320 installs the requested presentation object on a presentation object server. In some embodiments, the presentation object installer 4320 automatically installs the presentation object on the presentation object server when the presentation object is determined to be available by the presentation object availability detector 4305. The presentation object uninstaller 4315 is responsible for uninstalling (e.g., removing, deprovisioning, etc.) presentation objects from the MDDB system. When the presentation object manager 4300 receives a request to uninstall a presentation object, the presentation object uninstaller 4315 uninstalls the requested presentation object from the presentation object server.

Figure 44:
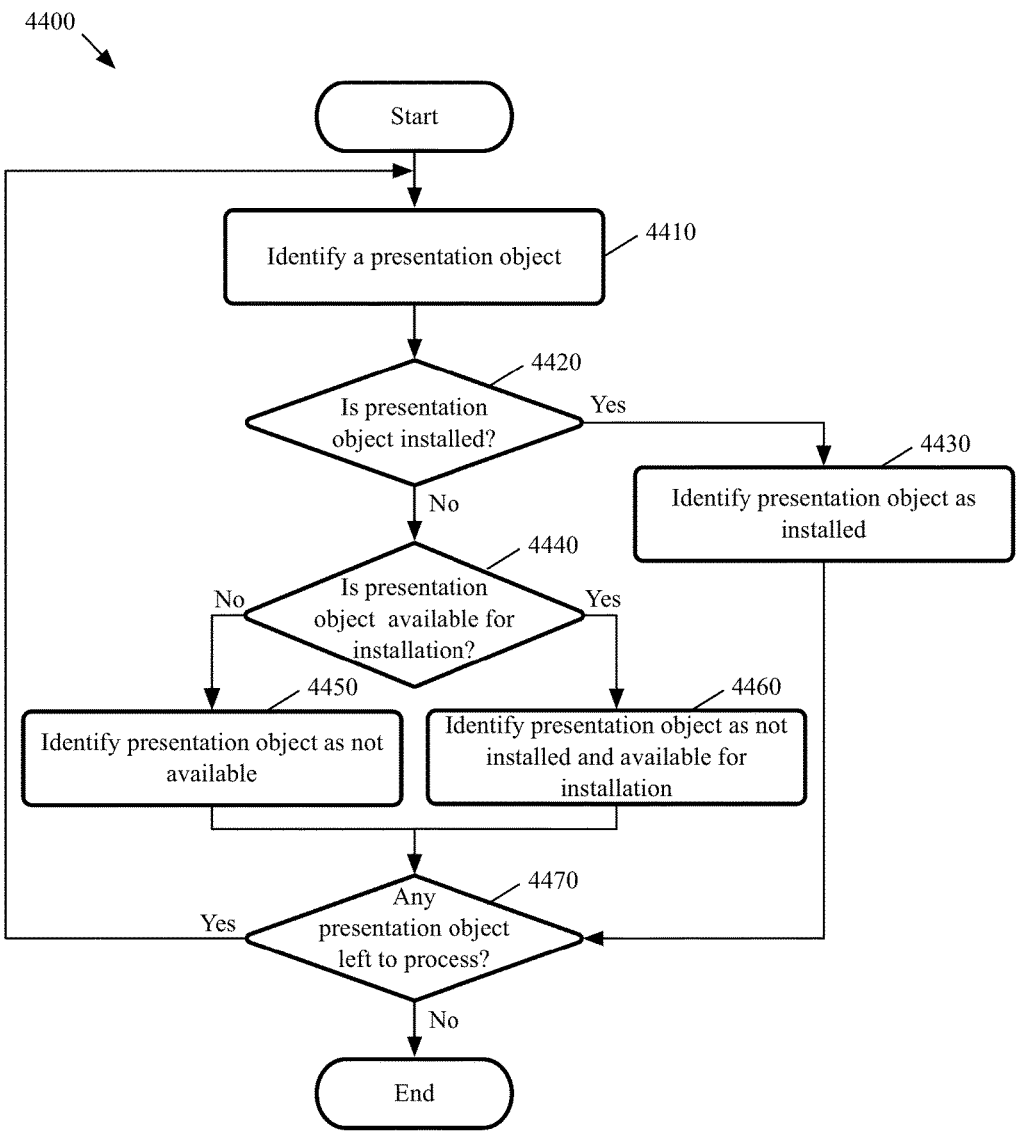
FIG. 44 conceptually illustrates a process of some embodiments for determining statuses for presentation objects.

FIG. 44 conceptually illustrates a process 4400 of some embodiments for determining statuses of presentation objects. In some embodiments, a presentation object availability detector (e.g., the presentation object availability detector described above by reference to FIG. 2 or FIG. 43) performs the process 4400. In some instances, the presentation object availability detector of such embodiments performs the process 4400 when the presentation object availability detector receives a request for the statuses of presentation objects in the MDDB system. In other instances, the presentation object availability detector of such embodiments performs the process 4400 when the presentation object availability detector receives a request for the statuses of presentation objects specified in a content pack. In some embodiments, the process 4400 is an automated process that is performed without user intervention.

The process 4400 begins by identifying (at 4410) a presentation object. The process 4400 of some embodiments identifies the presentation object by (1) examining a data structure that represents a content pack (e.g., the content pack data structure described above by reference to FIG. 18) and (2) identifying a presentation object definition of the presentation object.

Next, the process 4400 determines (at 4420) whether the presentation object is installed in the MDDB system. The process 4400 determines whether the presentation object is installed by accessing a presentation object server (e.g., through the presentation object provisioner 4310) to retrieve a list of installed presentation objects on the MDDB server. The presentation object is determined as installed in the MDDB system if the presentation object is included in the list. Otherwise, the presentation object is determined as not installed in the MDDB system. When the process 4400 determines that the presentation object is installed, the process 4400 identifies (at 4430) the presentation object as installed and then proceeds to operation 4470.

When the process 4400 determines that the presentation object is not installed, the process 4400 determines (at 4440) whether the presentation object is available for installation. To determine whether the presentation object is available for installation, the process 4400 of some embodiments performs the process described below by reference to FIG. 45. When the process 4400 determines that the presentation object is not available for installation, the process identifies (at 4450) the presentation object as not available and then proceeds to operation 4470. When the process 4400 determines that the presentation object is available for installation, the process identifies (at 4460) the presentation object as available and then proceeds to operation 4470.

Finally, the process 4400 determines (at 4470) whether any presentation object is left to review for installation. When the process 4400 determines that there is a presentation object left to review for installation, the process 4400 returns to operation 4410 to continue reviewing any remaining presentation objects. For instance, for requests for the statuses of presentation objects in the MDDB system, the process 4400 continues processing the remaining presentation objects in the MDDB system. For requests for the statuses of presentation objects specified in a content pack, the process 4400 continues processing the remaining presentation objects in the content pack. When the process 4400 determines that there is no presentation object left to review for installation, the process 4400 ends.

Figure 45:
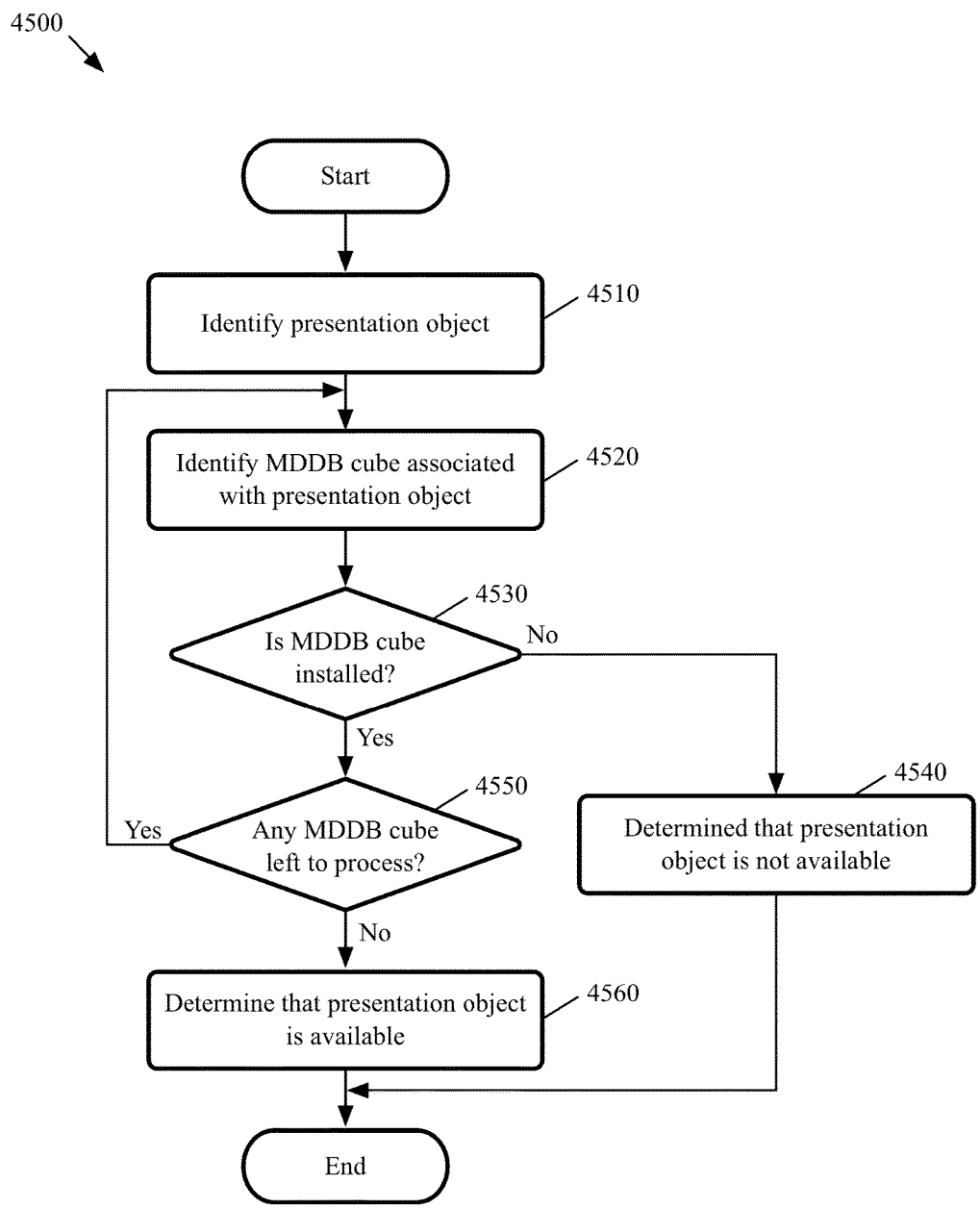
FIG. 45 conceptually illustrates a process of some embodiments for determining that a presentation object is available.

FIG. 45 conceptually illustrates a process 4500 of some embodiments for determining whether or not a presentation object is available. In some embodiments, the process described above by reference to FIG. 44 performs the process 4500. Also, a presentation object availability detector (e.g., the presentation object availability detector described above by reference to FIG. 2 or FIG. 43) may perform the process 4500. The process 4500 of some embodiments is performed when determining the status of a presentation object (e.g., by the presentation object availability detector 4305). In some embodiments, the process 4500 is an automated process that is performed without user intervention.

The process starts by identifying (at 4510) a presentation object. In some embodiments, the process 4500 identifies the presentation object by examining a data structure that represents a content pack (e.g., the content pack data structure described above by reference to FIG. 18) and identifying a presentation object definition of the presentation object.

Next, the process 4500 identifies (at 4520) a set of MDDB cubes associated with the identified presentation object. The presentation object of some embodiments is a predefined representation of a perspective of a set of MDDB cubes. In these embodiments, the process 4500 identifies the set of MDDB cubes that defines the presentation object as the set of MDDB cubes that are associated with the presentation object. The process 4500 of some embodiments identifies the set of MDDB cubes by examining a data structure of a content map (e.g., the content map described above by reference to FIG. 18). In other embodiments, the process 4500 identifies the set of dimensions by accessing a unified content map (e.g., the unified content map described above by reference to FIG. 29, 30, or 31).

Next, the process 4500 determines (at 4530) whether an MDDB cube in the set of MDDB cubes is installed. In some embodiments, the process 4500 determines whether the MDDB cube is installed by requesting the status of the MDDB cube (e.g., requesting from the cube availability detector 3205). When the process 4500 determines that the MDDB cube is not installed, the process 4500 determines (at 4540) that the presentation object is not available and then the process 4500 ends.

When the process 4500 determines that the MDDB cube is installed, the process 4500 determines (at 4550) whether any MDDB cube in the identified set of MDDB cubes is left to review. When the process 4500 determines that there is no MDDB cube left to review, the process 4500 determines (at 4560) that the presentation object is available and then the process 4500 ends. Otherwise, the process 4500 returns to operation 4520 to continue reviewing any remaining MDDB cubes in the identified set of MDDB cubes.

After a presentation object is determined as available, the presentation object may be installed. In some embodiments, the presentation object is installed in response to a request (e.g., from a user of the MDDB system) to install the presentation object. The presentation object may also be installed as part of a process for automatically installing presentation objects that are available but not yet installed.

As mentioned above, the presentation object of some embodiments is a predefined representation of a perspective of a set of MDDB cubes. Some such embodiments of the presentation object includes a set of charts, graphs, reports, and/or tables, which are generated based on the perspective of the set of MDDB cubes that define the presentation object. As such, some embodiments install the presentation object by generating the set of charts, graphs, reports, and/or tables specified for the presentation object. In embodiments that employ a presentation object server to generate, manage, store, and provision presentation objects, the presentation object is installed on the presentation object server.

Furthermore, once a presentation object is installed, the presentation object of some embodiments may be uninstalled. In embodiments that utilize a presentation object server to generate, manage, store, and provision presentation objects, the presentation object is uninstalled from the presentation object server.

G. Configuration Manager

In some embodiments, the configuration manager serves as a communication gateway between the MDDB system and a user of the MDDB system. For instance, the configuration manager handles requests from the user of the MDDB system and forwards the requests to an appropriate component of the MDDB system to perform operations to process the requests. The following section will discuss details of such a configuration manager.

Figure 46:
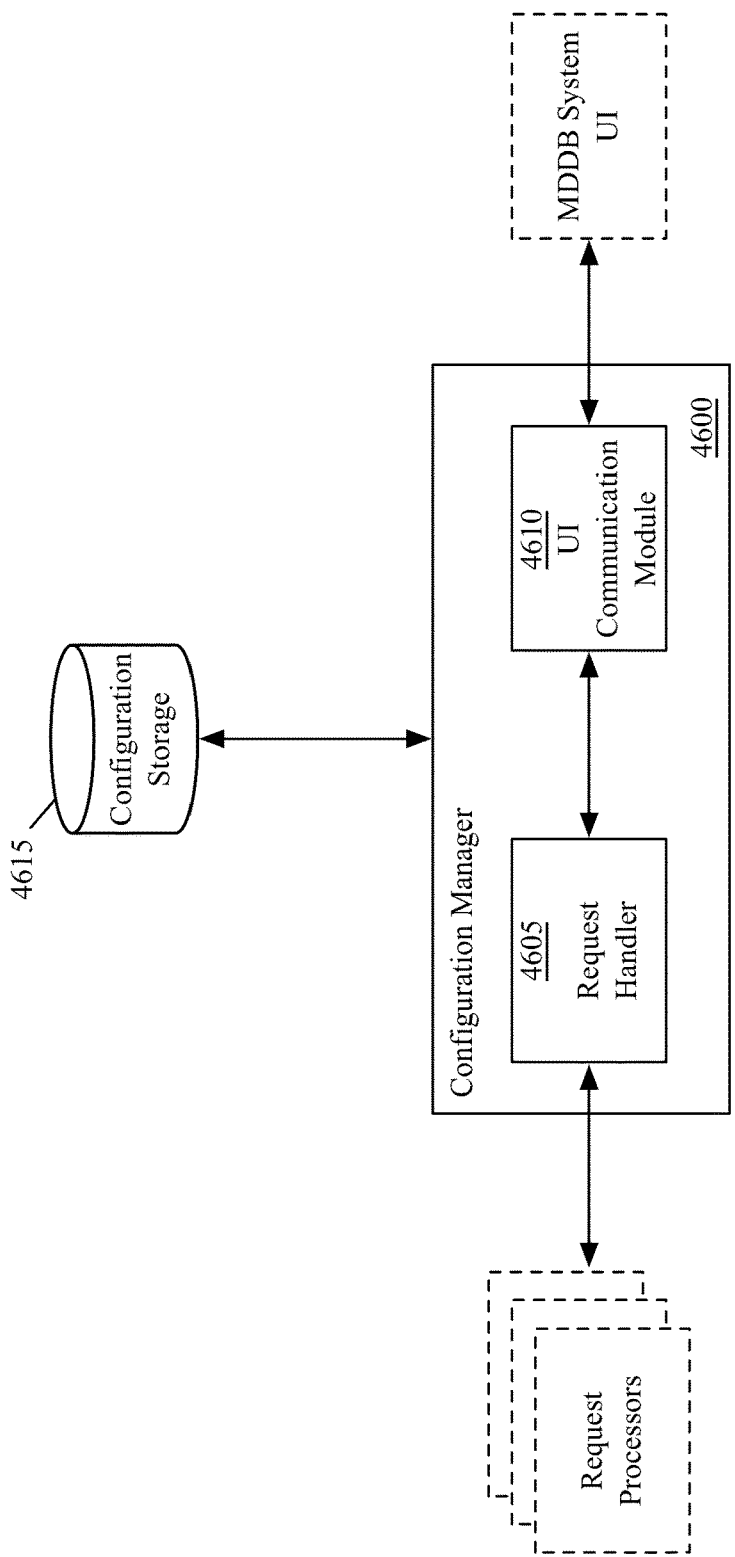
FIG. 46 conceptually illustrates a software architecture of configuration manager of some embodiments.

FIG. 46 conceptually illustrates a software architecture of a configuration manager 4600 of some embodiments. In some embodiments, the configuration manager 4600 implements the configuration manager 2510, which is described above by reference to FIG. 25. As shown, the configuration manager 4600 includes a request handler 4605, a UI communication module 4610, and a configuration storage 4615 In some embodiments, the configuration storage 4615 is part of another data storage (e.g., the server storage 2530).

In some embodiments, the configuration manager 4600 is responsible for scheduling operations. For instance, after the MDDB system is configured (e.g., by the process described above by reference to FIG. 20), the configuration manager 4600 may automatically request the statuses of MDDB cubes and/or presentation objects in the MDDB system and instruct the MDDB cube manager and/or the presentation object manager to install every MDDB cube and/or presentation object that is available but not yet installed.

In some embodiments, the UI communication module 4610 provides an interface through which a user of the MDDB system may communicate with the MDDB system. For instance, the UI communication module 4610 may provide a GUI (e.g., the same or similar GUI illustrated in FIGS. 21 and 27) for receiving input from a user. Examples of input include requests and commands to install MDDB cubes, uninstall MDDB cubes, schedule MDDB cube processing, install presentation objects, uninstall presentation objects, add data sources, remove data sources, etc. The UI communication module 4610 may provide other types of interfaces for receiving input from the user (e.g., a command line interface). Regardless of the manner in which the UI communication module 4610 receives input, the UI communication module 4610 sends the input to the request handler 4605 for processing. In some embodiments, the UI communication module 4610 accesses the configuration storage 4615 to facilitate communication with the user of the MDDB system.

The request handler 4605 of some embodiments handles the requests and commands that the UI communication module 4610 receives from the user of the MDDB system. Specifically, the request handler 4605 forwards the requests and commands to a component of MDDB system. For example, in some embodiments, the request handler 4605 forwards requests to install presentation objects and requests to uninstall presentation objects to a presentation object manager (e.g., the presentation object manager 2505). As another example, the request handler 4605 forwards requests to install MDDB cubes and requests to uninstall MDDB cubes to an MDDB cube manager (e.g., the MDDB cube manager 2520).

In some embodiments, the request handler 4605 forwards requests to install content packs and requests to uninstall content packs to a content pack manager (e.g., the content pack manager 2515). Furthermore, the request handler 4605 of some embodiments forwards requests to add data sources and requests to remove data sources to a data source manager (e.g., the data source manager 2525). The request handler 4605 may also handle additional and/or different types of requests and commands. In some embodiments, the request handler 4605 accesses the configuration storage 4615 in order to manage the requests and commands.

IV. Federated MDDB Cubes

As described above, an MDDB cube may be defined by a set of measures and a set of dimensions. In many cases, the set of measures is derived from data in a data source and the set of dimensions is derived from data in the same data source. That is, the MDDB cube is defined by data derived from a single data source. FIG. 9, which is described above, illustrates an example of an MDDB cube that is defined by data derived from a single data source.

Some embodiments of the invention provide an MDDB system that manages and provisions MDDB cubes that are defined by data derived from several different data sources.

Such MDDB cubes may be referred to as federated MDDB cubes. Different data sources may be different data storage instances (e.g., different instances of relational databases) of the same or different products from the same or different product vendors. In some cases, a federated MDDB cube that derives data from different data sources of different products is defined to derive data from different instances of different products from the same vendor. In other cases, a federated MDDB cube that derives data from different data sources of different products is defined to derive data from different instances of different products from different vendors. Examples of products include Microsoft System Center Configuration Manager®, Microsoft System Center Operations Manager®, Microsoft Forefront Endpoint Protection®, Symantec Management Platform®, Symantec Endpoint Protection®, or any type of product that has data to which MDDB tools may be applied (e.g., for business intelligence purposes).

Figure 47:
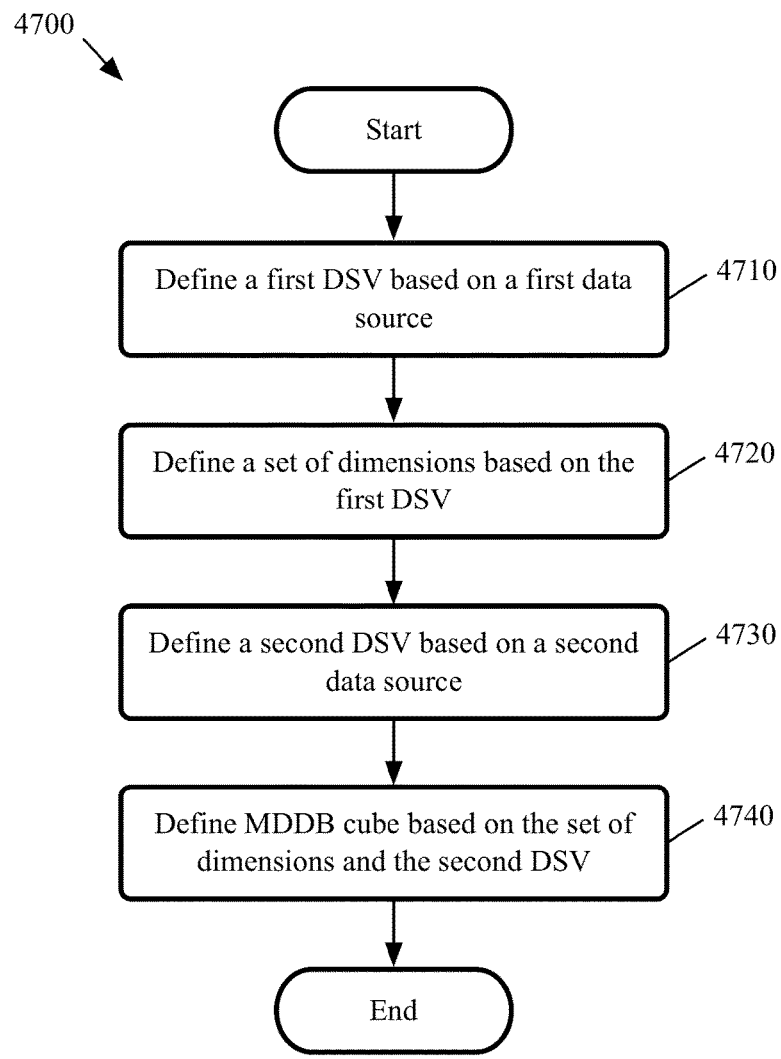
FIG. 47 conceptually illustrates a process of some embodiments for defining a federated MDDB cube.

FIG. 47 conceptually illustrates a process 4700 of some embodiments for defining a federated MDDB cube. In some embodiments, an MDDB tool for developing MDDB cubes (e.g., Microsoft Visual Studio®) performs the process 4700 while, in other embodiments, a user of such an MDDB tool performs some or all of the process 4700 and/or initiates some or all of the operations in the process 4700.

The process 4700 starts by defining (at 4710) a first DSV based on a first data source. In some embodiments, the process 4700 defines the first DSV to derive data from the first data source. As noted above, a DSV is a logical view of data in a set of data sources, in some embodiments. The logical view includes, in such embodiments, a set of data source objects (e.g., tables, views, database functions, stored procedures, and queries) that provide data from the set of data sources. Thus, in these embodiments, the first DSV derives data from the first data source through a first set of data source objects.

Next, the process 4700 defines (at 4720) a set of dimensions based on the first DSV. In some embodiments, the process 4700 defines the set of dimension to derive data from first DSV. That is, each dimension in the set of dimensions derives data from the first data source through the first DSV.

The process 4700 then defines (at 4730) a second DSV based on a second data source. The process 4700 of some embodiments defines the second DSV to derive data from the second data source. As noted above, a DSV is a logical view of data in a set of data sources, in some embodiments. The logical view includes, in such embodiments, a set of data source objects (e.g., tables, views, database functions, stored procedures, and queries) that provide data from the set of data sources. As such, the second DSV of such embodiments derives data from the second data source through a second set of data source objects.

In many cases, the first data source and the second data source are different instances of data storages. For instance, the first and second data sources may be different instances of a first data storage and a second data storage, respectively, in some embodiments. The first and second data sources may be different instances of a first data storage of a first product and a second data storage of a second product, respectively.

Finally, the process 4700 defines (at 4740) an MDDB cube based on the set of dimensions and the second DSV. In some embodiments, the process 4700 defines the MDDB cube to derive data from the set of dimensions (which derives data from the first DSV) and the second DSV. As such, the MDDB cube derives data from the first and second data sources through the set of dimensions and the second DSV, respectively.

In some cases, the first DSV and the (first) set of dimensions are used to define a first MDDB cube, and the second DSV and another (second) set of dimensions that is derived from the second DSV are used to define a second MDDB cube. Thus, the first MDDB cube is defined by data from a first data source and the second MDDB cube is defined by data from a second data source.

Moreover, a third MDDB cube, which is a federated MDDB cube, is defined (e.g., by the process 4700 described above) by data from both the first and second data sources. In such cases, the third MDDB cube is defined by entities (e.g., the set of dimensions) used to define the first MDDB cube as well as entities (e.g., the second DSV) used to define the second MDDB cube. The following figure illustrates an example of three MDDB cubes defined in such a manner.

Figure 48:
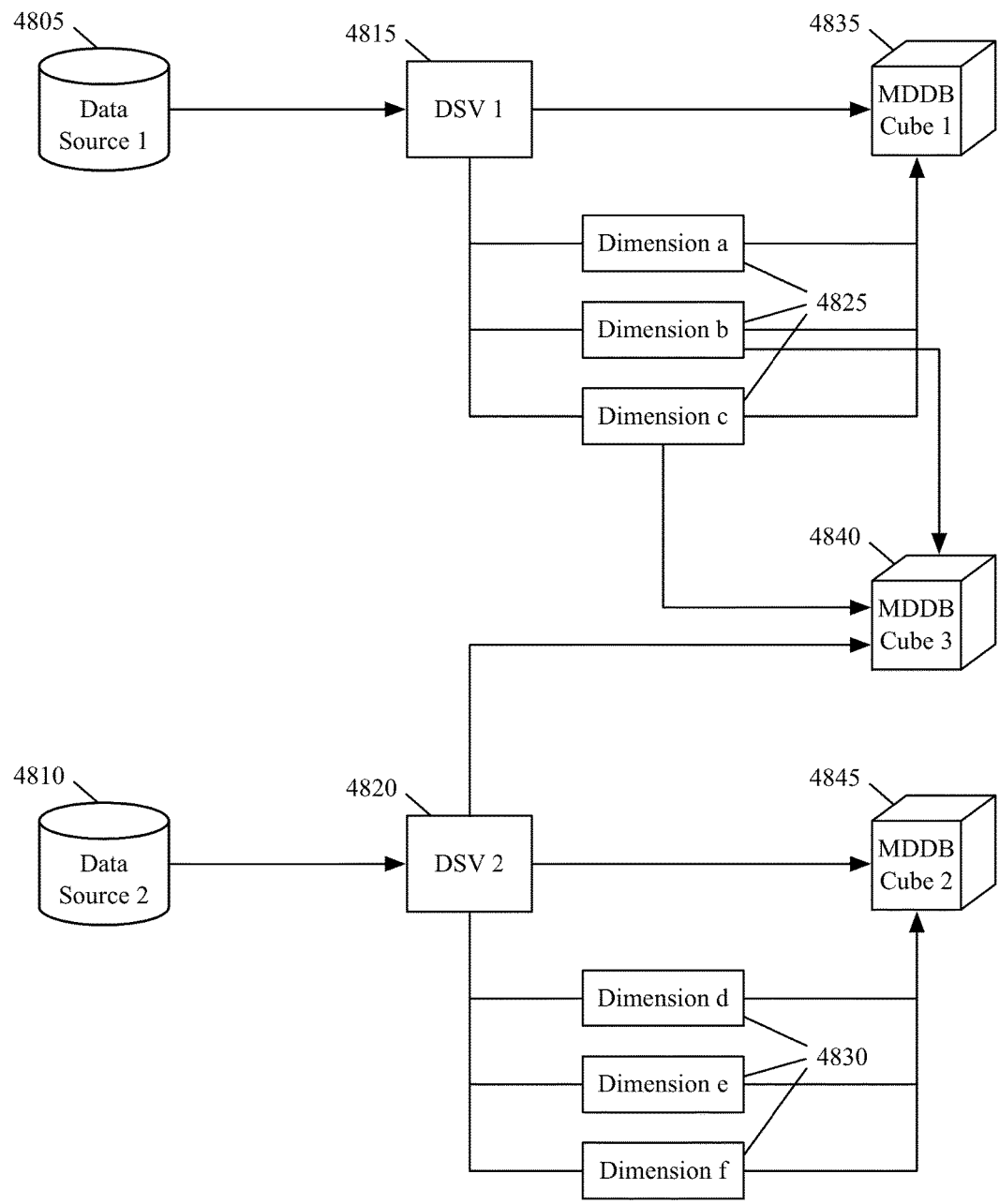
FIG. 48 conceptually illustrates an example of an MDDB cube that is defined by data from two different data sources.

FIG. 48 conceptually illustrates an example of an MDDB cube 4840 that is defined by data from two different data sources 4805 and 4810. This figure shows the data sources 4805 and 4810, DSVs 4815 and 4820, sets of dimensions 4825 and 4830, and MDDB cubes 4835-4845.

In this example, the DSV 4815 provides a logical view of data in the data source 4805 and the set of dimensions 4825 are derived from the DSV 4815. Thus, the data that defines the set of dimensions 4825 is provided by the data source 4805 through the DSV 4815. Similarly, the DSV 4820 provides a logical view of data in the data source 4810 and the set of dimensions 4830 are derived from the DSV 4820. Therefore, the data that defines the set of dimensions 4830 is provided by the data source 4810 through the DSV 4820.

For this example, the MDDB cube 4840 is defined by a set of measures (not shown) and two dimensions (i.e., dimension b and dimension c) in the set of dimensions 4825. Since the set of dimensions 4825 are derived from the data source 4805, the MDDB cube 4840 is defined by data from the data source 4805. Also, in this example, the data that defines the set of measures for the MDDB cube 4840 is provided by the data source 4810 through the DSV 4820. Thus, the MDDB cube 4840 is also defined by data from the data source 4810. As such, the MDDB cube 4840 is a federated MDDB cube because the MDDB cube 4840 is defined by data from two different data sources (i.e., the data source 4805 and the data source 4810).

The descriptions of various figures above involve MDDB systems that employ content packs to manage MDDB cubes. The MDDB systems of some such embodiments may manage federated MDDB cubes as well. The following figures illustrate various details of federated MDDB cubes implemented for such systems. Specifically, these figures illustrate (1) data relationships of federated MDDB cubes implemented with content packs, (2) an example of a federated MDDB cube that is determined to be available, and (3) an example of a federated MDDB cube that is determined to be not available.

Figure 49:
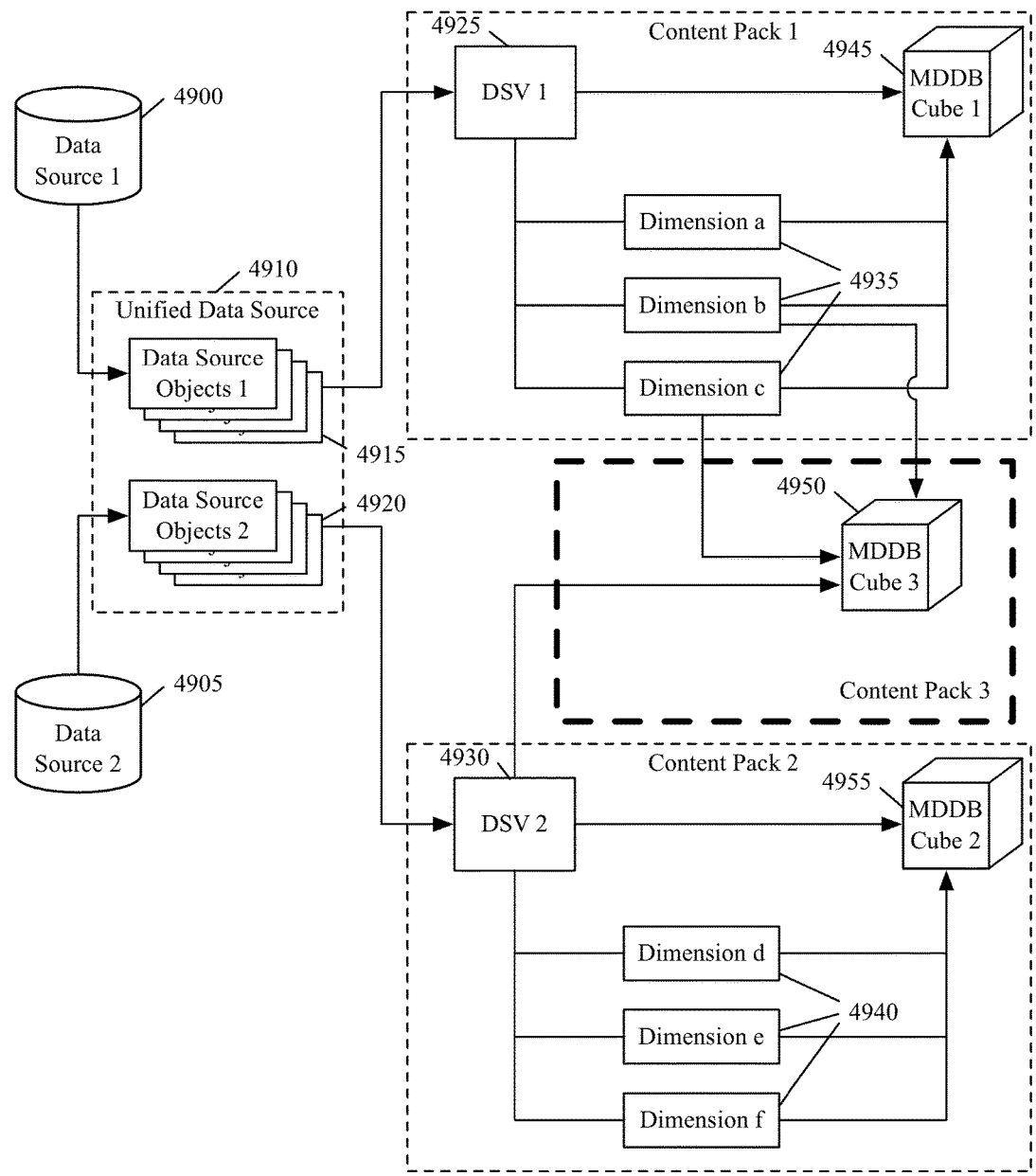
FIG. 49 conceptually illustrates an example of a content pack that specifies an MDDB cube defined by data from two different data sources.

FIG. 49 conceptually illustrates an example of a content pack that specifies an MDDB cube defined by data from two different data sources 4900 and 4905. As shown, FIG. 49 illustrates the data sources 4900 and 4905, a unified data source 4910, DSVs 4925 and 4930, and sets of dimensions 4935 and 4940, and MDDB cubes 4945-4955. In some embodiments, the content packs (i.e., content packs 1-3) illustrated in FIG. 27 are each created by the process described above by reference to FIG. 17.

In this example, the unified data source 4910 is a collection of data source objects, which includes a set of data source objects 4915 and a set of data source objects 4920, that presents a single source of data to the DSV 4925 and the DSV 4930. As noted above, a data source object is a representation of data in a data source, in some embodiments. As shown, the set of data source objects 4915 are representations of data in the data source 4900 and the set of data source objects 4920 are representations of data in the data source 4905. Therefore, the DSV 4925, which is a logical view of data in the unified data source 4910, is derived from the set of data source objects 4915, and the DSV 4930, which is a logical view of data in the unified data source 4910, is derived from the set of data source objects 4920.

The set of dimensions 4935, each of which is metadata for categorizing a set of measures (not shown) along the set of dimensions 4935, are derived from the DSV 4925. Also, the set of dimensions 4940, each of which is metadata for categorizing a set of measures (not shown) along the set of dimensions 4940, are derived from the DSV 4930.

The MDDB cube 4945 is defined by a set of measures (not shown) and the set of dimensions 4935. For this example, the set of measures for the MDDB cube 4945 is derived from the DSV 4925. Also, the MDDB cube 4955 is defined by a set of measures (not shown) and the set of dimensions 4940. In this example, the set of measures for the MDDB cube 4955 is derived from the DSV 4930.

The MDDB cube 4950 is defined by a set of measures (not shown) and two dimensions (i.e., dimension b and dimension c) in the set of dimensions 4935. Since the set of dimensions 4935 are derived from the DSV 4925, which derives data from the data source 4900 through the set of data source objects 4915 in the unified data source 4910, the MDDB cube 4950 is defined by data from the data source 4900. In this example, the set of measures for the MDDB cube 4950 is derived from the DSV 4930, which derives data from the data source 4905 through the set of data source objects 4920 in the unified data source 4910. As such, the MDDB cube 4950 is defined by data from the data source 4905. Accordingly, the MDDB cube 4950 is a federated MDDB cube, because the MDDB cube 4950 is defined by data from two different data sources (i.e., the data source 4900 and the data source 4905).

FIG. 49 conceptually shows that the content pack 1 includes, as indicated by a dashed line rectangle, the DSV 4925, the set of dimensions 4935, and the MDDB cube 4945. Thus, the content pack 1 in this example includes a DSV definition of the DSV 4925, a set of dimension definitions of the set of dimensions 4935, and an MDDB cube definition of the MDDB cube 4945. In this example, the content pack 1 also includes data source commands for creating the set of data source objects 4915 in the unified data source 4910. In some embodiments, the content map of a content pack specifies relationships (e.g., data dependencies) between the entities defined by the entity definitions included in the content pack. Thus, the content pack 1 in this example includes a content map that specifies that the DSV 4925 depends on the set of data source objects 4915, each of the dimensions in the set of dimensions 4935 depends on the DSV 4925, and the MDDB cube 4945 depends on both the DSV 4925 and the set of dimensions 4935.

Furthermore, FIG. 49 conceptually shows that the content pack 2 includes, as indicated by a dashed line rectangle, the DSV 4930, the set of dimensions 4940, and the MDDB cube 4955. Therefore, the content pack 2 in this example includes a DSV definition of the DSV 4930, a set of dimension definitions of the set of dimensions 4940, and an MDDB cube definition of the MDDB cube 4955. In this example, the content pack 2 also includes data source commands for creating the set of data source objects 4920 in the unified data source 4910. For this example, the content pack 2 includes a content map that specifies that the DSV 4930 depends on the set of data source objects 4920, each of the dimensions in the set of dimensions 4940 depends on the DSV 4930, and the MDDB cube 4955 depends on both the DSV 4930 and the set of dimensions 4940.

For the content pack 3 shown in FIG. 49, the content pack 3 includes, as indicated by a bold dashed line rectangle, the MDDB cube 4950. However, as mentioned above, the MDDB cube 4950 is defined by dimension b and dimension c in the set of dimensions 4935, which are derived from the DSV 4925, and a set of measures that is derived from the DSV 4930. Since the DSVs 4925 and 4930 and the sets of dimensions 4935 and 4940 are defined in content packs 1 and 2, the content pack 3 in this example only includes an MDDB cube definition of the MDDB cube 4950 and a content map that specifies that the MDDB cube 4950 depends on the DSV 4930 and the dimensions b and c in the set of dimensions 4935.

As explained above, the MDDB system of some embodiments includes a cube availability detection feature for determining whether an MDDB cube is available or not. The following figures illustrate an example of a federated MDDB cube that is available and an example of a federated MDDB cube that is not available.

Figure 50:
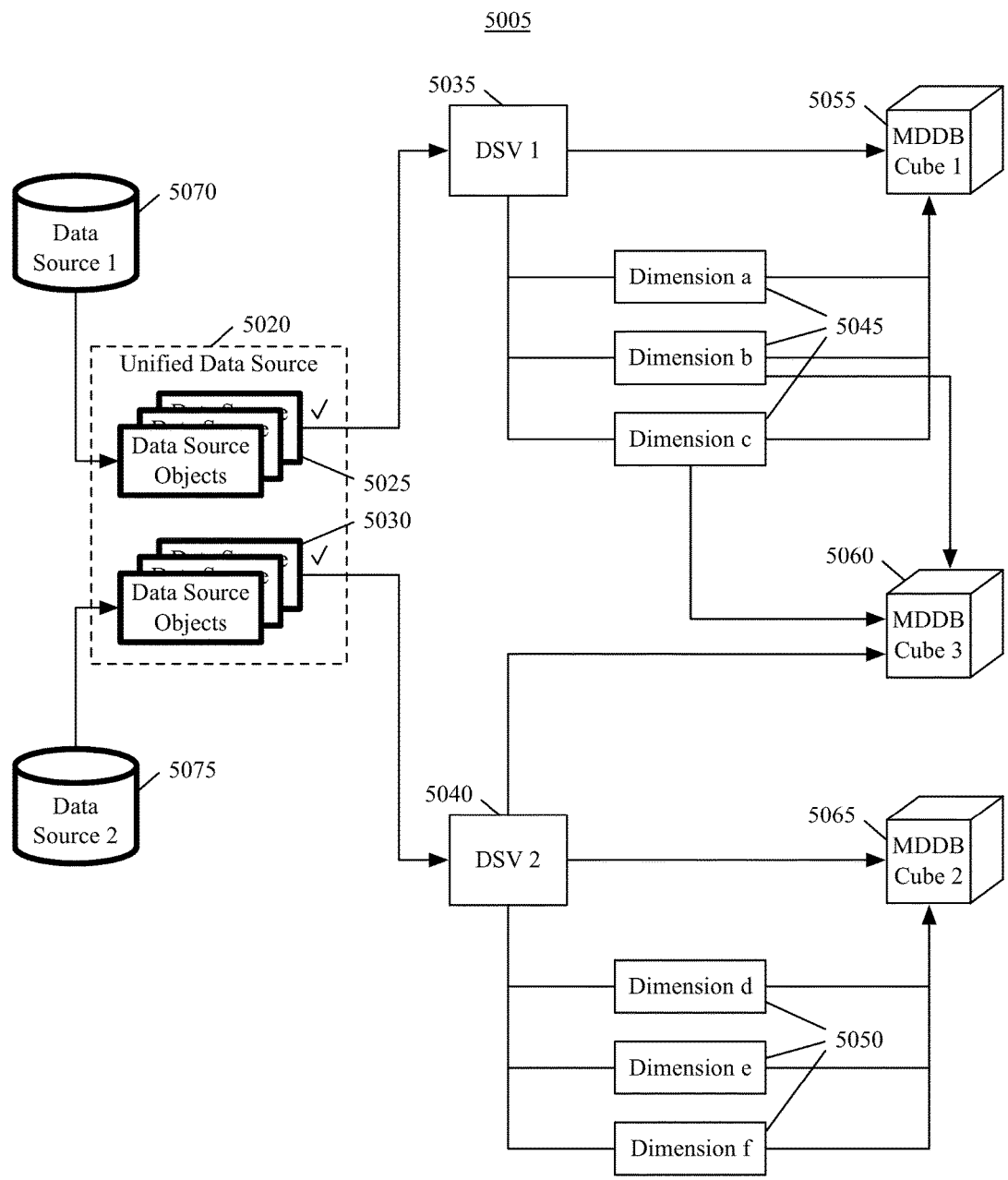
FIGS. 50-52 conceptually illustrate an example of a federated MDDB cube that is determined to be available.
Figure 51:
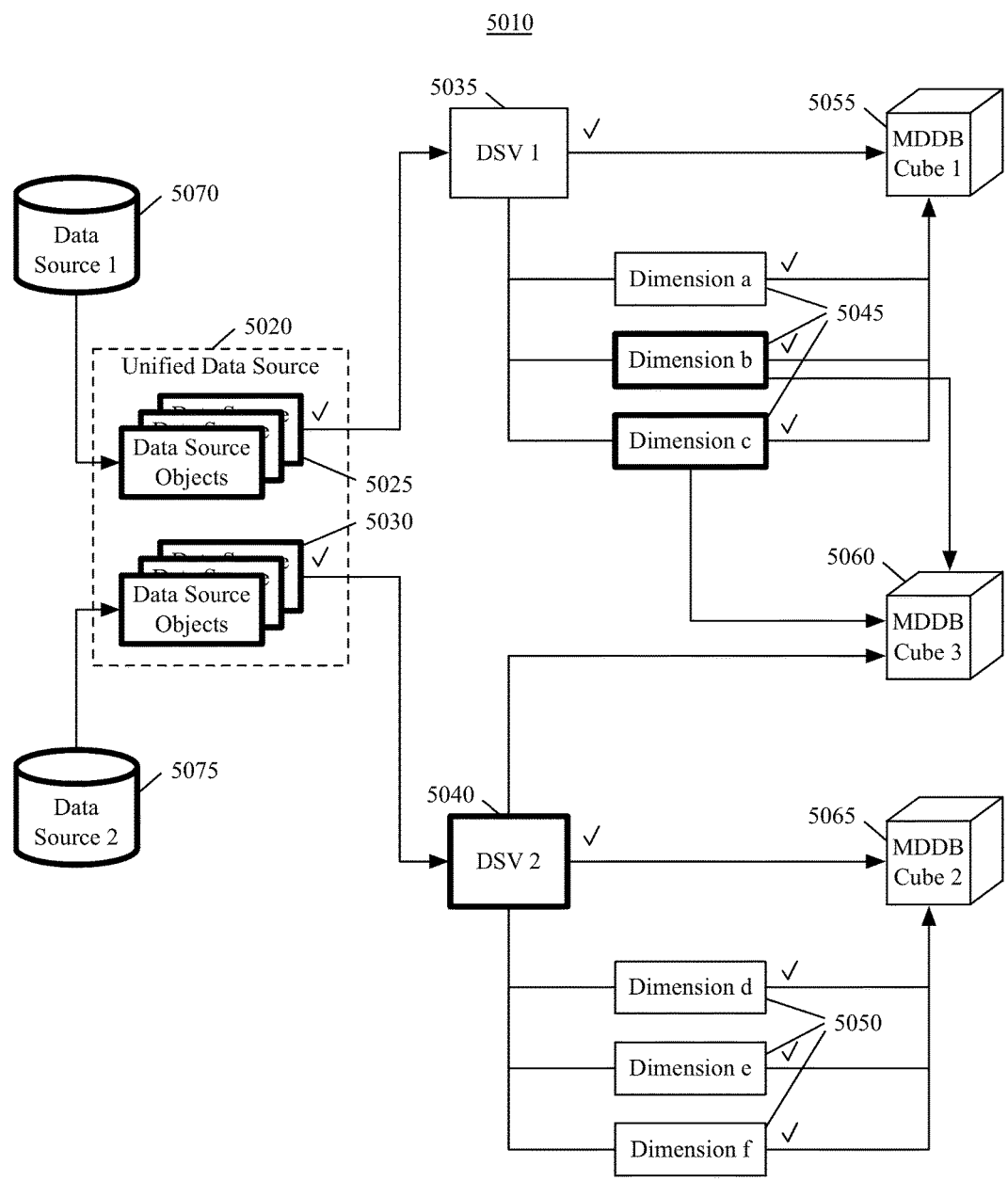
Figure 52:
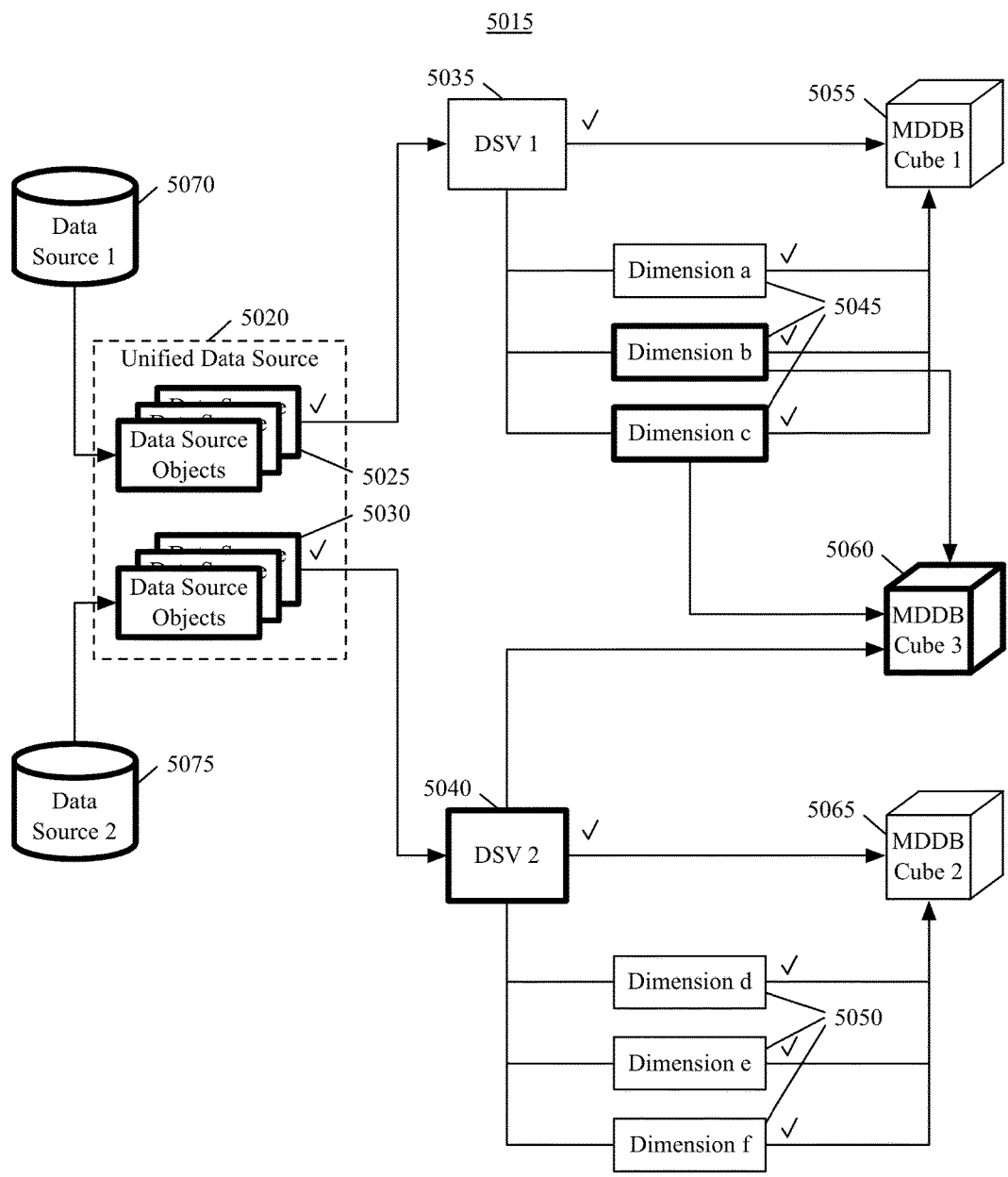

FIGS. 50-52 conceptually illustrate an example of a federated MDDB cube 5060 that is determined to be available. Specifically, these figures illustrate the determination that the federated MDDB cube 5060 is available in three stages 5005-5015 of an MDDB cube data relationship diagram. As shown, FIGS. 50-52 illustrate data sources 5070 and 5075, a unified data source 5020, DSVs 5035 and 5040, sets of dimensions 5045 and 5050, and MDDB cubes 5055-5065.

In this example, the unified data source 5020 is a collection of data source objects, which includes sets of data source objects 5025 and 5030, that presents a single source of data to the DSVs 5035 and 5040. As noted above, a data source object is a representation of data in a data source, in some embodiments. As shown, the set of data source objects 5025 are representations of data in the data source 5070 and the set of data source objects 5030 are representations of data in the data source 5075. Thus, the DSV 5035, which is a logical view of data in the unified data source 5020, is derived from the set of data source objects 5025. Likewise, the DSV 5040, which is a logical view of data in the unified data source 5020, is derived from the set of data source objects 5030. The set of dimensions 5045, each of which is metadata for categorizing a set of measures (not shown) along the set of dimensions 5045, are derived from the DSV 5035. Similarly, the set of dimensions 5050, each of which is metadata for categorizing a set of measures (not shown) along the set of dimensions 5050, are derived from the DSV 5040.

The MDDB cube 5055 is defined by a set of measures (not shown) and the set of dimensions 5045. For this example, the set of measures for the MDDB cube 5055 is derived from the DSV 5035. The MDDB cube 5065 is defined by the set of dimensions 5050 and a set of measures (not shown), which is derived from the DSV 5040 in this example. Further, the MDDB cube 5060 is defined by two of the dimensions (i.e., dimension b and dimension c) in the set of dimensions 5045, and a set of measures (not shown), which is derived from the DSV 5040 in this example.

As shown in FIG. 50, the first stage 5005 of the MDDB cube data relationship diagram shows that the data sources 5070 and 5075 are available. This is indicated by a bolding of the data sources 5070 and 5075. The sets of data source objects 5025 and 5030 in the unified data source 5020 are also available because, in this example, the sets of data source objects 5025 and 5030 are representations of data in the respective data sources 5070 and 5075. This is indicated by a bolding of each of the sets of data source objects 5025 and 5030 in the unified data source 5020 and checkmarks next to each of the sets of data source objects 5025 and 5030.

The DSVs 5035 and 5040 are available because the DSVs 5035 and 5040 are derived from the sets of data source objects 5025 and 5030, each of which is available. In addition, the set of dimensions 5045 is derived from the DSV 5035, and the set of dimensions 5050 is derived from the DSV 5040. Thus, the sets of dimensions 5045 and 5050 are available.

As illustrated in FIG. 51, the second stage 5010 of the MDDB cube data relationship diagram illustrates that the DSVs 5035 and 5040 are available and that the sets of dimensions 5045 and 5050 are available. Since the MDDB cube 5060 derives data from the DSV 5040 and the dimensions b and c in the set of dimensions 5045, this stage 5010 indicates the DSV 5040 and the dimensions b and c in the set of dimensions 5045 as available by bolding these items and placing checkmarks next to the items. As the DSV 5040 and the dimensions b and c in the set of dimensions 5045 are available, the MDDB cube 5060, which is derived from the DSV 5040 and the dimensions b and c in the set of dimensions 5045, is available. In FIG. 52, the third stage 5015 of the MDDB cube data relationship diagram shows that the MDDB cube 5060 is available, as indicated by a bolding of the MDDB cube 5060.

Figure 53:
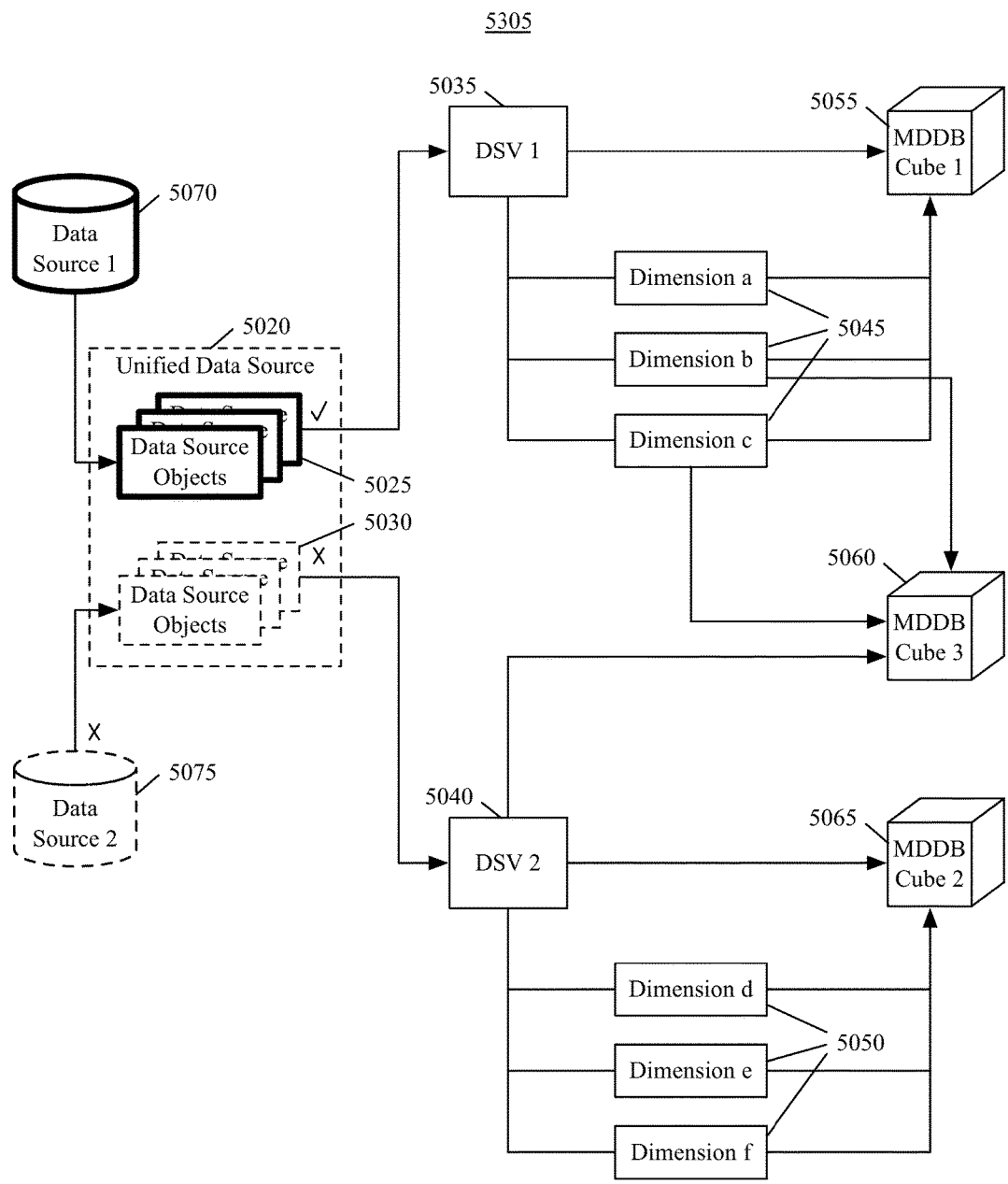
FIGS. 53-55 conceptually illustrate an example of a federated MDDB cube that is determined to be not available.
Figure 54:
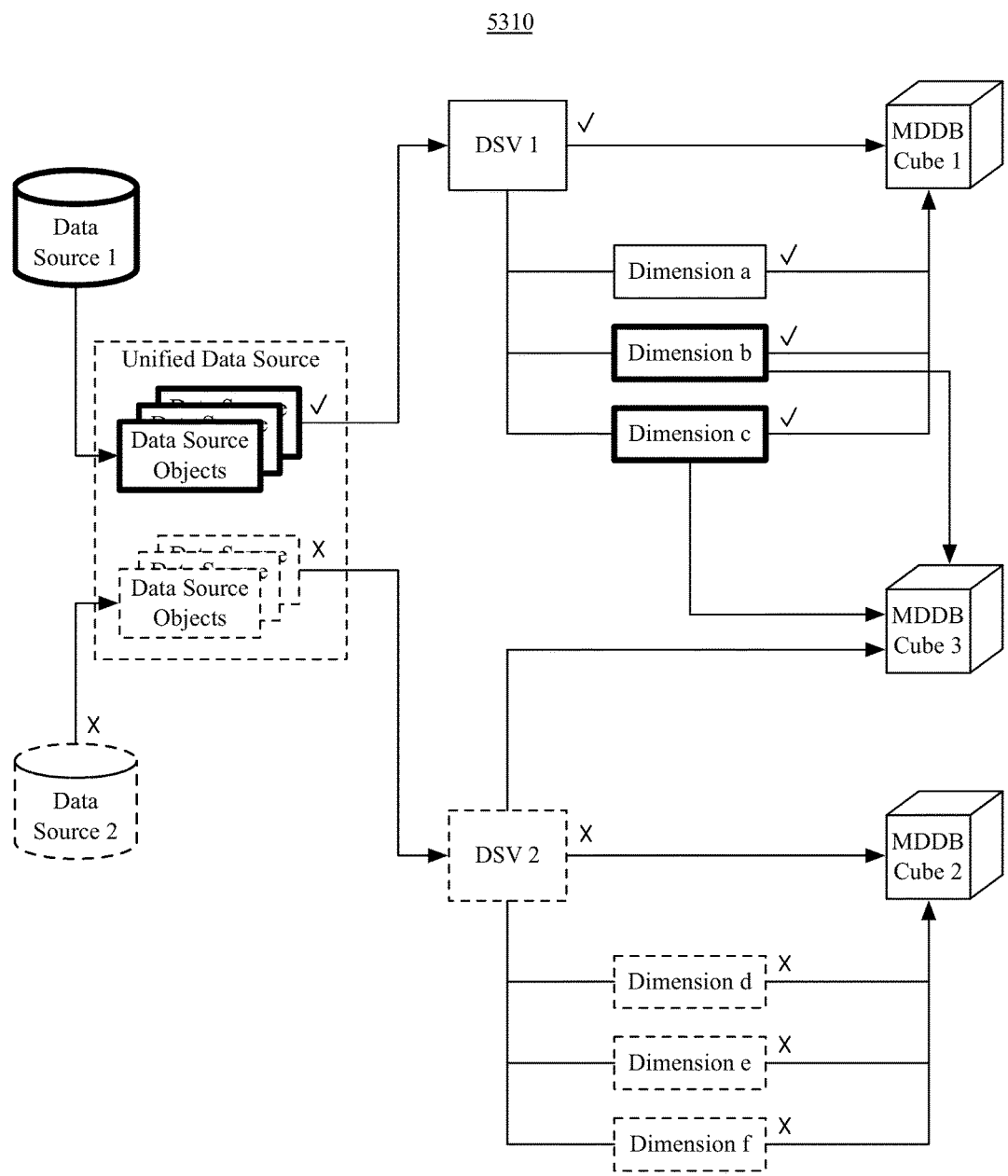
Figure 55:
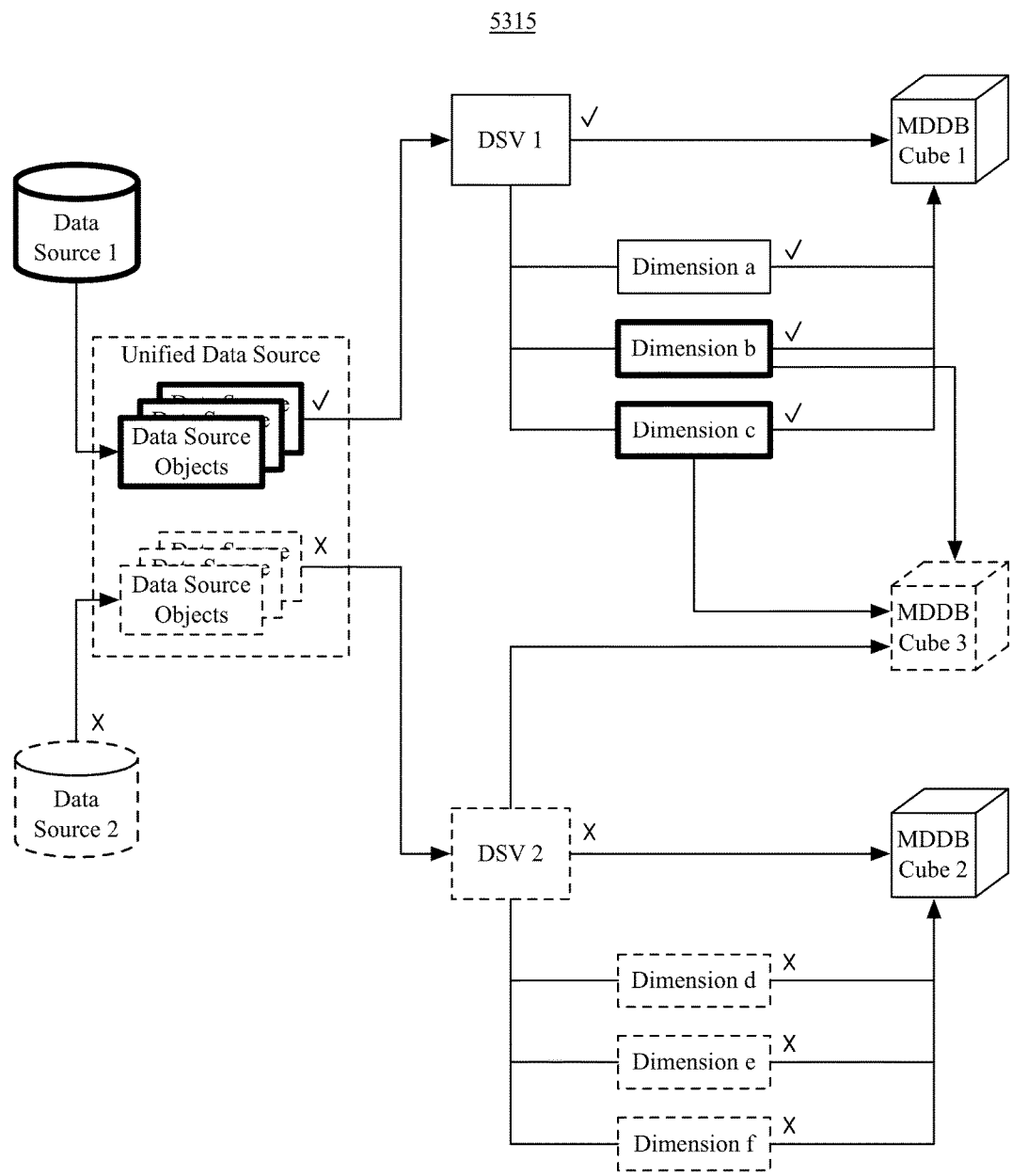

On the other hand, FIGS. 53-55 conceptually illustrate an example of a federated MDDB cube 5060 that is determined to be not available. In particular, FIGS. 53-55 illustrate the determination of the MDDB cube 5060 as not available in three stages 5305-5315 of an MDDB cube data relationship diagram. FIGS. 53-55 illustrate the same components (i.e., the data sources 5070 and 5075, the unified data source 5020, the sets of data source objects 5025 and 5030, the DSVs 5035 and 5040, the sets of dimensions 5045 and 5050, and the MDDB cubes 5055-5065) as those illustrated in FIGS. 50-52.

As shown in FIG. 53, the first stage 5305 of the MDDB cube data relationship diagram is similar to the first stage 5005 of the MDDB cube data relationship diagram illustrated in FIG. 50 except that, at this stage 5305, the set of data source objects 5030 is not available because the data source 5075, in which the set of data source objects 5030 represents data, is not available. The data source 5075 and the set of data source objects 5030 are indicated as not available by dashed lines of the data source 5075 and the set of data source objects 5030 and "X" marks next to the data source 5075 and the set of data source objects 5030.

Since the set of data source objects 5030 is not available and the DSV 5040 is derived from the set of data source objects 5030, the DSV 5040 is not available. As shown, the set of dimensions 5050 is derived from the DSV 5040. Since the DSV 5040 is not available, the set of dimensions 5050 is also not available.

As illustrated in FIG. 54, the second stage 5310 of the MDDB cube data relationship diagram illustrates that the DSV 5040 is not available, as indicated by dashed lines of the DSV 5040 and an "X" mark next to the DSV 5040. In addition, the second stage 5310 shows that the set of dimensions 5050 is not available, as indicated by dashed lines of the set of dimensions 5050 and an "X" mark next to each dimension in the set of dimensions 5050. As the DSV 5040 is not available, the MDDB cube 5060, which is derived from the DSV 5040, is not available. In FIG. 55, the third stage 5315 of the MDDB cube data relationship diagram shows that the MDDB cube 5060 is not available, as indicated by dashed lines of the MDDB cube 5060.

In addition to content packs that include federated MDDB cubes, some MDDB systems manage content packs that include federated presentation objects. As described above, a presentation object is a predefined representation of a perspective of a set of MDDB cubes. The presentation object of some such embodiments includes a set of charts, graphs, reports, and/or tables, which are generated based on the perspective of the set of MDDB cubes that define the presentation object. In some embodiments, a federated presentation object is a predefined representation of a perspective of MDDB cubes that are defined in different content packs. The following figure illustrates an example of such a federated presentation object.

Figure 56:
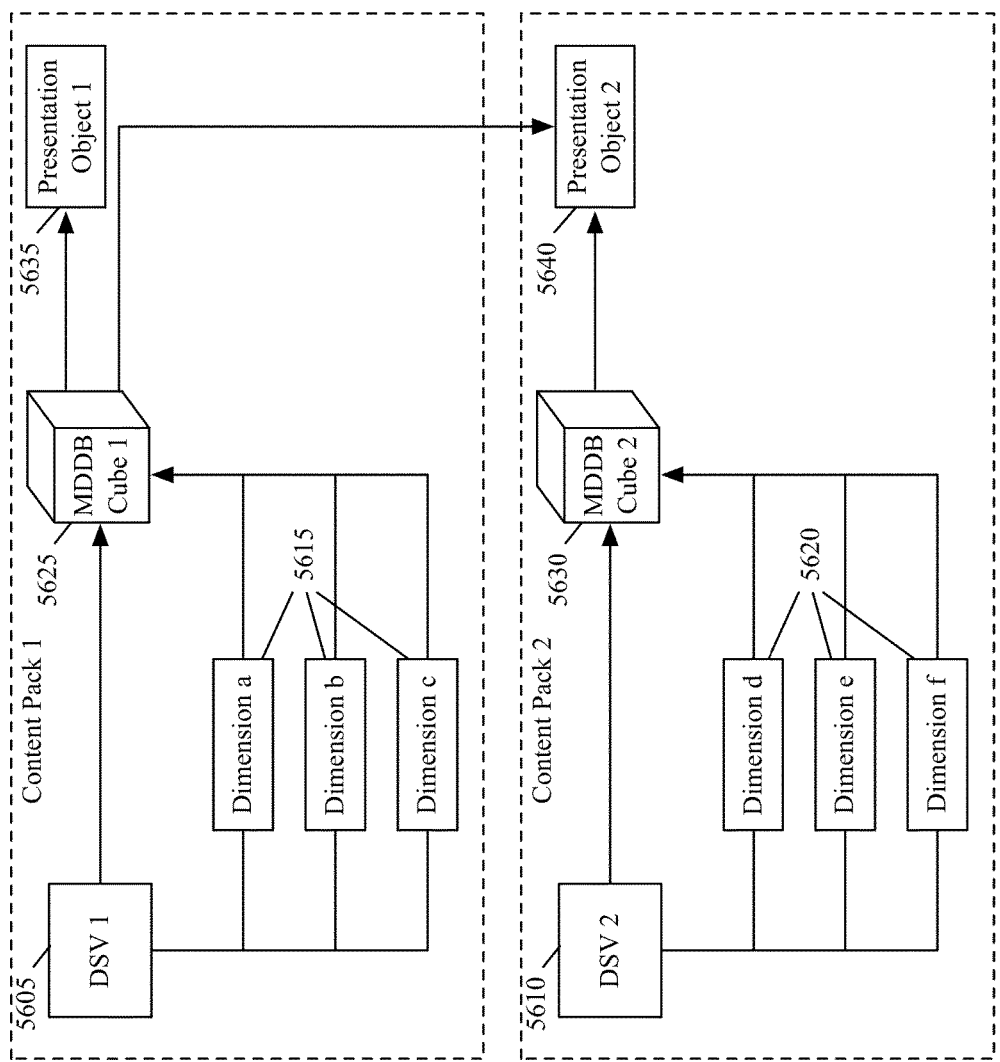
FIG. 56 conceptually illustrates an example of a content pack that specifies a presentation object based on two MDDB cubes specified by two different content packs.

FIG. 56 conceptually illustrates an example of a content pack that specifies a presentation object based on two MDDB cubes that are defined in two different content packs. Specifically, this figure conceptually illustrates data relationships of a presentation object 5640 according to some embodiments of the invention. As shown, FIG. 56 illustrates DSVs 5605 and 5610, sets of dimensions 5615 and 5620, MDDB cubes 5625 and 5630, and presentation objects 5635 and 5640.

For this example, the DSVs 5605 and 5610 are logical views of data in a unified data source (not shown), which is a collection of data source objects. As such, the DSVs 5605 and 5610 are derived from data source objects in the unified data source. In addition, the set of dimensions 5615, each of which is metadata for categorizing a set of measures (not shown) along the set of dimensions 5615, are derived from the DSV 5605. Also, the set of dimensions 5620, each of which is metadata for categorizing a set of measures (not shown) along the set of dimensions 5620, are derived from the DSV 5610.

The MDDB cube 5625 is defined by a set of measures (not shown) and the set of dimensions 5615. For this example, the set of measures for the MDDB cube 5625 is derived from the DSV 5605. Also, the MDDB cube 5630 is defined by a set of measures (not shown) and the set of dimensions 5620. In this example, the set of measures for the MDDB cube 5630 is derived from the DSV 5610. Additionally, the presentation object 5635 is derived from the MDDB cube 5625 and the presentation object 5640 is derived from the MDDB cubes 5625 and 5630.

FIG. 56 conceptually shows that content pack 1 includes, as indicated by a dashed line rectangle, the DSV 5605, the set of dimensions 5615, the MDDB cube 5625, and the presentation object 5635. Thus, the content pack 1 in this example includes a DSV definition of the DSV 5605, a set of dimension definitions of the set of dimensions 5615, an MDDB cube definition of the MDDB cube 5625, and a presentation object definition of the presentation object 5635. In some embodiments, the content map of a content pack specifies relationships (e.g., data dependencies) between the entities defined by the entity definitions included in the content pack. Thus, the content pack 1 in this example includes a content map that specifies that (1) each of the dimensions in the set of dimensions 5615 depends on the DSV 5605, (2) the MDDB cube 5625 depends on the DSV 5605 and the set of dimensions 5615, and (3) the presentation object 5635 depends on the MDDB cube 5625.

Furthermore, FIG. 56 conceptually shows that content pack 2 includes, as indicated by a dashed line rectangle, the DSV 5610, the set of dimensions 5620, the MDDB cube 5630, and the presentation object 5640. Therefore, the content pack 2 in this example includes a DSV definition of the DSV 5610, a set of dimension definitions of the set of dimensions 5620, an MDDB cube definition of the MDDB cube 5630, and a presentation object definition of the presentation object 5640. For this example, the content pack 2 includes a content map that specifies that (1) each of the dimensions in the set of dimensions 5620 depends on the DSV 5610, (2) the MDDB cube 5630 depends on the DSV 5610 and the set of dimensions 5620, and (3) the presentation object 5640 depends on the MDDB cubes 5625 and 5630.

Many of the figures described above illustrate MDDB cubes, federated MDDB cubes, presentation objects, federated presentation objects, content packs, content maps, unified content maps, data sources, unified data sources, data source objects, etc., However, one of ordinary skill in the art will understand that these items are merely examples of such items and that these items may be defined in any number of different ways.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 57:
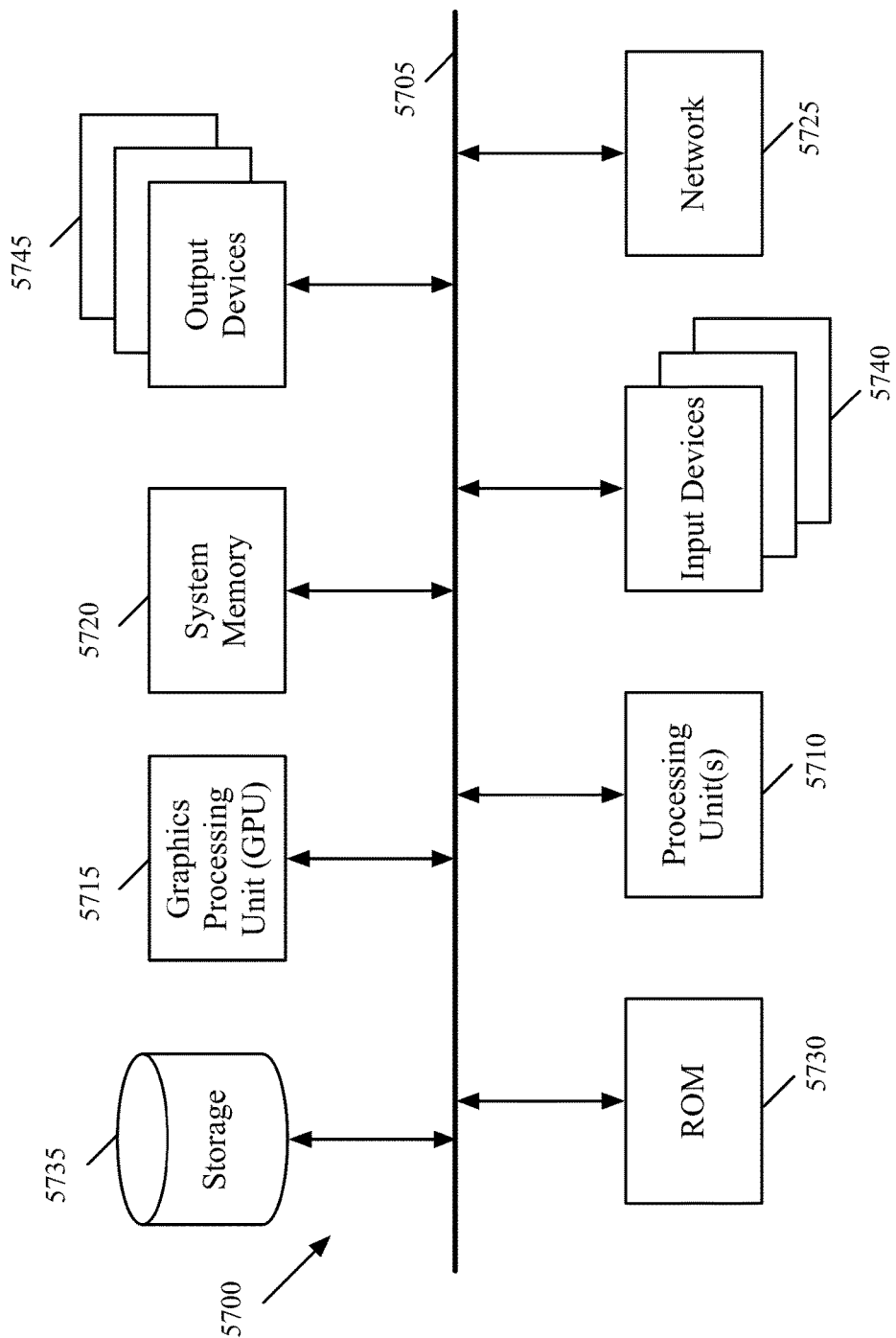
FIG. 57 conceptually illustrates an electronic system with which some embodiments of the invention are implemented.

FIG. 57 conceptually illustrates an electronic system 5700 with which some embodiments of the invention are implemented. The electronic system 5700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 5700 includes a bus 5705, processing unit(s) 5710, a graphics processing unit (GPU) 5715, a system memory 5720, a network 5725, a read-only memory 5730, a permanent storage device 5735, input devices 5740, and output devices 5745.

The bus 5705 collectively represents all system, peripheral, and chipset buses that communicatively connect the numerous internal devices of the electronic system 5700. For instance, the bus 5705 communicatively connects the processing unit(s) 5710 with the read-only memory 5730, the GPU 5715, the system memory 5720, and the permanent storage device 5735.

From these various memory units, the processing unit(s) 5710 retrieves instructions to execute and data to process in order to execute the processes of the invention. The processing unit(s) may be a single processor or a multi-core processor in different embodiments. Some instructions are passed to and executed by the GPU 5715. The GPU 5715 can offload various computations or complement the image processing provided by the processing unit(s) 5710.

The read-only-memory (ROM) 5730 stores static data and instructions that are needed by the processing unit(s) 5710 and other modules of the electronic system. The permanent storage device 5735, on the other hand, is a read-and-write memory device. This device is a non-volatile memory unit that stores instructions and data even when the electronic system 5700 is off. Some embodiments of the invention use a mass-storage device (such as a magnetic or optical disk and its corresponding disk drive) as the permanent storage device 5735.

Other embodiments use a removable storage device (such as a floppy disk, flash memory device, etc., and its corresponding disk drive) as the permanent storage device. Like the permanent storage device 5735, the system memory 5720 is a read-and-write memory device. However, unlike storage device 5735, the system memory 5720 is a volatile read-and-write memory, such as random access memory. The system memory 5720 stores some of the instructions and data that the processor needs at runtime. In some embodiments, the invention's processes are stored in the system memory 5720, the permanent storage device 5735, and/or the read-only memory 5730. For example, the various memory units include instructions for processing multimedia clips in accordance with some embodiments. From these various memory units, the processing unit(s) 5710 retrieves instructions to execute and data to process in order to execute the processes of some embodiments.

The bus 5705 also connects to the input and output devices 5740 and 5745. The input devices 5740 enable the user to communicate information to and select commands in the electronic system. The input devices 5740 include alpha-numeric keyboards and pointing devices (also called "cursor control devices"), cameras (e.g., webcams), microphones or similar devices for receiving voice commands, etc. The output devices 5745 display images generated by the electronic system or otherwise output data. The output devices 5745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 57, bus 5705 also couples electronic system 5700 to a network 5725 through a network adapter (not shown). In this manner, the computer can be a part of a network of computers (such as a local area network ("LAN"), a wide area network ("WAN"), an intranet, or a network of networks, such as the Internet). Any or all components of electronic system 5700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 12, 15, 17, 20, 26, 28, 31, 33, 34, 37, 38, 42, 44, 45, and 47) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for installing multidimensional data storage (MDDS) cubes on a server, the method comprising:
  receiving definitions for a plurality of MDDS cubes;
  receiving a request to install an MDDS cube having a particular cube definition from the plurality of MDDS cubes on a server;
  defining the requested MDDS cube as available when an examination of a unified data source interface that derives data from a plurality of data sources determines that all data required by the particular cube definition of the requested MDDS cube is present in the plurality of data sources; and
  installing the requested MDDS cube on the server when the MDDS cube is defined to be available.

2. The method of claim 1, wherein the definitions for the plurality of MDDS cubes are received from a set of different MDDS cube vendors for a set of different products.

3. The method of claim 1, wherein a cube definition for an MDDS cube comprises a set of measures and dimensions that defines the MDDS cube.

4. The method of claim 1, wherein the unified data source interface comprises a plurality of data source objects, wherein each data source in the plurality of data sources is associated with a subset of data source objects in the plurality of data source objects in the unified data source interface.

5. The method of claim 4, wherein the requested MDDS cube is defined as available when the requested MDDS cube derives data from a particular set of data source objects in the unified data source and every data source associated with one or more data source objects in the particular set of data source objects is linked to the unified data source interface.

6. The method of claim 5 further comprising determining that a set of data related to a set of measures and dimensions that is defined in a definition of the requested MDDS cube is stored in the linked data sources.

7. The method of claim 6, wherein the cube definition further defines a data source view (DSV) that derives data from the particular set of data source objects in the unified data source interface.

8. The method of claim 4, wherein a data source object in the unified data source interface comprises one of a table, a view, a stored procedure, and a query that provides data from an associated data source.

9. The method of claim 1, wherein installing the MDDS cube on the server comprises creating an instance of the requested cube on the server.

10. The method of claim 9 further comprising processing the instantiated MDDS cube for a set of users to view and interact with the instantiated MDDS cube.

11. The method of claim 10, wherein processing the MDDS cube comprises:
  aggregating data related to a set of measures and dimensions that are defined in a definition of the requested MDDS cube from a subset of the plurality of data sources; and
  populating the instantiated MDDS cube on the server with the aggregated data.

12. The method of claim 11, wherein aggregating the data comprises querying the data from the subset of data sources.

13. The method of claim 1, wherein the definitions for the set of MDDS cubes are received in a set of content packs each of which comprises a predefined package of files.

14. The method of claim 13, wherein each content pack comprises one or more definitions for one or more MDDS cubes and cube metadata that defines relationships between measures, dimensions, and data sources for each MDDS cube.

15. A non-transitory machine readable medium storing a program which when executed by at least one processing unit installs multidimensional data storage (MDDS) cubes on a server, the program comprising sets of instructions for:

receiving definitions for a set of MDDS cubes;

receiving a request to install an MDDS cube having a particular cube definition from the set of MDDS cubes on a server;

defining the requested MDDS cube as available when an examination of a unified data source interface that derives data from a plurality of data sources determines that all data required by the particular cube definition of the requested MDDS cube is present in the plurality of data sources; and installing the MDDS cube on the server when the MDDS cube is determined to be available.

16. The non-transitory machine readable medium of claim 15, wherein the set of instruction for receiving the definitions comprises a set of instructions for receiving the definitions from a set of different MDDS cube vendors for a set of different products.

17. The non-transitory machine readable medium of claim 15, wherein the program further comprises a set of instructions for receiving the plurality of data sources from a set of different data storage vendors.

18. The non-transitory machine readable medium of claim 15, wherein the unified data source interface comprises a plurality of data source objects, wherein each data source in the plurality of data sources is associated with a subset of data source objects in the plurality of data source objects in the unified data source interface.

19. The non-transitory machine readable medium of claim 18, wherein the requested MDDS cube is defined as available when the requested MDDS cube derives data from a particular set of data source objects in the unified data source and every data source associated with one or more data source objects in the particular set of data source objects is linked to the unified data source interface.

20. The non-transitory machine readable medium of claim 19, wherein the program further comprising a set of instructions for determining that a set of data related to a set of measures and dimensions that is defined in a definition of the requested MDDS cube is stored in the linked data sources.

* * * * *